United States Patent [19]

Eckert, Jr. et al.

[11] 4,097,923

[45] Jun. 27, 1978

[54] REMOTE POSTAGE METER CHARGING SYSTEM USING AN ADVANCED MICROCOMPUTERIZED POSTAGE METER

[75] Inventors: Alton B. Eckert, Jr., Norwalk; Howell A. Jones, Jr., Southport; Frank T. Check, Jr., Hamden, all of Conn.

[73] Assignee: Pitney-Bowes, Inc., Stamford, Conn.

[21] Appl. No.: 568,460

[22] Filed: Apr. 16, 1975

[51] Int. Cl.² ............................................ G06F 1/00

[52] U.S. Cl. ............................................ 364/900

[58] Field of Search .................... 340/172.5; 364/200, 364/900

[56] References Cited

U.S. PATENT DOCUMENTS

| | | | |
|---|---|---|---|
| 3,792,446 | 2/1974 | McFiggins et al. | 340/172.5 |
| 3,978,457 | 8/1976 | Check, Jr. et al. | 364/200 |

*Primary Examiner*—Raulfe B. Zache

*Attorney, Agent, or Firm*—Robert S. Salzman; William D. Soltow, Jr.; Albert W. Scribner

[57] ABSTRACT

A remote postage meter charging system using a third generation electronic postage meter. Like one of its predecessors, the present postage meter of this inventive system is built around a microcomputer set. This advanced computerized meter comprises a working memory which contains seed numbers for generating postage funding combinations. The remote postage meter charging system has the capability of adding variable amounts of postage into the postage meter.

30 Claims, 62 Drawing Figures

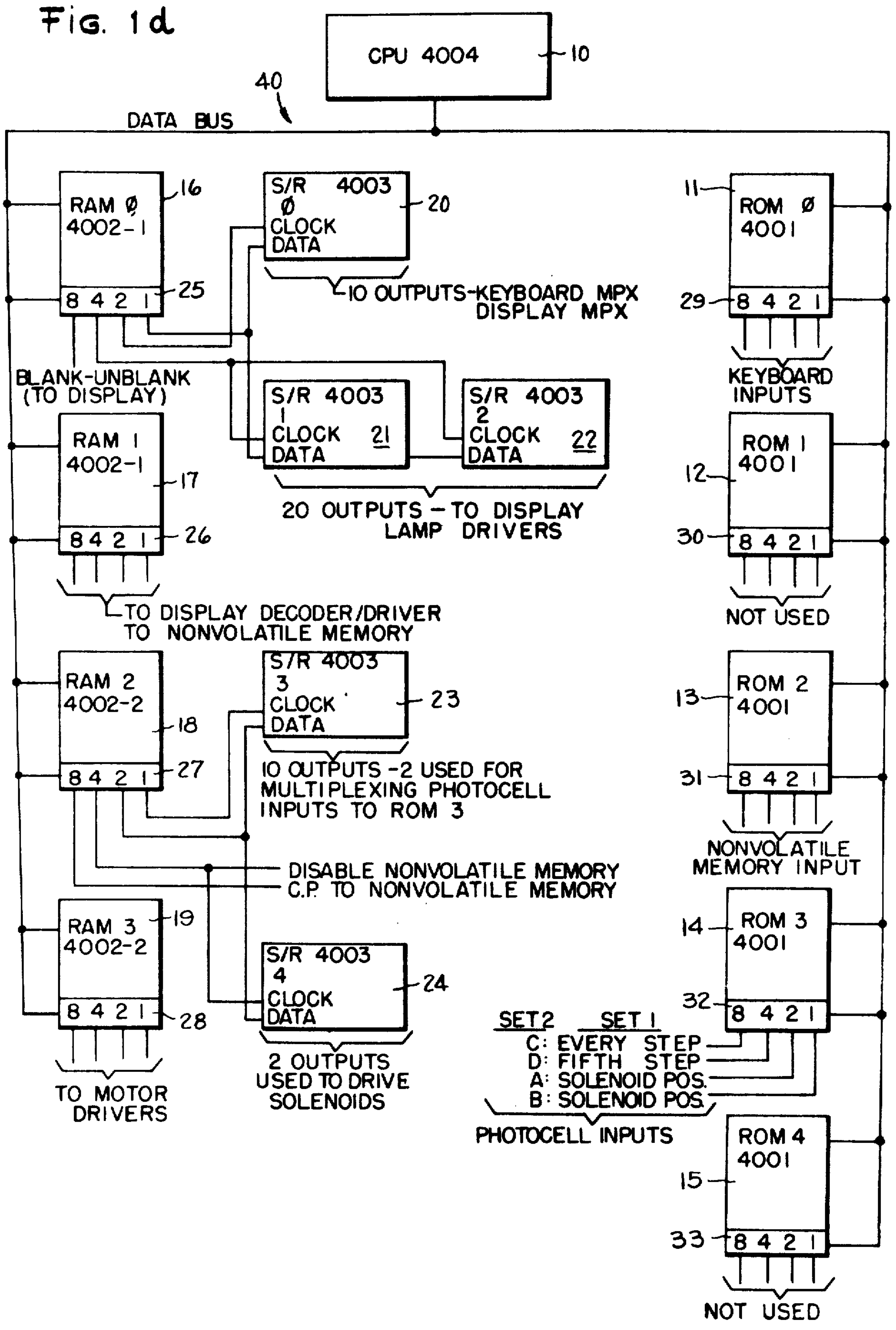
Fig. 1d
CPU 4004
10
40
DATA BUS
RAM Ø 4002-1
16
25
8 4 2 1
S/R 4003 Ø CLOCK DATA
20
10 OUTPUTS-KEYBOARD MPX DISPLAY MPX
ROM Ø 4001
11
29
KEYBOARD INPUTS
BLANK-UNBLANK (TO DISPLAY)
S/R 4003 1 CLOCK DATA 21
S/R 4003 2 CLOCK DATA 22
20 OUTPUTS — TO DISPLAY LAMP DRIVERS
RAM 1 4002-1
17
26
ROM 1 4001
12
30
NOT USED
TO DISPLAY DECODER/DRIVER TO NONVOLATILE MEMORY
RAM 2 4002-2
18
27
S/R 4003 3 CLOCK DATA
23
10 OUTPUTS -2 USED FOR MULTIPLEXING PHOTOCELL INPUTS TO ROM 3
ROM 2 4001
13
31
NONVOLATILE MEMORY INPUT
DISABLE NONVOLATILE MEMORY
C.P. TO NONVOLATILE MEMORY
RAM 3 4002-2
19
28
TO MOTOR DRIVERS
S/R 4003 4 CLOCK DATA
24
2 OUTPUTS USED TO DRIVE SOLENOIDS
ROM 3 4001
14
32
SET 2 SET 1
C: EVERY STEP
D: FIFTH STEP
A: SOLENOID POS.
B: SOLENOID POS.
PHOTOCELL INPUTS
ROM 4 4001
15
33
NOT USED FIG. 5
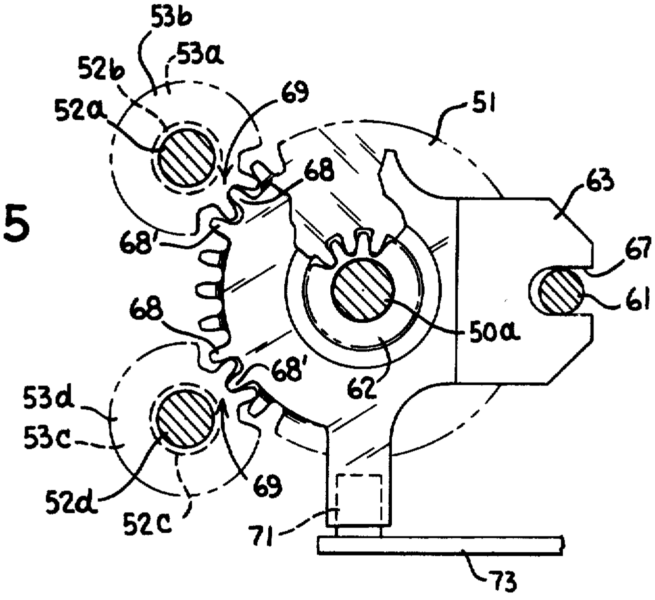
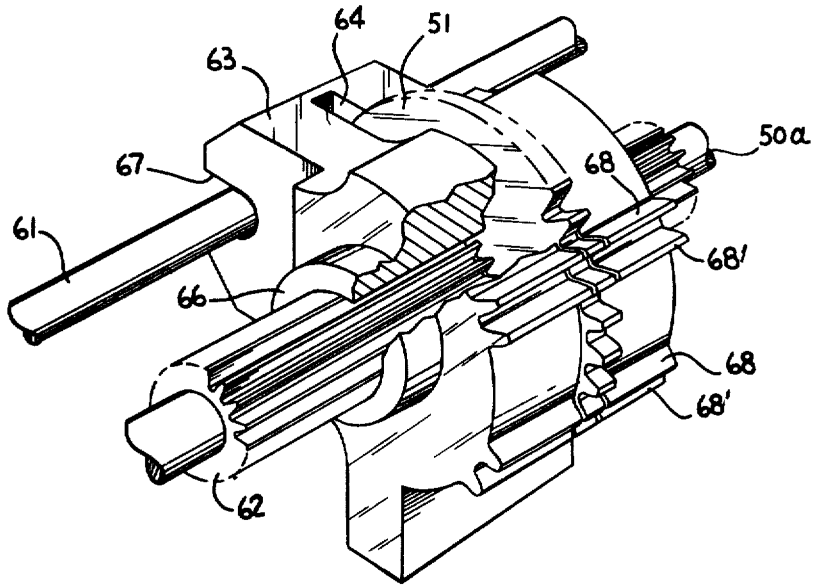
FIG. 4b

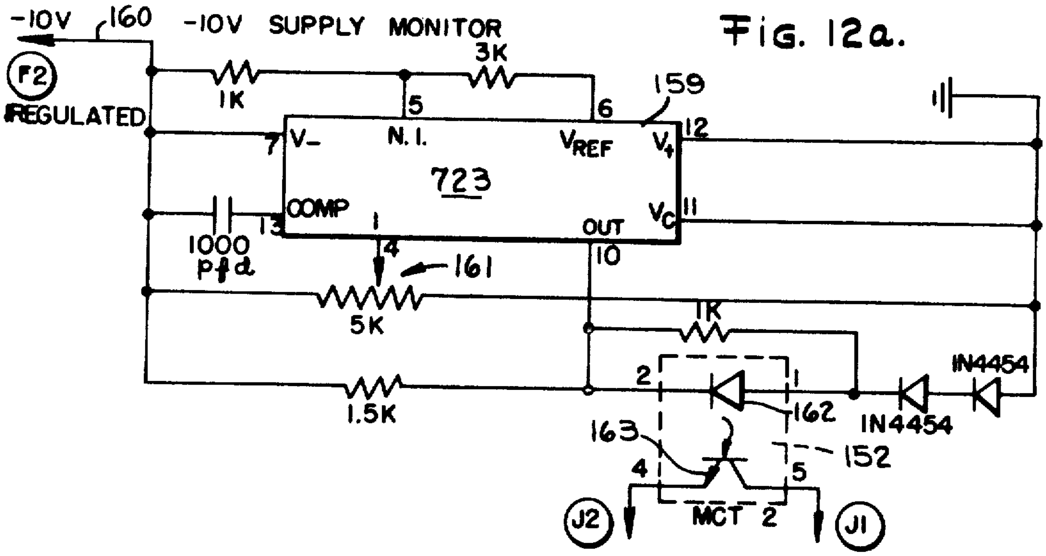
Fig. 12a.
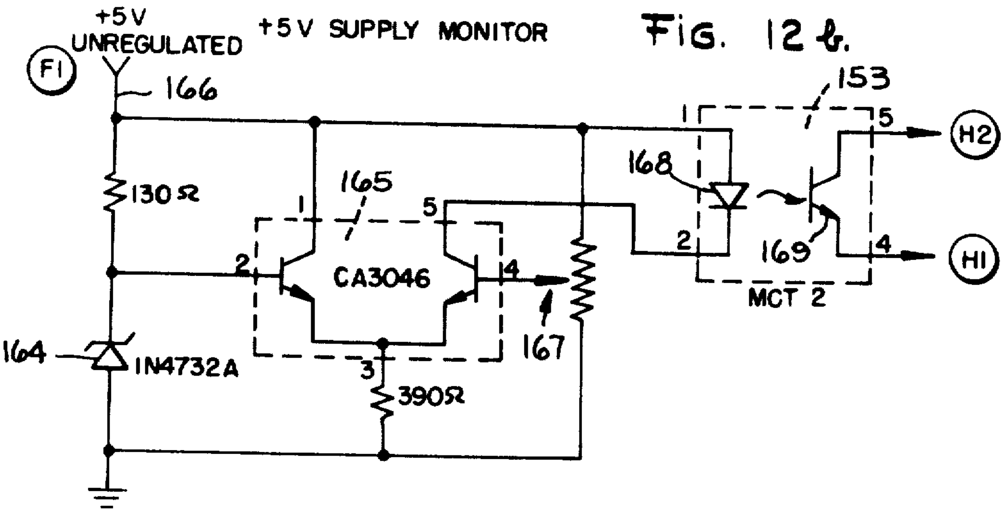
Fig. 12b.
Fig. 13.
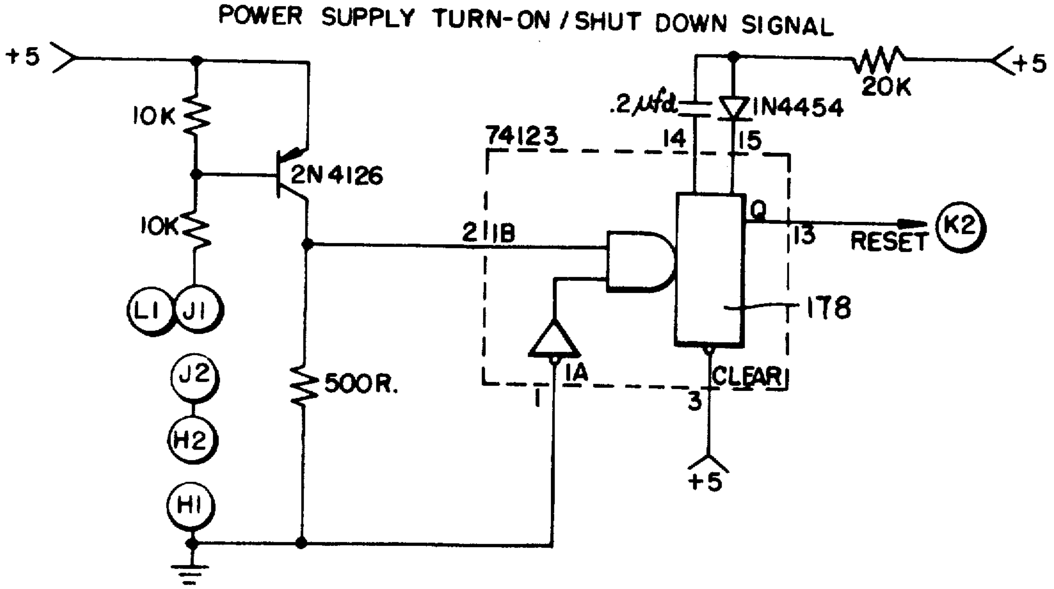

CHART FOR POSTAGE METER PROGRAM

INITIALIZATION

CHCK

INRAM

DOWN

FCTN

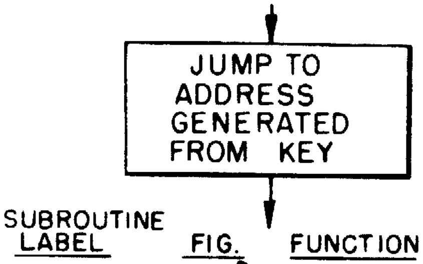

| KEY | SUBROUTINE LABEL | FIG. | FUNCTION |
|---|---|---|---|
| 0 | ZERO | 27 | NUMERICAL KEYBOARD ENTRY |
| 1 | ONE | 27 | |
| 2 | TWO | 27 | |
| 3 | THREE | 27 | |
| 4 | FOUR | 27 | |
| 5 | FIVE | 27 | |
| 6 | SIX | 27 | |
| 7 | SEVEN | 27 | |
| 8 | EIGHT | 27 | |
| 9 | NINE | 27 | |
| SET | SET | 28 | SET METER OR RECALL PREVIOUS SETTING |
| $ UNLOCK | UNLCK | 29 | $ UNLOCK FLAG |
| PRINT | POST | 30 | UPDATE REGISTERS AFTER PRINTING POSTAGE |
| PHOTOCELL INPUT | | | |
| CLEAR | CLEAR | 34 | CLEAR FUNCTION |
| ± | PLUS | 33 | ADDITION FUNCTION |
| DESC. REG. | DESC | 35 | PUT CONTENTS OF SELECTED REGISTER INTO DISPLAY |
| ASC. REG. | ASC | 35 | |
| PIECE COUNT | PIECE | 35 | |
| CONT. SUM | CNTRL | 35 | |
| BATCH AMOUNT | BSUM | 35 | |
| BATCH COUNT | BCNT | 35 | |

FIG. 26

FIG. 27

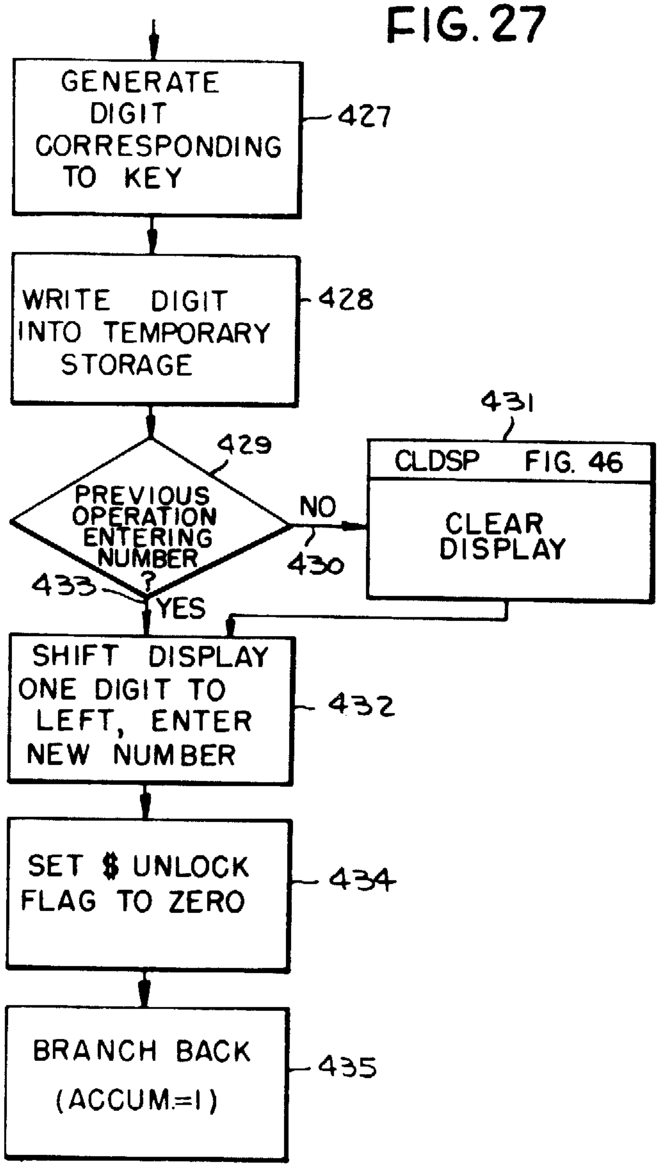

SET

FIG. 30.
POST
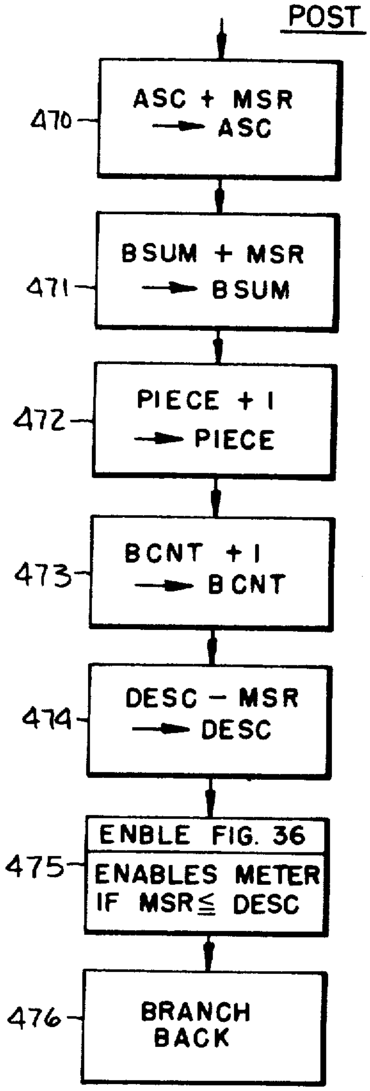
FIG. 33.
PLUS
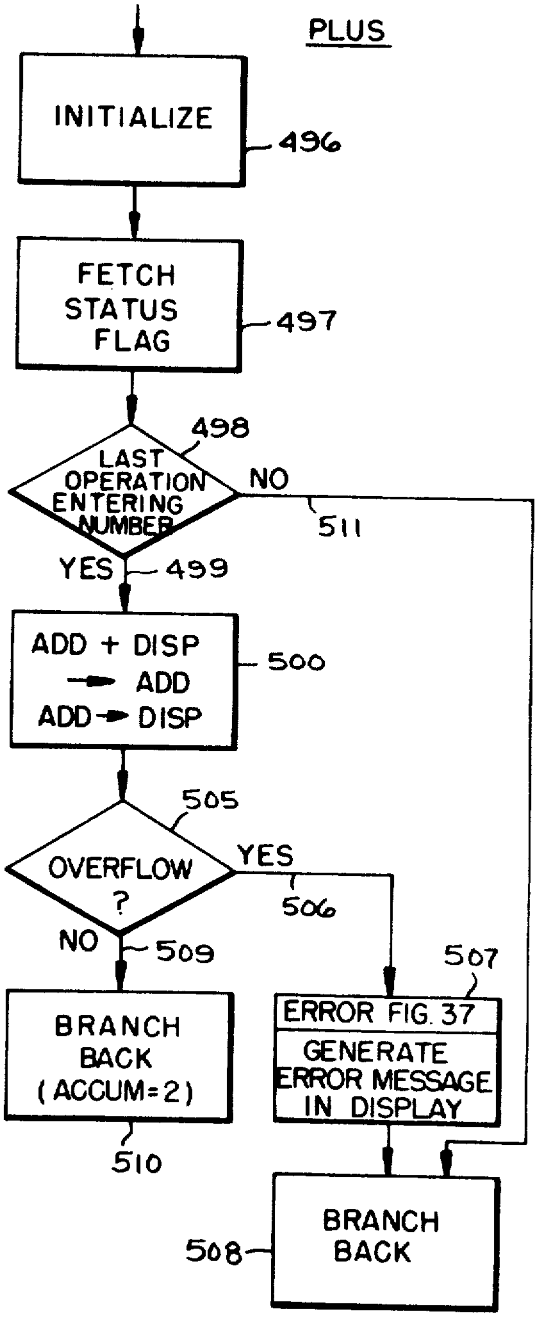
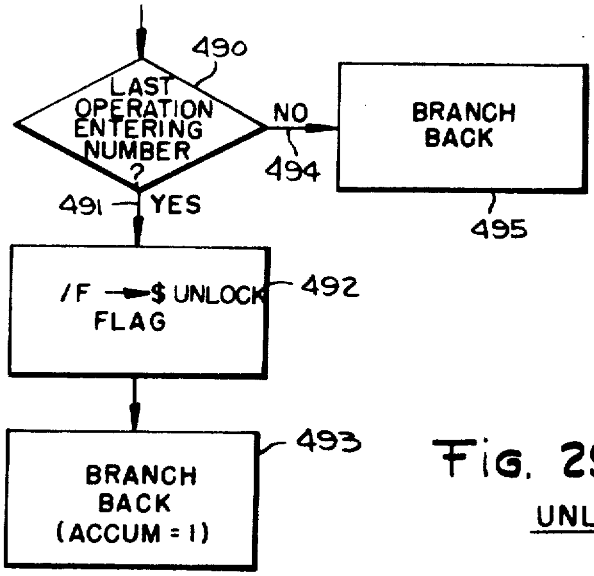
FIG. 29.
UNLCK

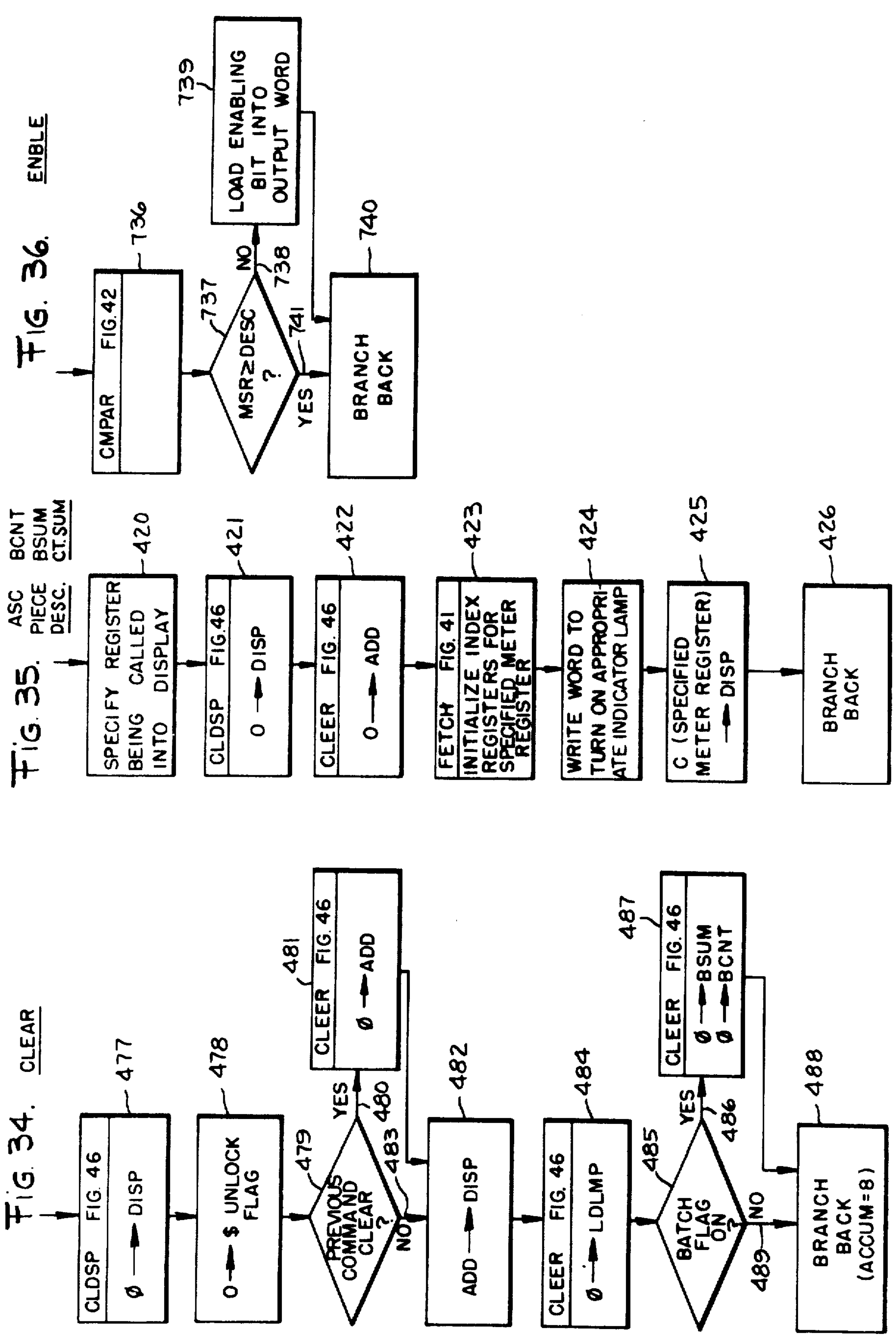
FIG. 36. ENBLE
CMPAR FIG. 42
736
737
MSR≥DESC ?
738
NO
YES
741
LOAD ENABLING BIT INTO OUTPUT WORD
739
BRANCH BACK
740
FIG. 35. ASC PIECE DESC. BCNT BSUM CT.SUM
SPECIFY REGISTER BEING CALLED INTO DISPLAY
420
CLDSP FIG. 46
0 → DISP
421
CLEER FIG. 46
0 → ADD
422
FETCH FIG. 41
INITIALIZE INDEX REGISTERS FOR SPECIFIED METER REGISTER
423
WRITE WORD TO TURN ON APPROPRIATE INDICATOR LAMP
424
C (SPECIFIED METER REGISTER) → DISP
425
BRANCH BACK
426
FIG. 34. CLEAR
CLDSP FIG. 46
Ø → DISP
477
O → $ UNLOCK FLAG
478
PREVIOUS COMMAND CLEAR ?
479
YES
480
NO
483
CLEER FIG. 46
Ø → ADD
481
ADD → DISP
482
CLEER FIG. 46
Ø → LDLMP
484
BATCH FLAG ON ?
485
YES
486
NO
489
CLEER FIG. 46
Ø → BSUM
Ø → BCNT
487
BRANCH BACK (ACCUM=8)
488

STEP

REMOTE POSTAGE METER CHARGING SYSTEM USING AN ADVANCED MICROCOMPUTERIZED POSTAGE METER

The invention relates to electronic postage meter systems, and more particularly to a remote postage meter setting system having a microcomputerized postage meter of advanced design.

BACKGROUND OF THE INVENTION AND RELATED APPLICATIONS

The remote charging system of this invention uses a third generation stand alone postage meter, which supersedes the predecessor meters generally shown in copending applications, Ser. Nos. 536,248 and 406,898; filed Dec. 23, 1974 and Oct. 16, 1973, respectively.

The present microcomputerized meter is an improvement of the previous microcomputerized meter (Ser. No. 536,248). The new meter comprises means for funding the meter by entering a combination through the meter keyboard. The entered combination is compared with an internally generated combination.

The remote postage charging system of this invention funds the postage meter with variable amounts of postage rather than incremental amounts as shown in prior funding systems such as that shown in U.S. Pat. No. 3,792,446.

SUMMARY OF THE INVENTION

The invention relates to a remotely funded computerized postage meter system.

The remote funding postage meter system of the invention features a data center equipped with a programmed digital computer and a voice answer-back unit. The data center processes telephone calls from postage meter users, requesting of them information unique to their meter. This information is used to verify the authenticity of the call, and to update the record of the user stored in the digital computer. The user also informs the data center of the postage which is desired to be funded into the meter, this postage being a variable amount. The computer at the data center formulates a combination based upon the identifying information and the variable amount of postage. This combination is then transmitted back to the user via the answer back unit. The user then enters the combination into the microcomputerized postage meter. The postage meter contains a routine in its program for comparing the entered combination with an internally generated combination based upon the desired postage requested for funding. If the entered combination matches the internally generated combination, the funding registers of the meter are increased by the new postage amount. If there is no equality between the entered combination and the internally generated combination the funding register of the meter will not be increased by the requested postage, and the user will be so informed.

The postage meter of the system employs a central processing unit, a plurality of memory units, a multiplexed input and output, and postage setting means responsive to the controlled interactions between the CPU, memories, input and outputs, for setting predetermined postage and printing the postage as desired. The meter is built up about a plurality of LSI components and employs LSI technology to provide a functional relationship enabling the electronic postage meter system to accomplish its predetermined functions.

In general configuration, a central processing unit for providing the data flow control and for providing calculation of postage in accordance with input supply thereto, is the essential element of this system. Coupled to the CPU is a permanent memory for storing a postage data program and is a non-alterable storage medium. A temporary memory is also provided for storing and forwarding working data in accordance with the operation of the CPU. A non-volatile memory is intercoupled with the CPU and provides a permanent or nondestructive storage location for postal funding data in accordance with the transfer routine previously established and activated in accordance with a shut-down or start-up sequence of the system. The use of a nonvolatile memory is important in that data which is significant in the system, such as the contents of descending registers which keep track of the remaining balance in the postage meter or ascending registers which keep track of the continuous accumulation of charges thereto, is permanently stored in the nonvolatile memory when the system is de-energized. As a corollary, when the system starts up, the data from the nonvolatile memory is transferred back into the temporary memory.

Further interaction with the CPU is provided by means of an appropriate input device such as a keyboard which provides the appropriate postal data to the CPU for the calculations to be performed. An output or display which is multiplexed with the input also interfaces with the CPU for displaying data from the temporary storage in accordance with the commands. The ultimate output of the CPU is coupled to a postage setting mechanism which sets the amount of postage to be printed into a postal printing unit for printing the postage as desired.

More specifically, the microcomputerized postage meter of this invention is built upon the MCS-4[R] microcomputer set; a product of Intel Corporation, Santa Clara, California. It will be understood that other manufacturers and equivalent components may be employed and that Intel components are used for purposes of example. The microcomputer set is of LSI design, and comprises a central processor unit (CPU-4004) which performs all control and data processing functions, and contains the control unit and arithmetic unit of a general purpose computer. The computerized meter comprises a plurality of ROM's (Read Only Memory Chips - 4001) and a plurality of RAM's (Random Access Memory Chips - 4002) which are interconnected to the CPU. The ROM's contain the postage system program. One four-bit input or output port is provided on each ROM package. One four-bit output port is provided on each RAM package.

The computerized meter also contains shift registers (Intel number 4003) for port expansion and multiplexing capability, and associated circuitry including clocks, power supplies and interfacing circuits to connect with the outside world.

The postage printing mechanism is one of several peripheral components including a keyboard for instructing the meter, and a display for visually monitoring the system's functions.

The postage printer of the meter is a modified Model 5300 postage meter manufactured by Pitney-Bowes, Inc., Stamford, Connecticut. The mechanical accounting means (ascending and descending registers have been removed from the meter along with the actuator assemblies and setting levers. The remaining printer is set by a pair of solenoids and a stepping motor. The mechanical operation of the printer is monitored by a plurality of photocells strategically placed within the printer housing. When a particular function of the printer fails to be performed, a photocell monitoring that appropriate function will provide an error input to the system via an input port.

The microcomputer meter also receives inputs from the keyboard and non-volatile memory through an input port.

Output from the meter are generally handled via the shift registers and output ports.

Peripheral devices may easily be added to the meter such as a large external display, a receipt printer, or a listing printer, etc.

The remote meter charging of the invention is made possible by the microcomputerized postage meter. This remote charging technique is an improved departure over previous methods such as that shown in U.S. Pat. No. 3,792,446, issued Feb. 12, 1974. In the previous system, only a fixed amount of postage could be added to the meter. With the present invention, any (variable) amount of postage can be added to the postage meter within the register size. Thus, the new technique is more versatile. This method also features a greater degree of security, since not only is the coded information varying in accordance with randomly chosen constants, but it is additionally varying in accordance with the postage amount.

It is an object of the invention to provide improved capability for remotely charging a postage meter;

It is another object of this invention to provide an improved computerized postage meter;

It is still another object of this invention to provide a computerized postage meter funding system having the capability of funding a computerized postage meter with variable amounts of postage.

These and other objects of the invention will be better understood and will become more apparent with reference to the following detailed description taken in conjunction with the attached drawings, in which:

FIG. 1 is a schematic diagram of the remote postage meter funding system of this invention;

FIG. 1*a* is a functional block diagram of a microcomputerized postage meter of the present invention;

FIG. 1*b* is a perspective view of the housing for the computerized postage meter of FIG. 1*a;*

FIG. 1*c* is an enlarged plan view of the keyboard and display shown in FIG. 1*b;*

FIG. 1*d* is a block diagram of the LSI components making up the postage meter of the invention;

Figure 3:
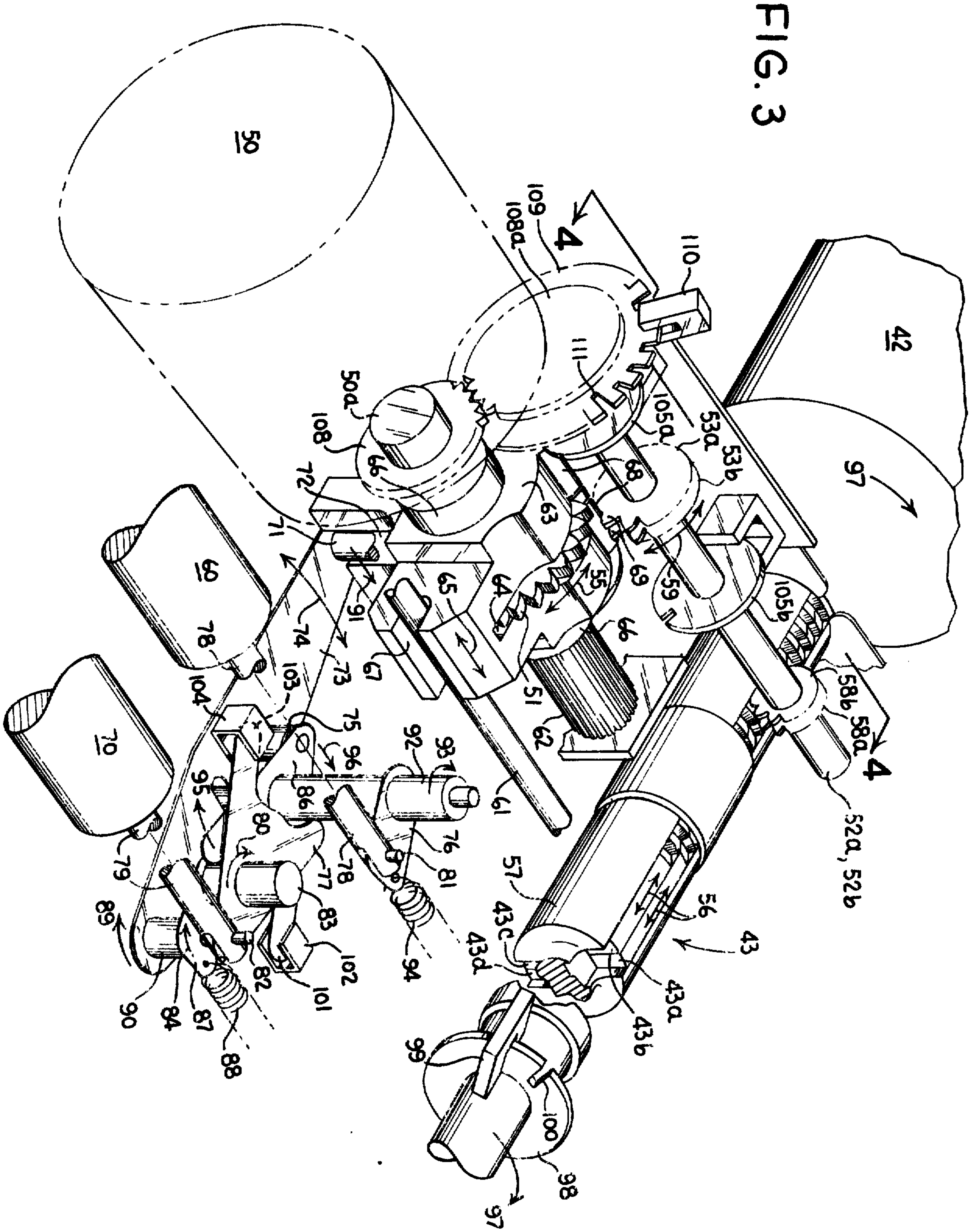
FIG. 3 is a perspective view of the postage setting and printing apparatus for the computerized postage meter of FIG. 1*b;*
Figure 4A:
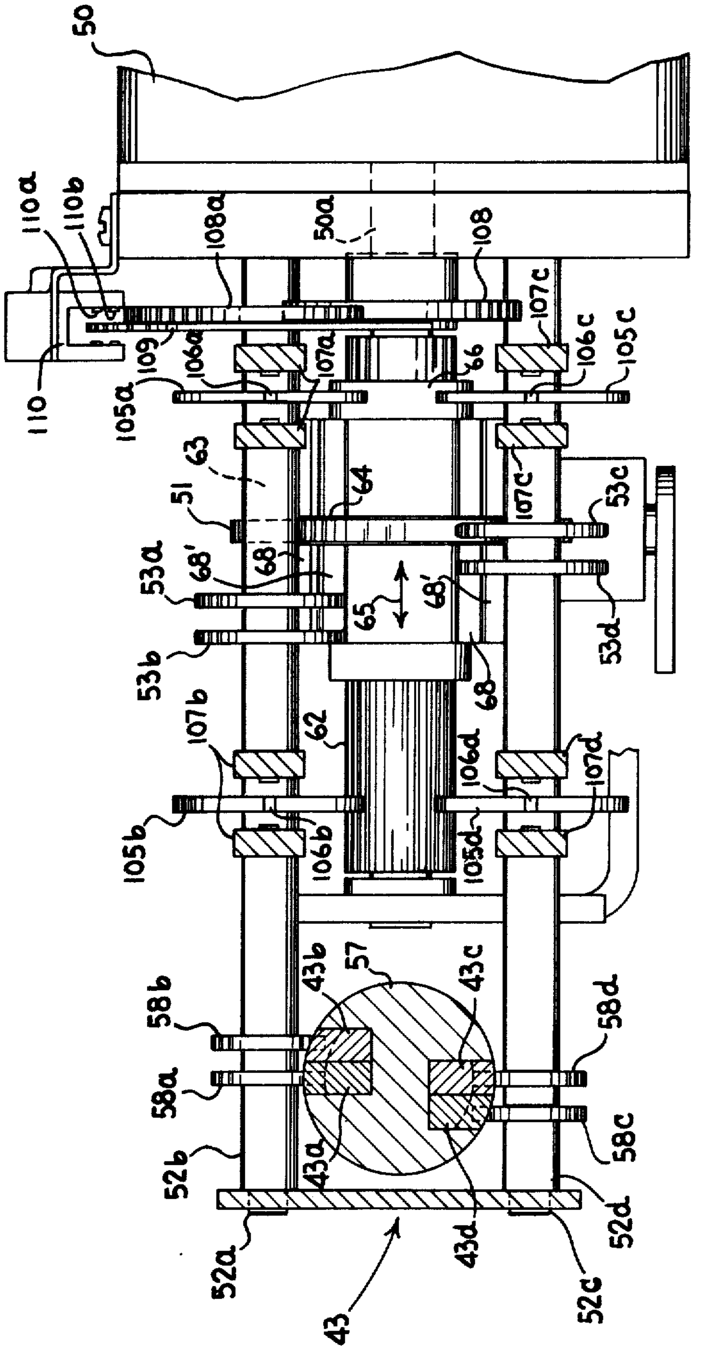
Figure 8A:
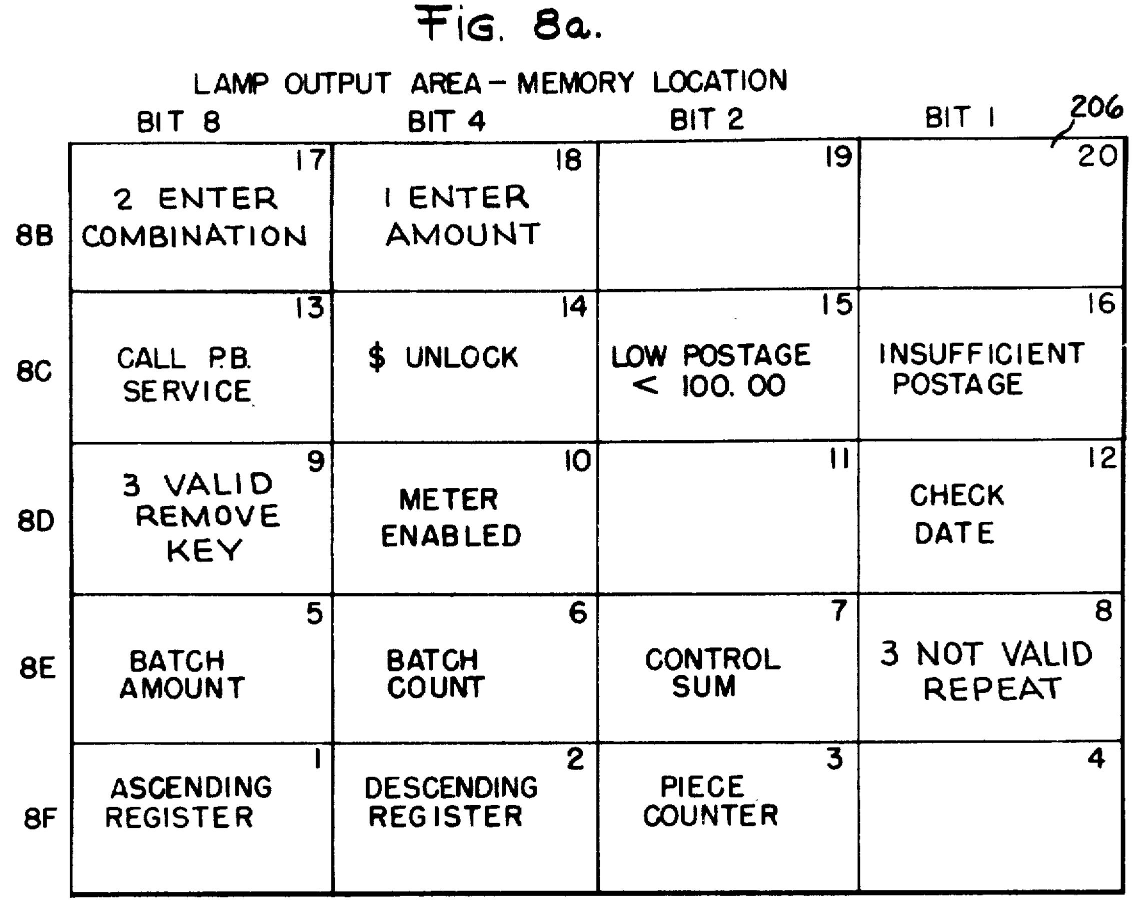
Figure 6:
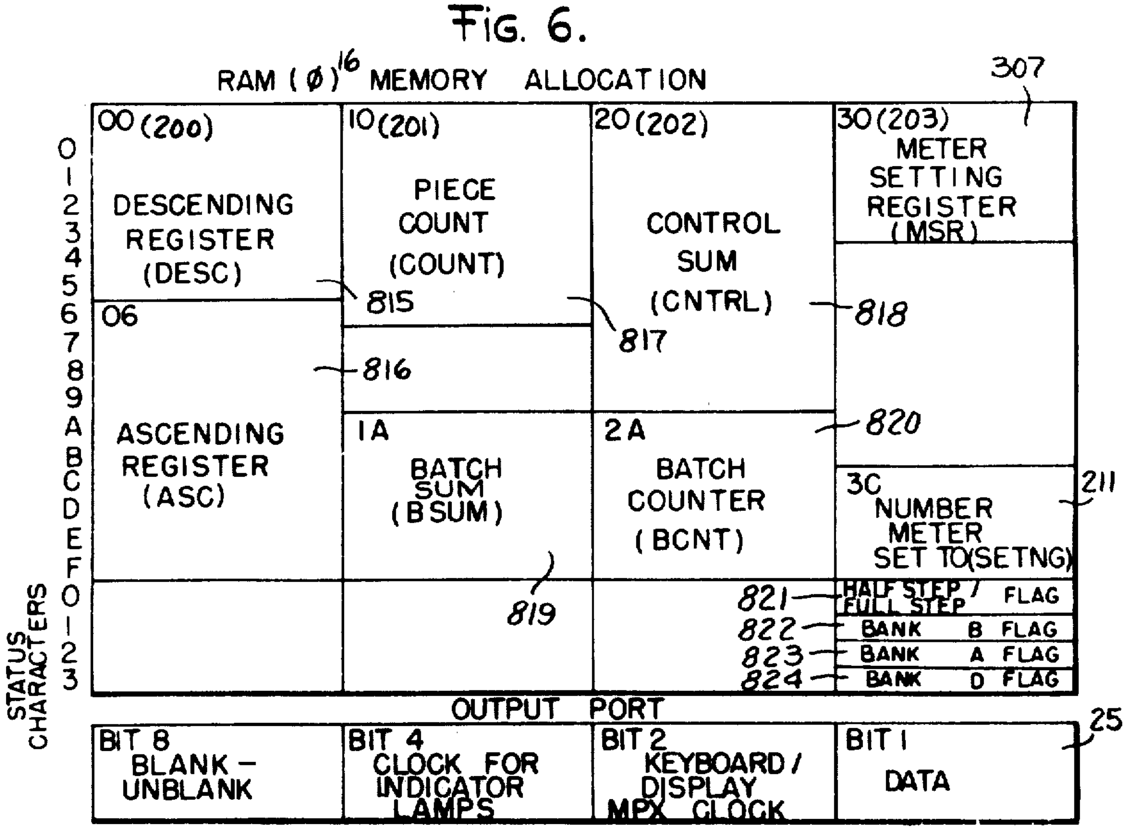
Figure 7:
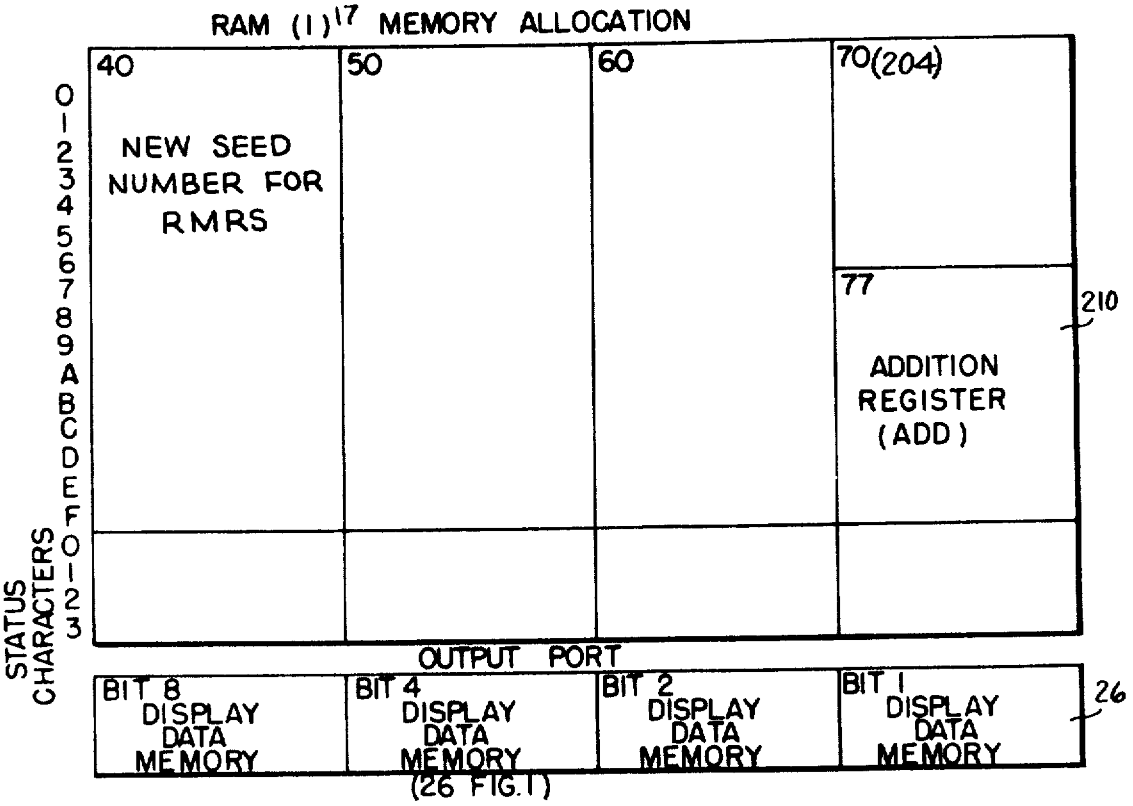
Figure 8:
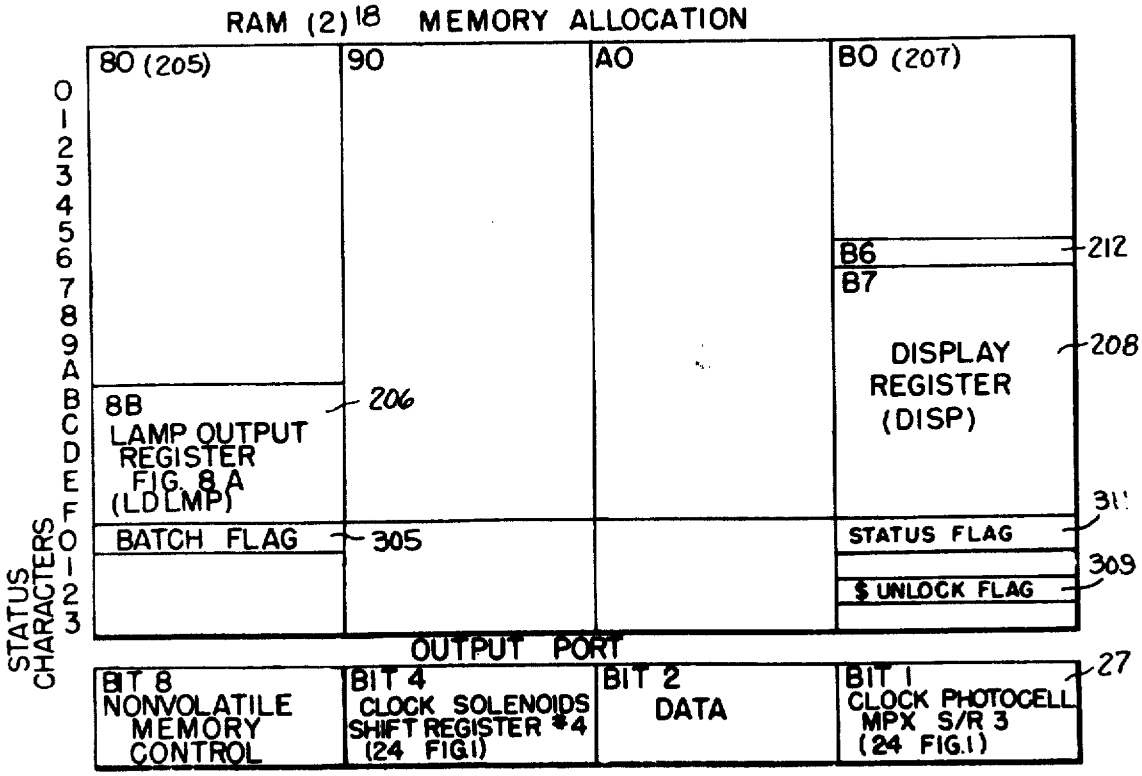
Figure 9:
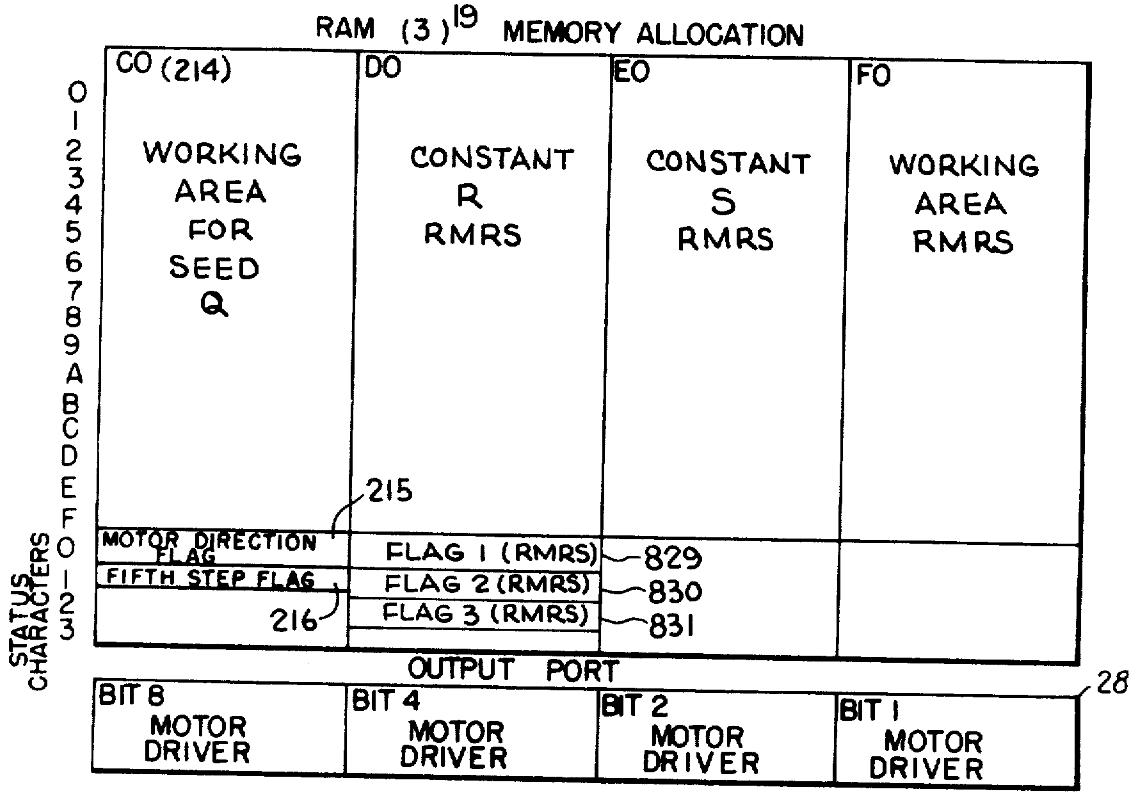
Figure 10:
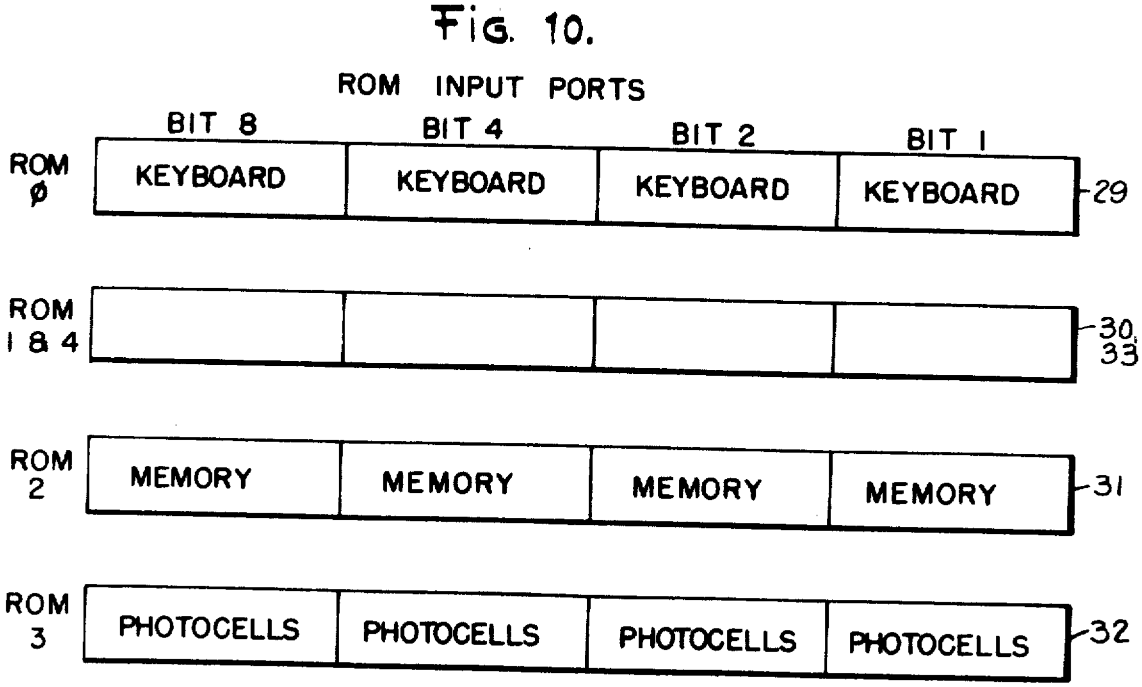

FIG. 4*a* is a side view of the setting and printing apparatus of FIG. 3 as taken along lines 4—4;

FIG. 4*b* is an enlarged partially cutaway perspective view of the yoke, main gear, and splined shaft of the setting mechanism of FIG. 3;

FIG. 5 is a front view of FIG. 4*a* with a section cutaway to show the intermeshing relationships between various geared parts;

FIG. 6 is a schematic view of the memory allocation shown for RAM(φ)16 of FIG. 1*d* and its associated output port;

FIG. 7 is a schematic view of the memory allocation depicted for RAM(1)17 of FIG. 1*d* and its associated output port;

FIG. 8 is a schematic view of the memory allocation illustrated for RAM(2)18 of FIG. 1*d* and its associated output port;

FIG. 8*a* is a more detailed schematic view of a portion of the memory allocation shown in FIG. 8;

FIG. 9 is a schematic view of the memory allocation shown for RAM(3)19 of FIG. 1*d* and its associated output port;

FIG. 10 is a schematic view of the ROM input ports of FIG. 1*d;*

Figure 2:
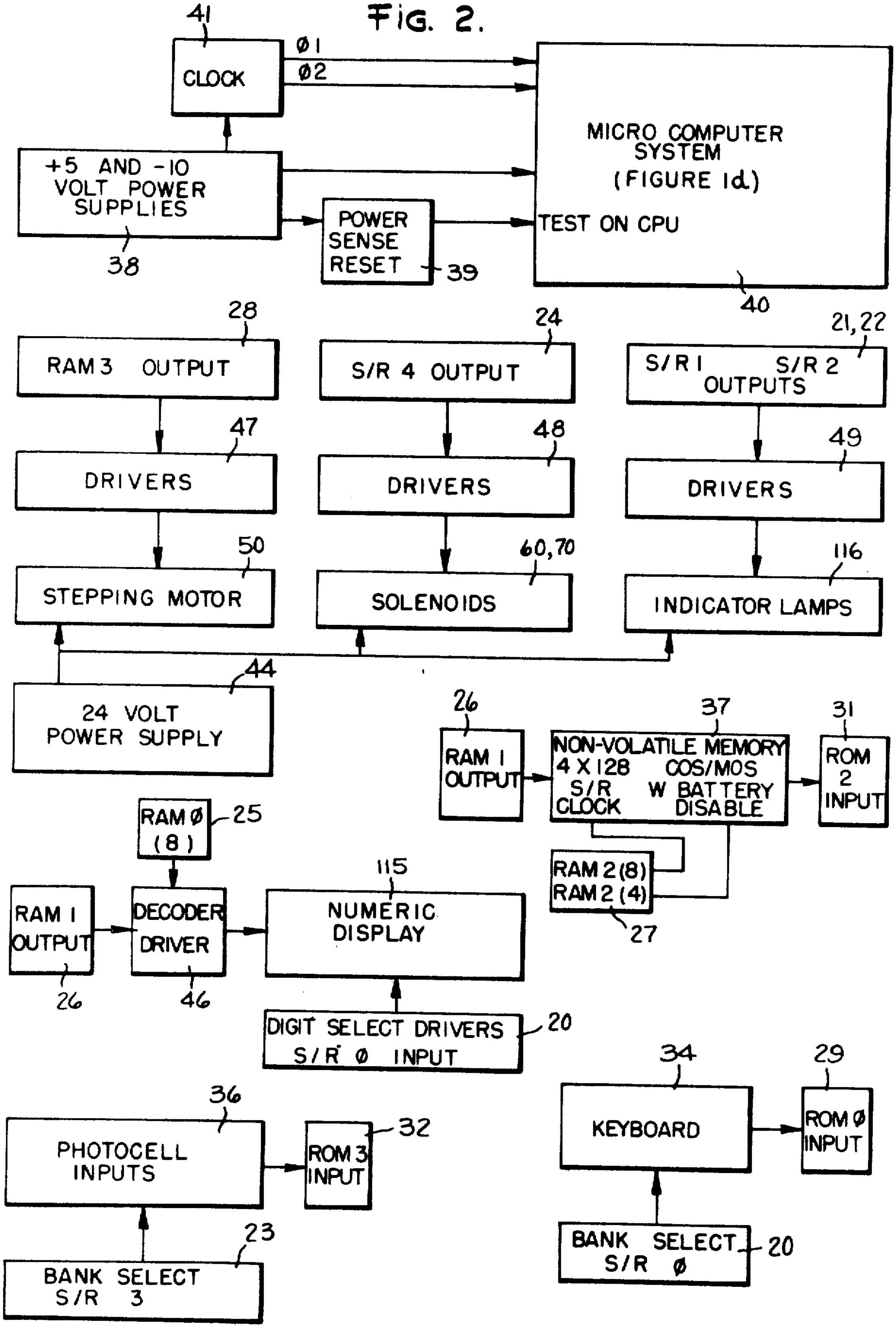
FIG. 2 is a block diagram of the peripheral components for the computerized meter of FIG. 1*d;*
Figure 11:
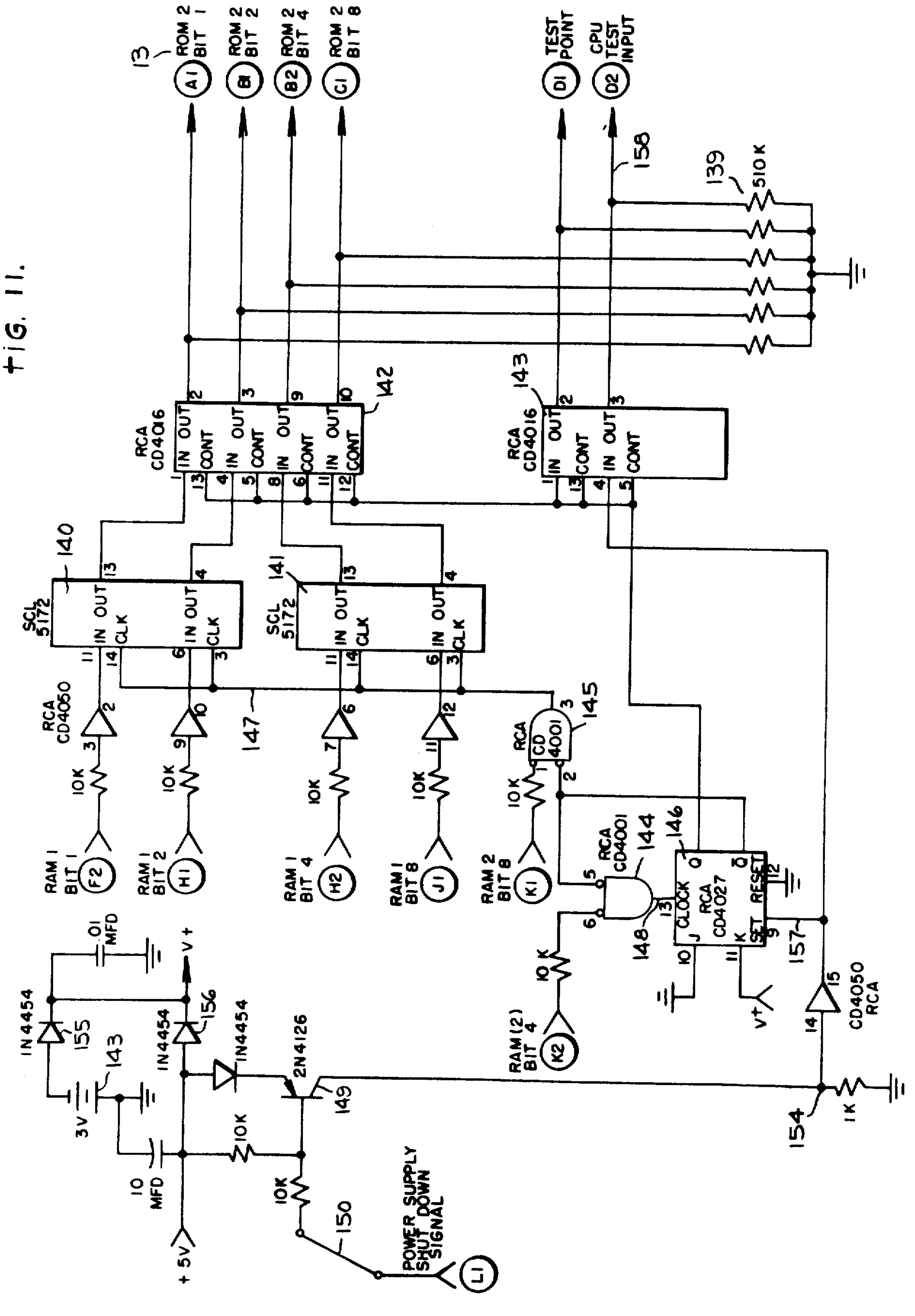

FIG. 11 is an electrical schematic for the non-volatile memory circuitry of FIG. 2;

FIG. 12*a* is an electrical schematic of the monitoring circuit for the −10 volt power supply for the system of FIG. 1*d;*

FIG. 12*b* is an electrical schematic of the monitoring circuit for the +5 volt power supply for the system of FIG. 1*d;*

FIG. 13 is an electrical schematic of the reset circuitry for the system of FIG. 1*d;*

Figure 14B:
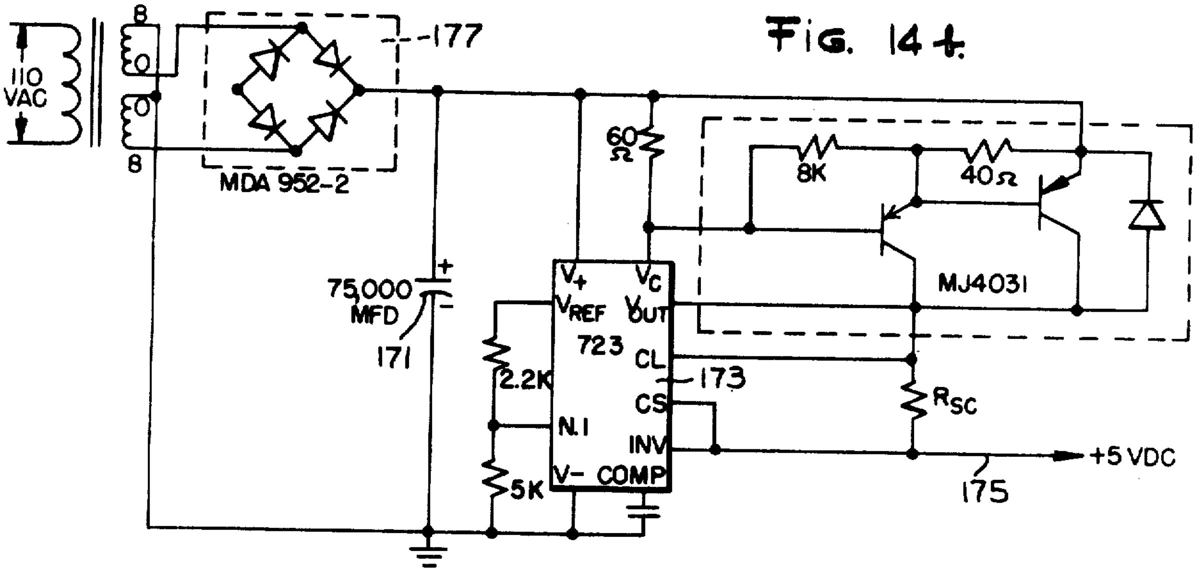
Figure 14A:
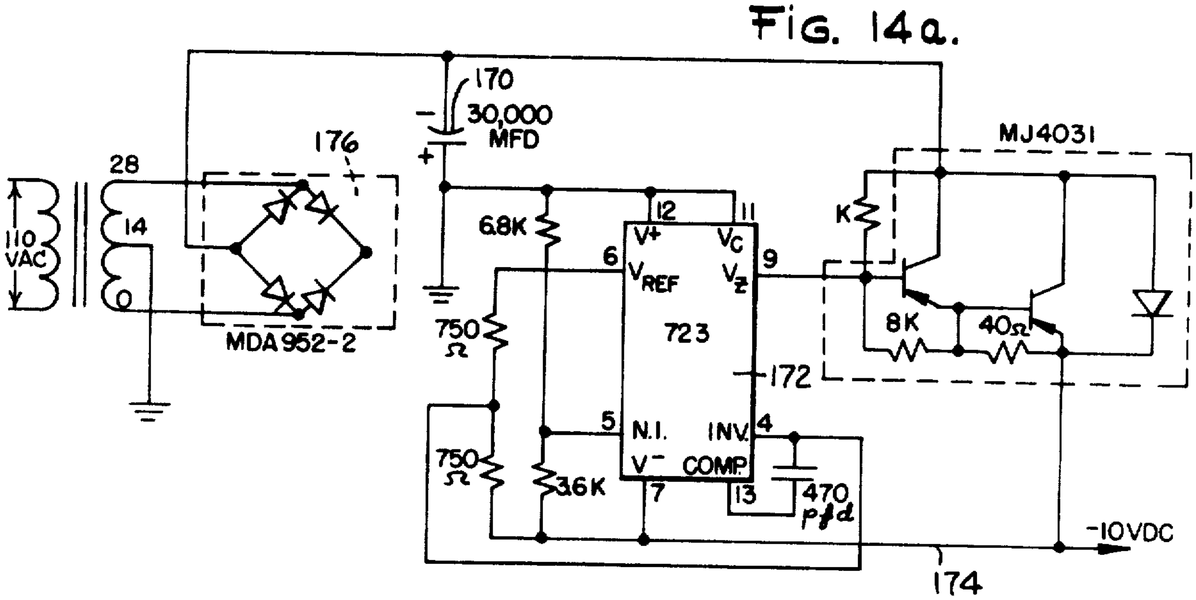

FIG. 14*a* is an electrical schematic for the −10 volt power supply for the system of FIG. 1*d;*

FIG. 14*b* is an electrical schematic for the +5 volt power supply for the system of FIG. 1*d;*

Figure 1:
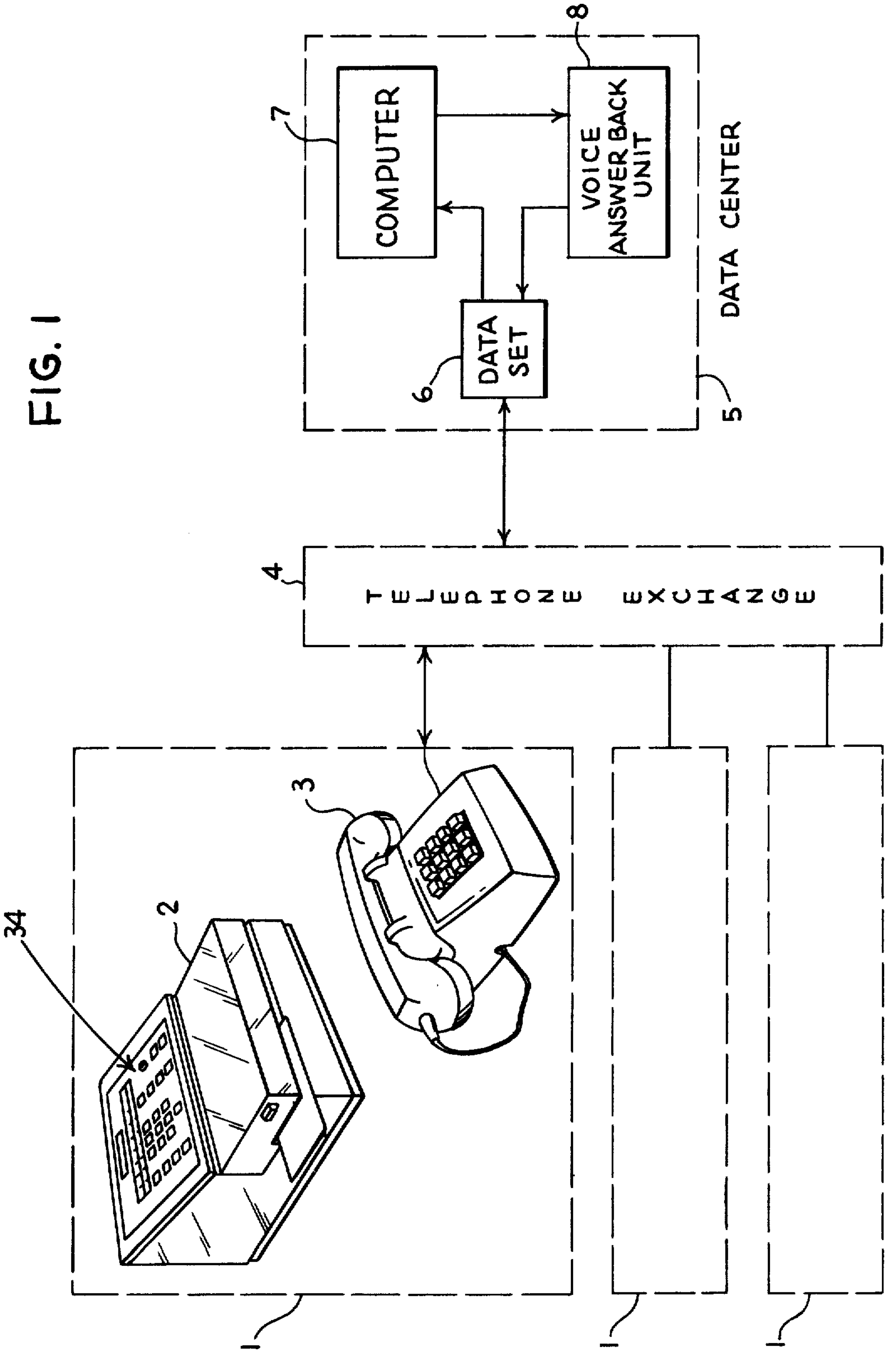
Figure 1A:
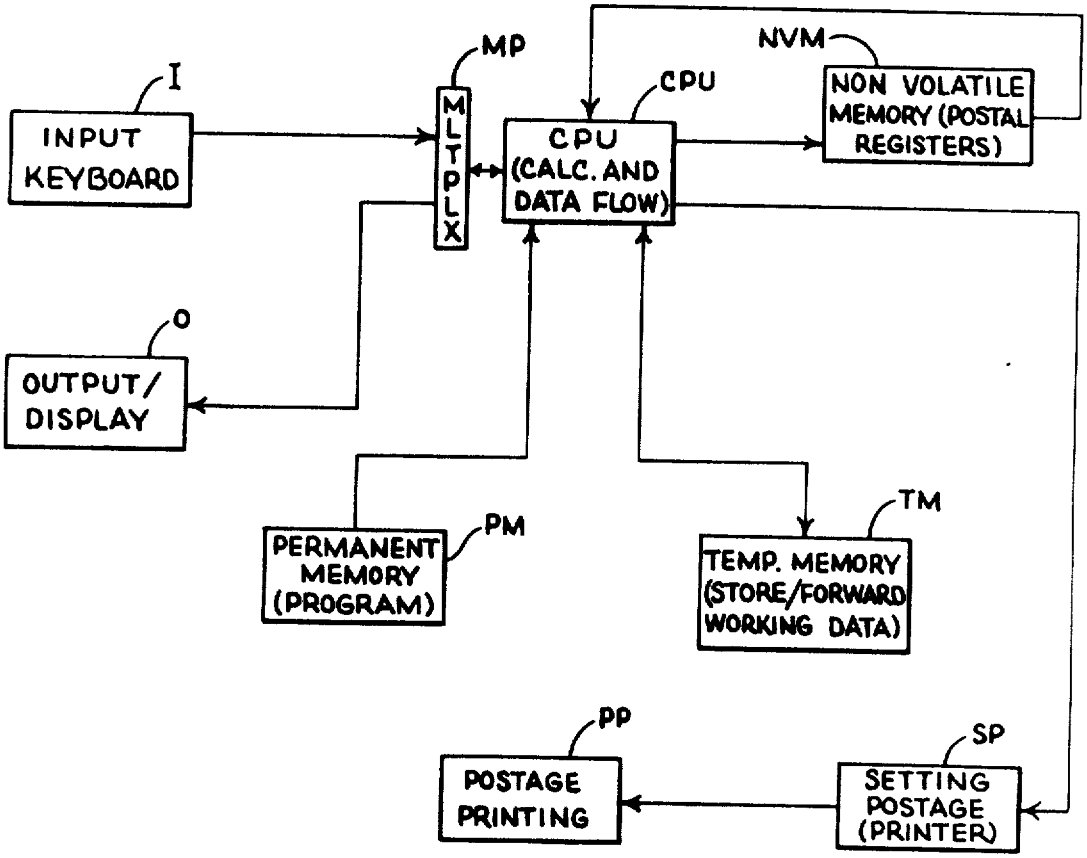
Figure 1B:
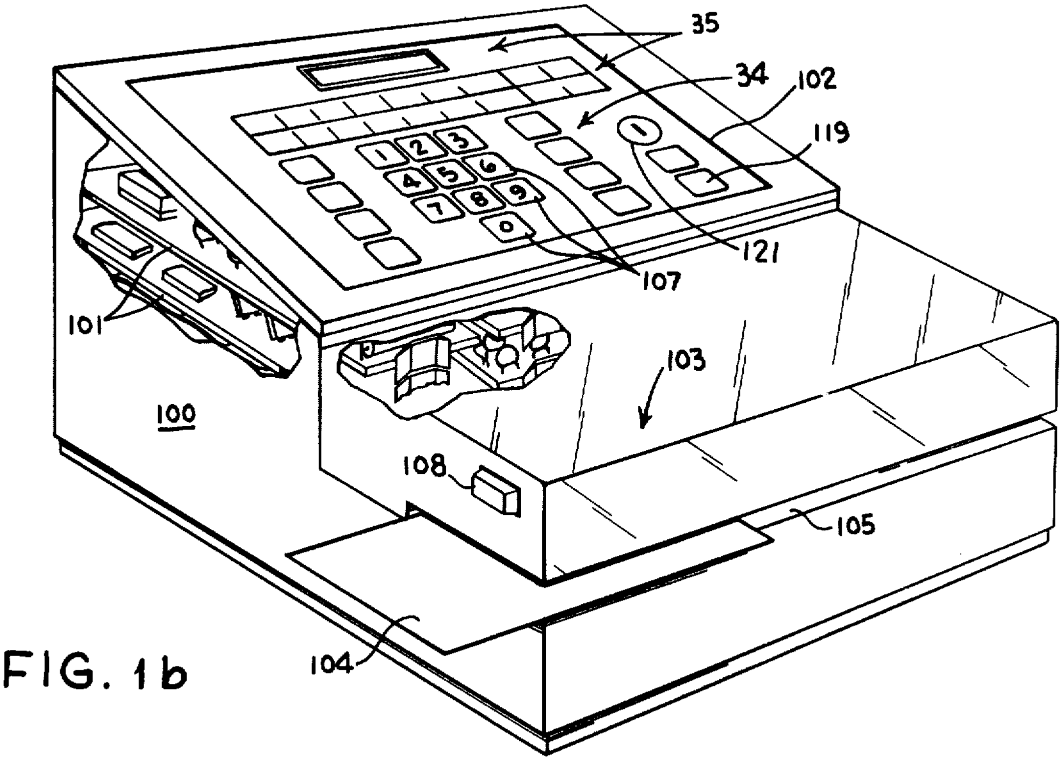
Figure 1C:
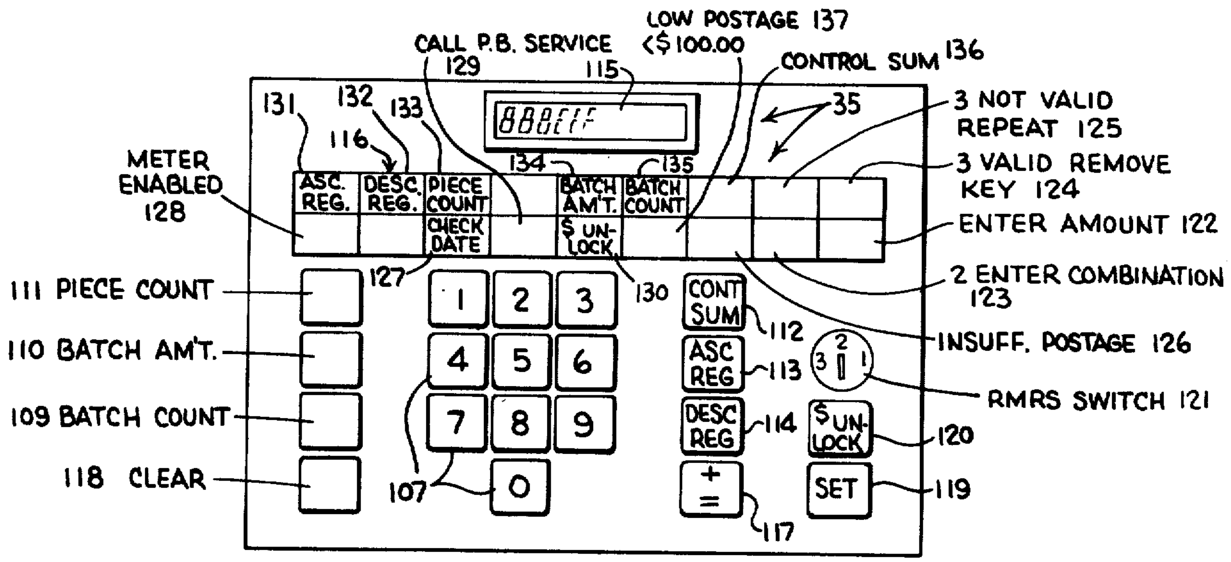
Figure 14C:
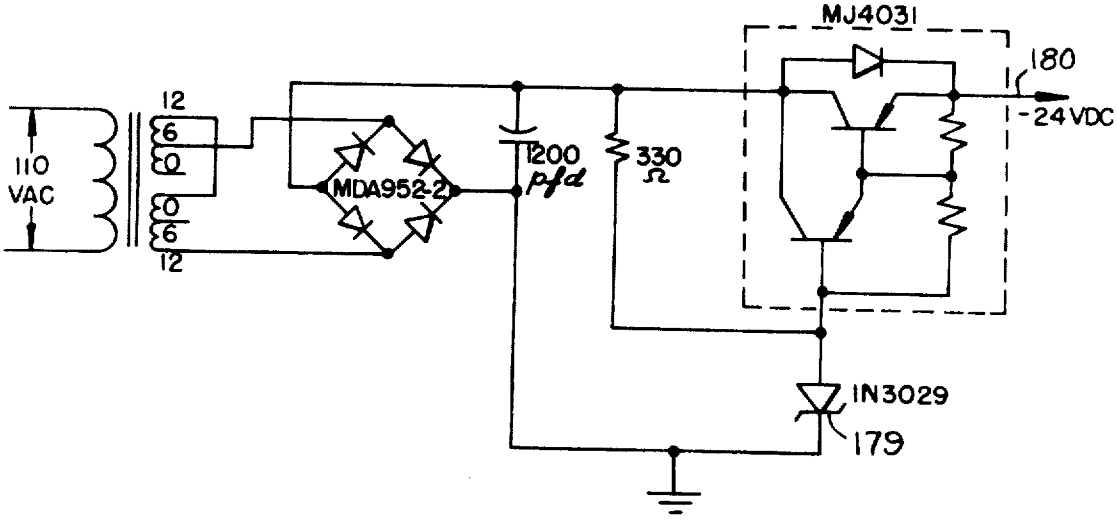
Figure 15:
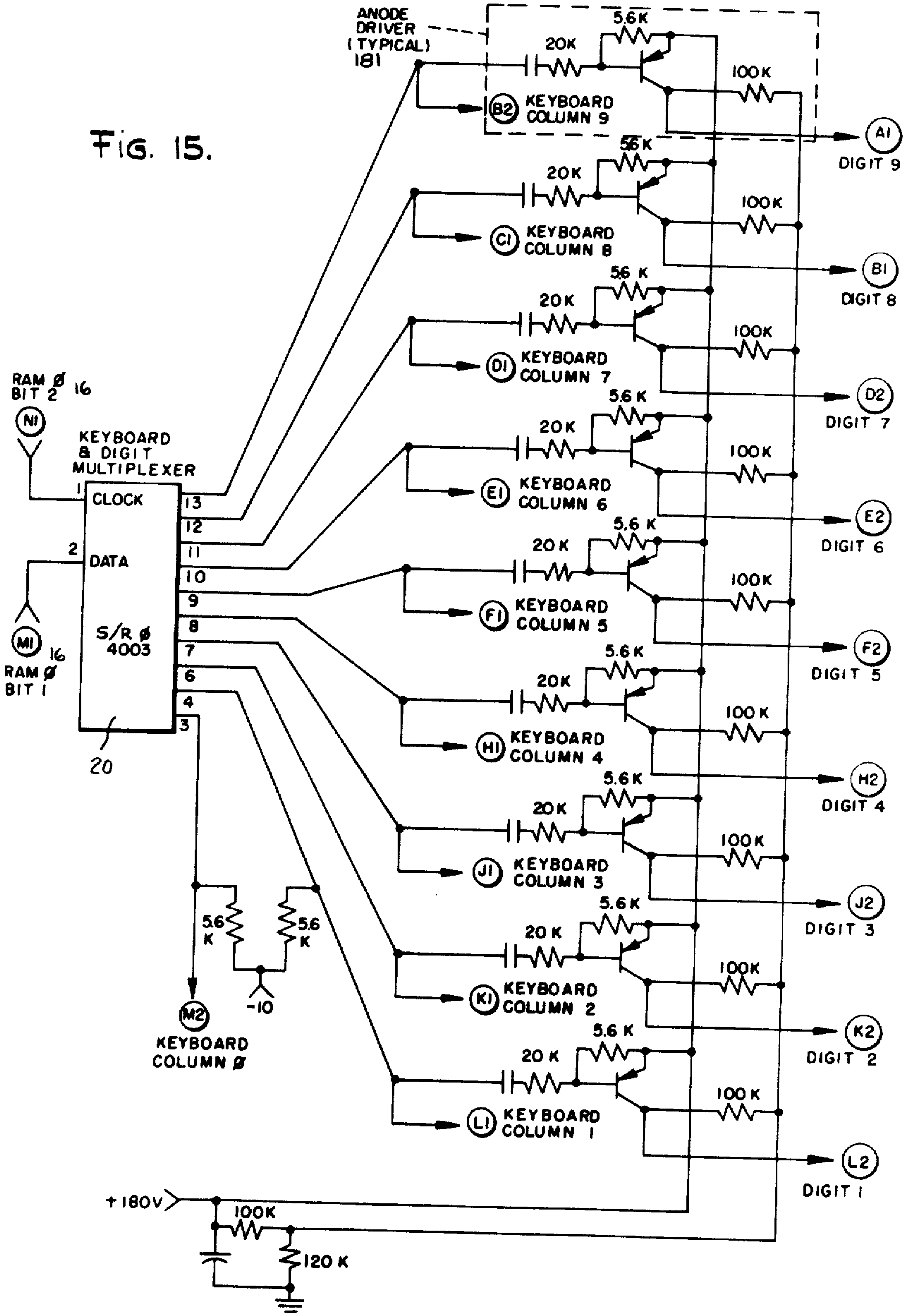

FIG. 14*c* is an electrical schematic for the −24 volt power supply for powering some of the peripheral components shown in FIG. 2;

FIG. 15 is an electrical schematic of the circuitry associated with the shift register (φ)20 of FIG. 1*d* for multiplexing the keyboard and the display of FIGS. 1*b* and 1*c;*

Figure 16:
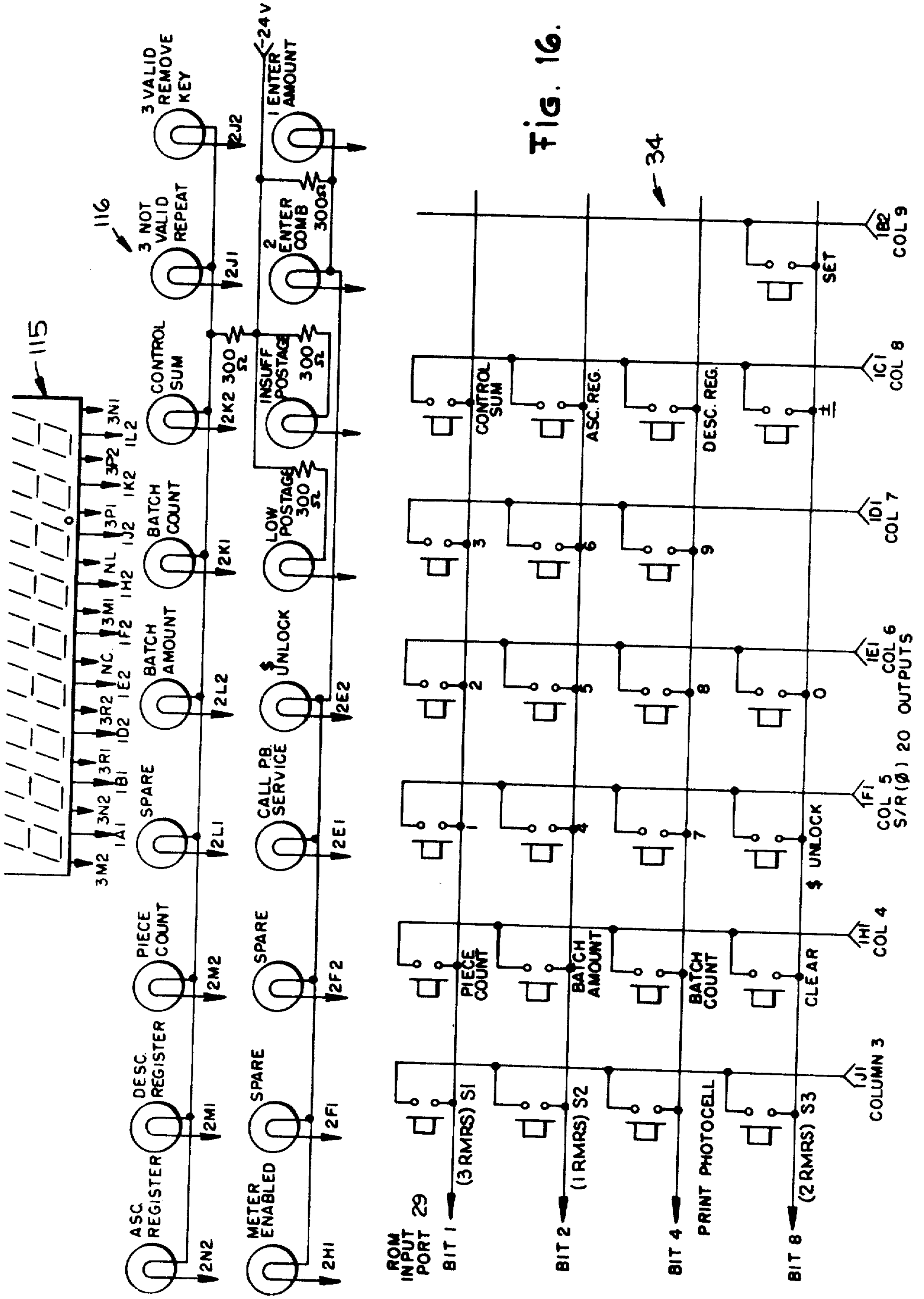

FIG. 16 is an electrical schematic of the keyboard and the display shown in FIGS. 1*b* and 1*c;*

Figure 17:
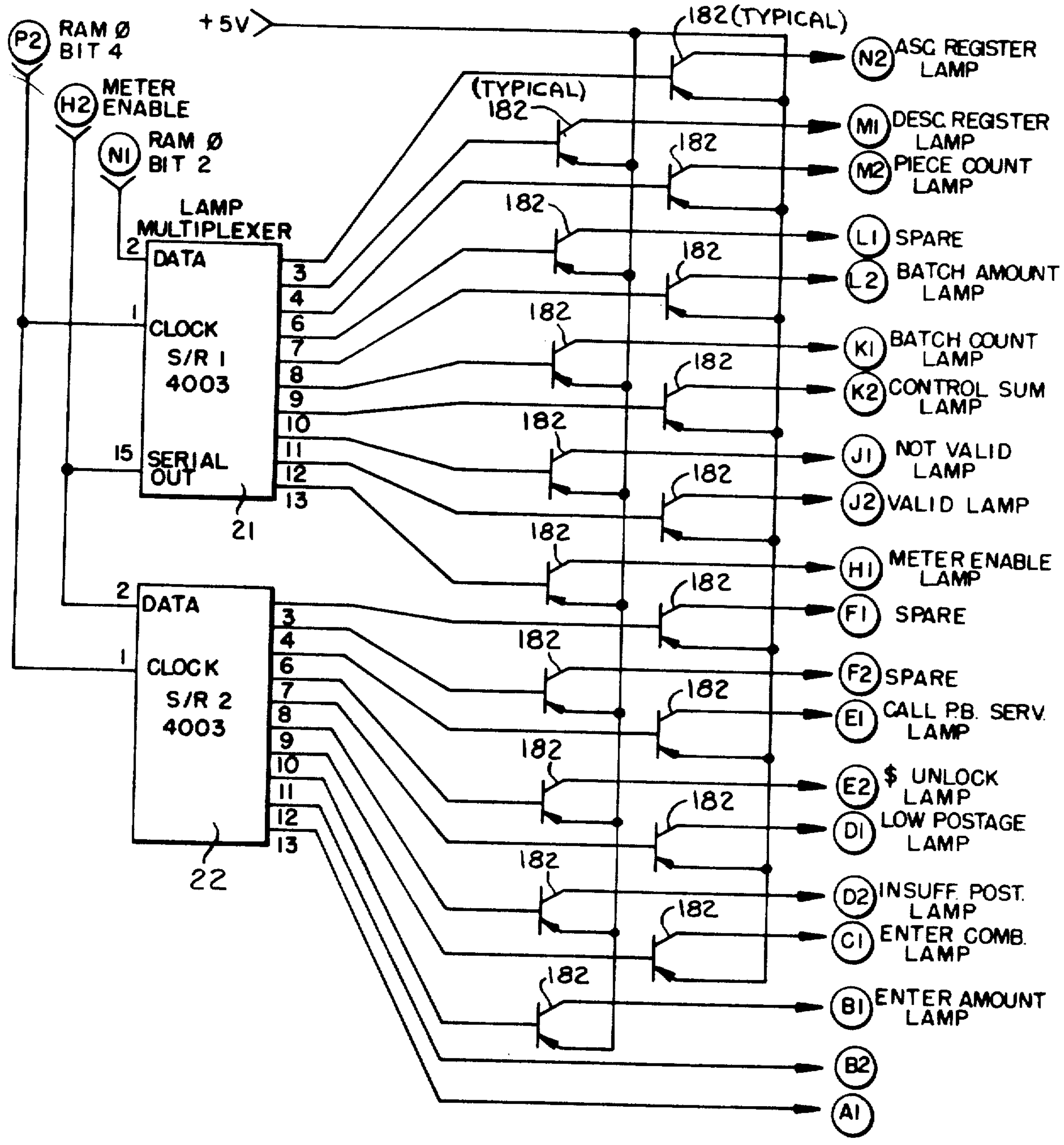
Figure 18:
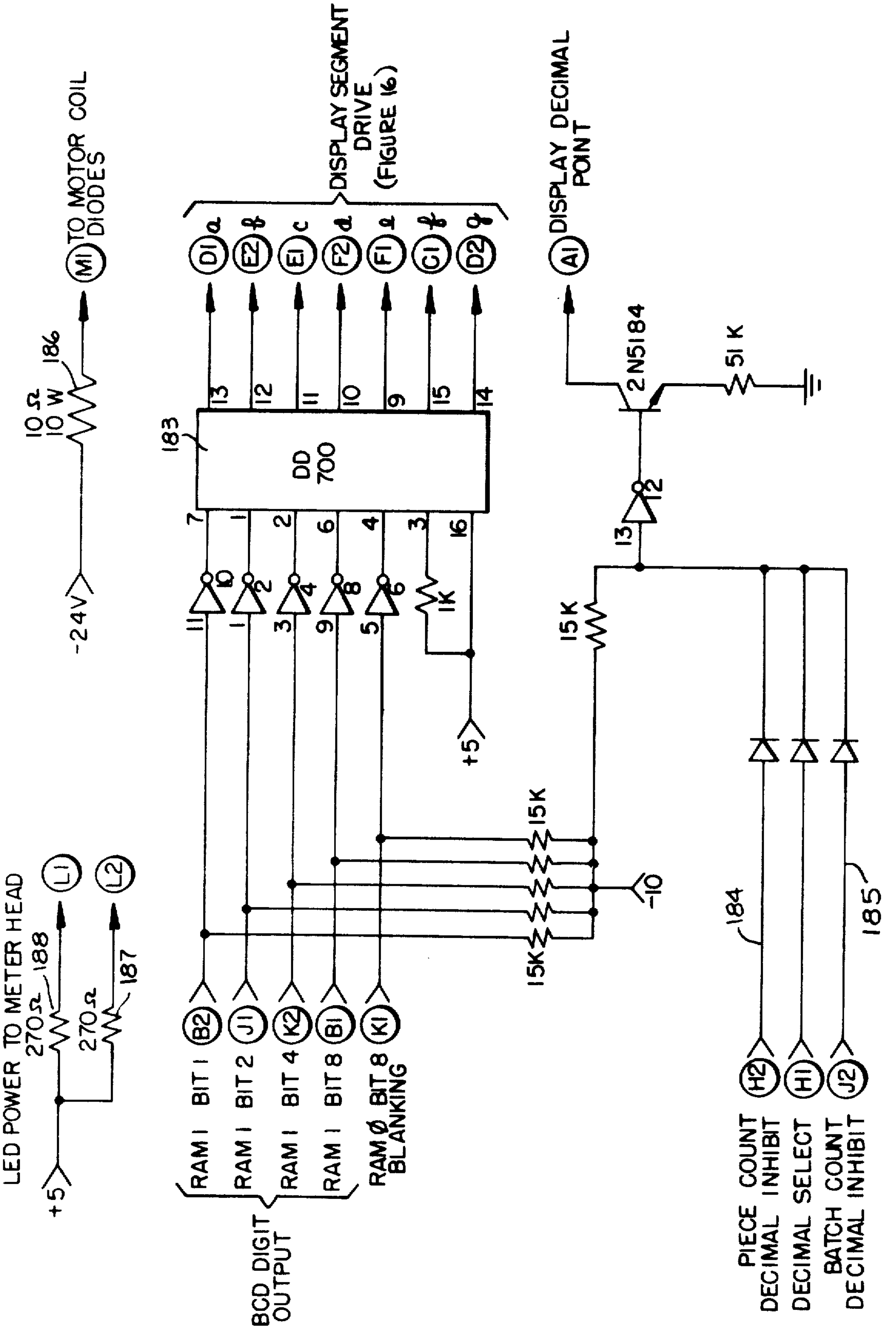
Figure 19:
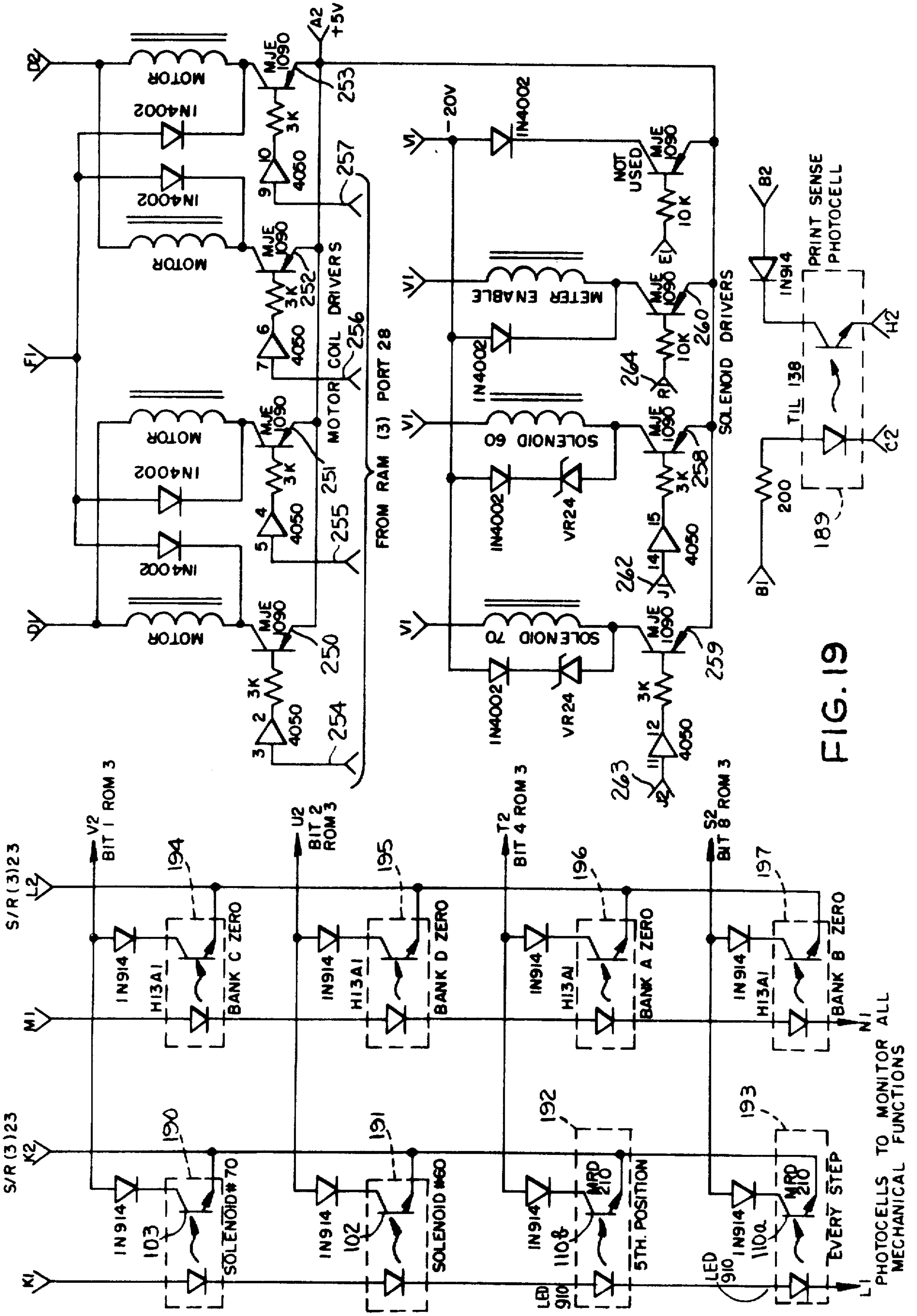
Figure 20:
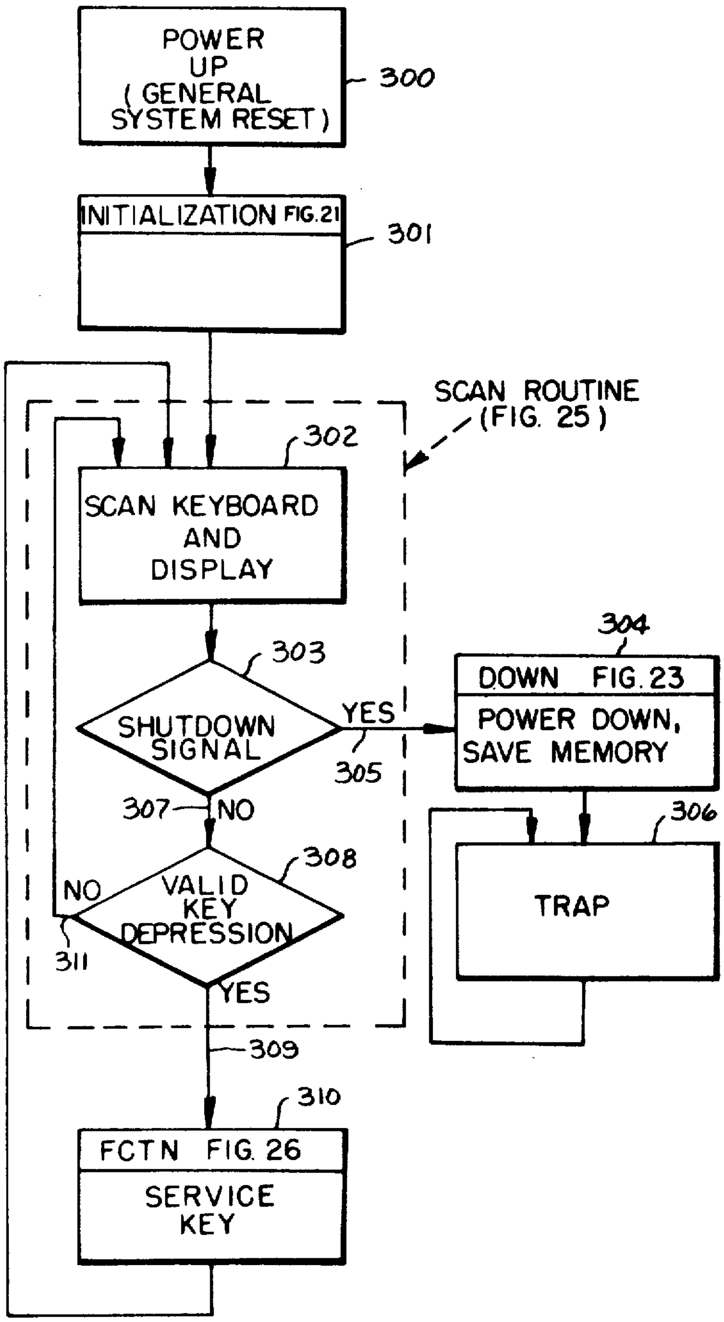
Figure 21:
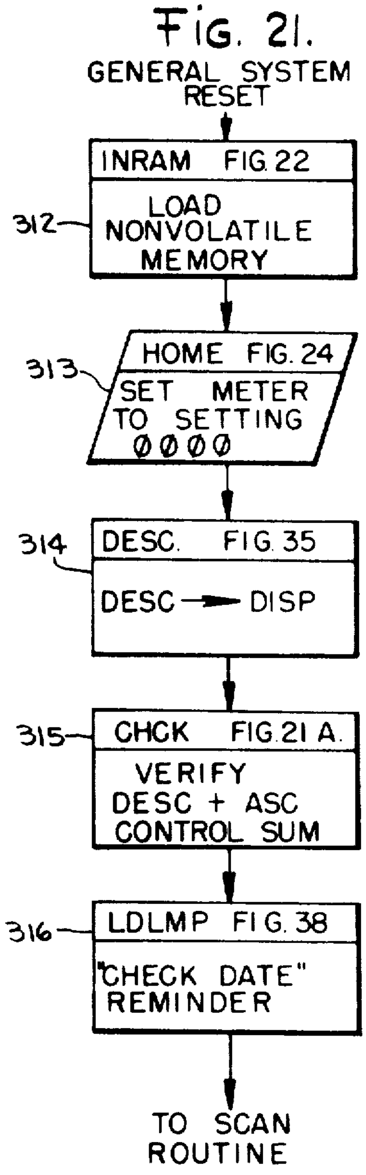
Figure 21A:
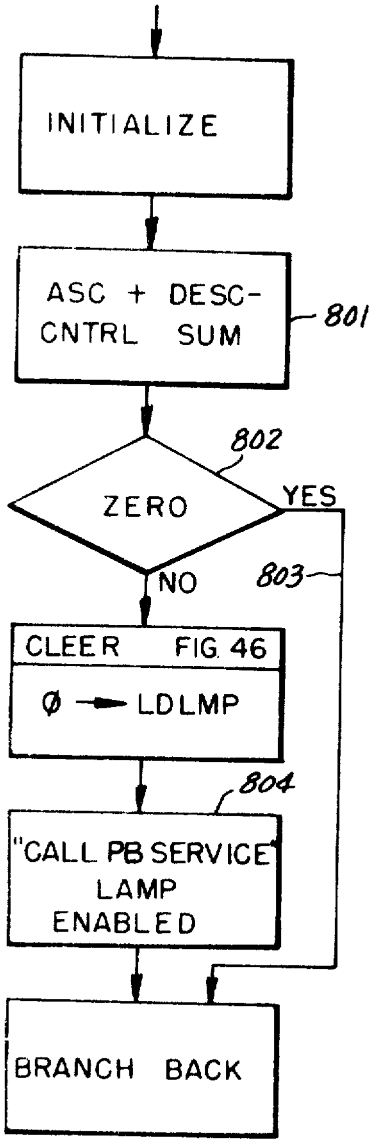
Figure 22:
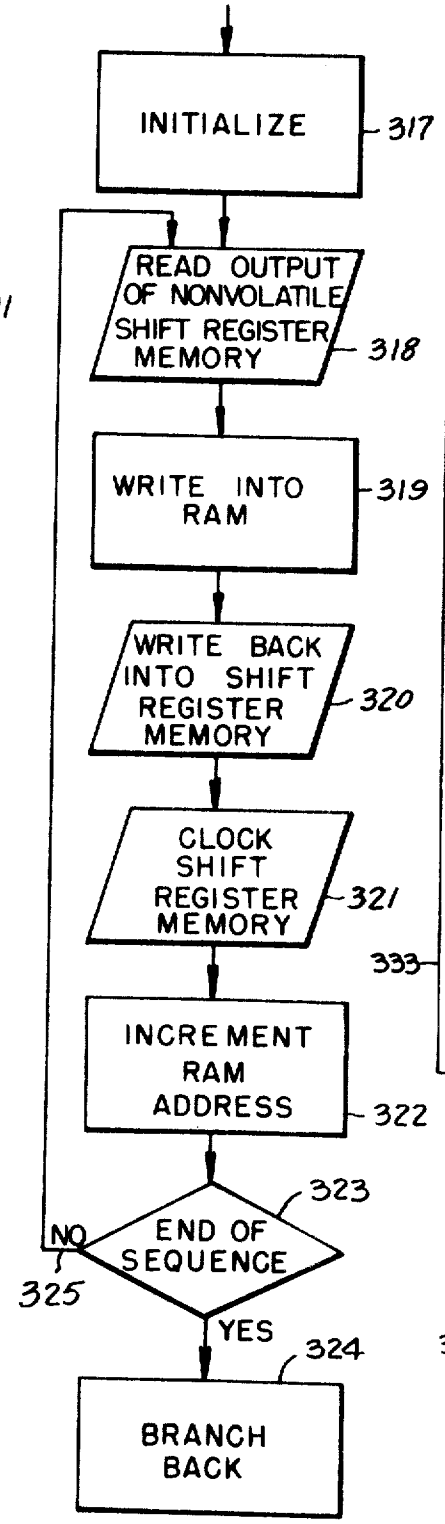
Figure 23:
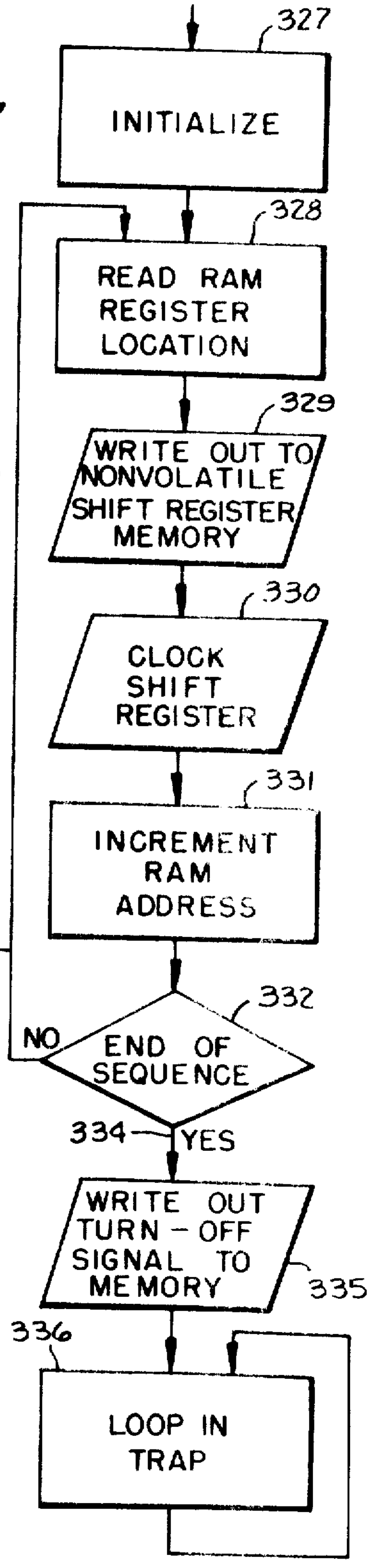
Figure 24:
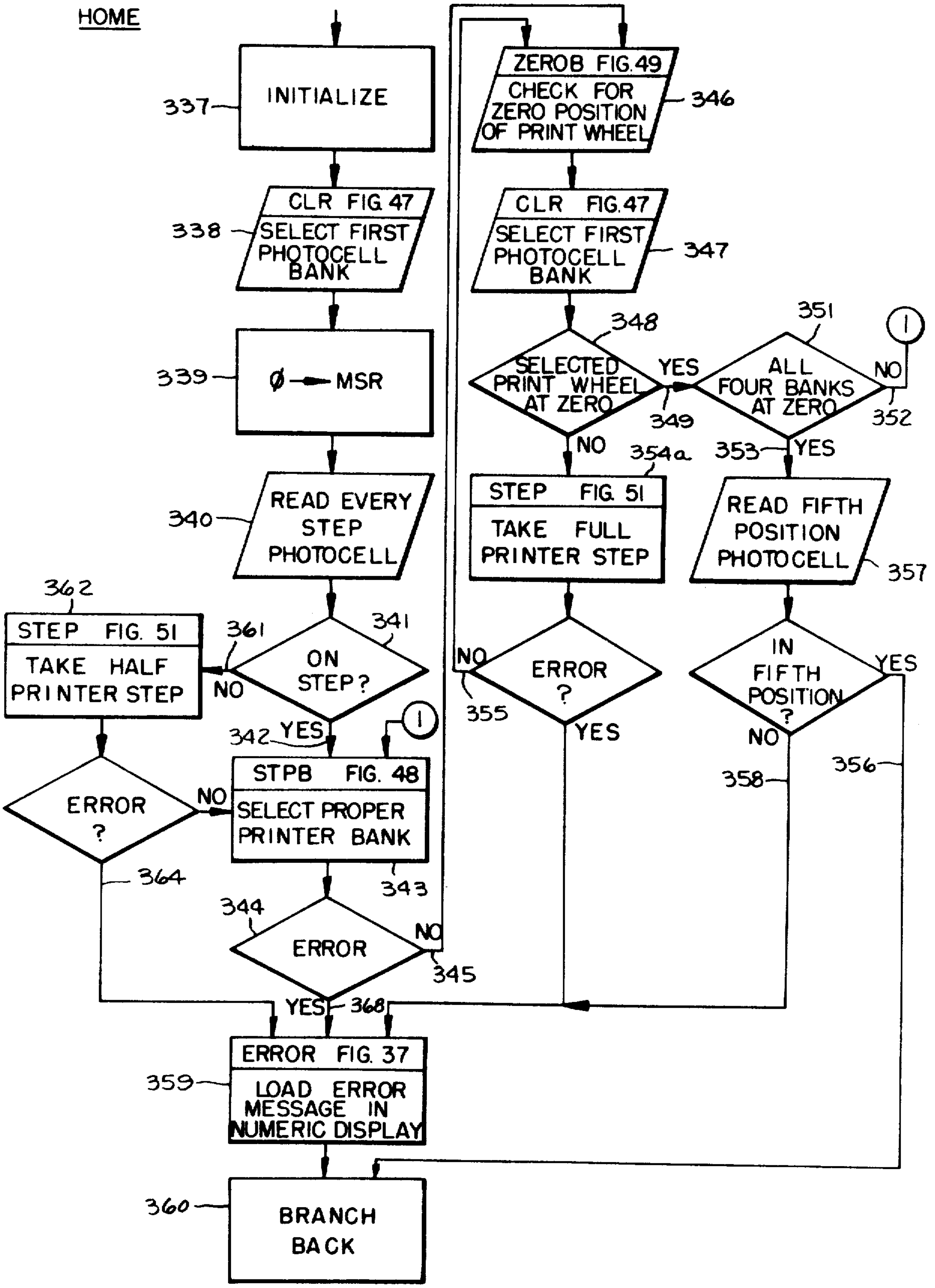
Figure 25:
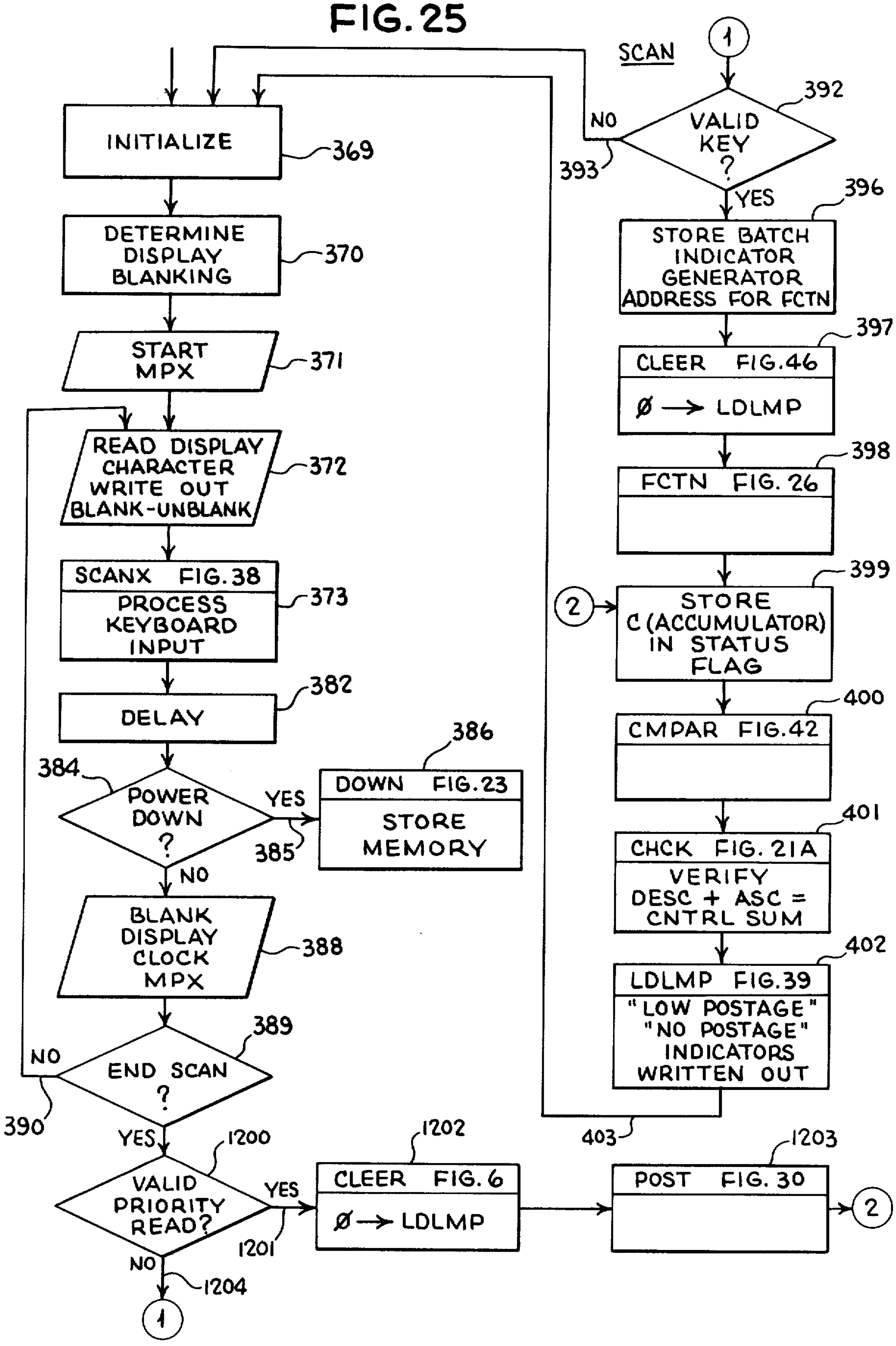
Figure 28:
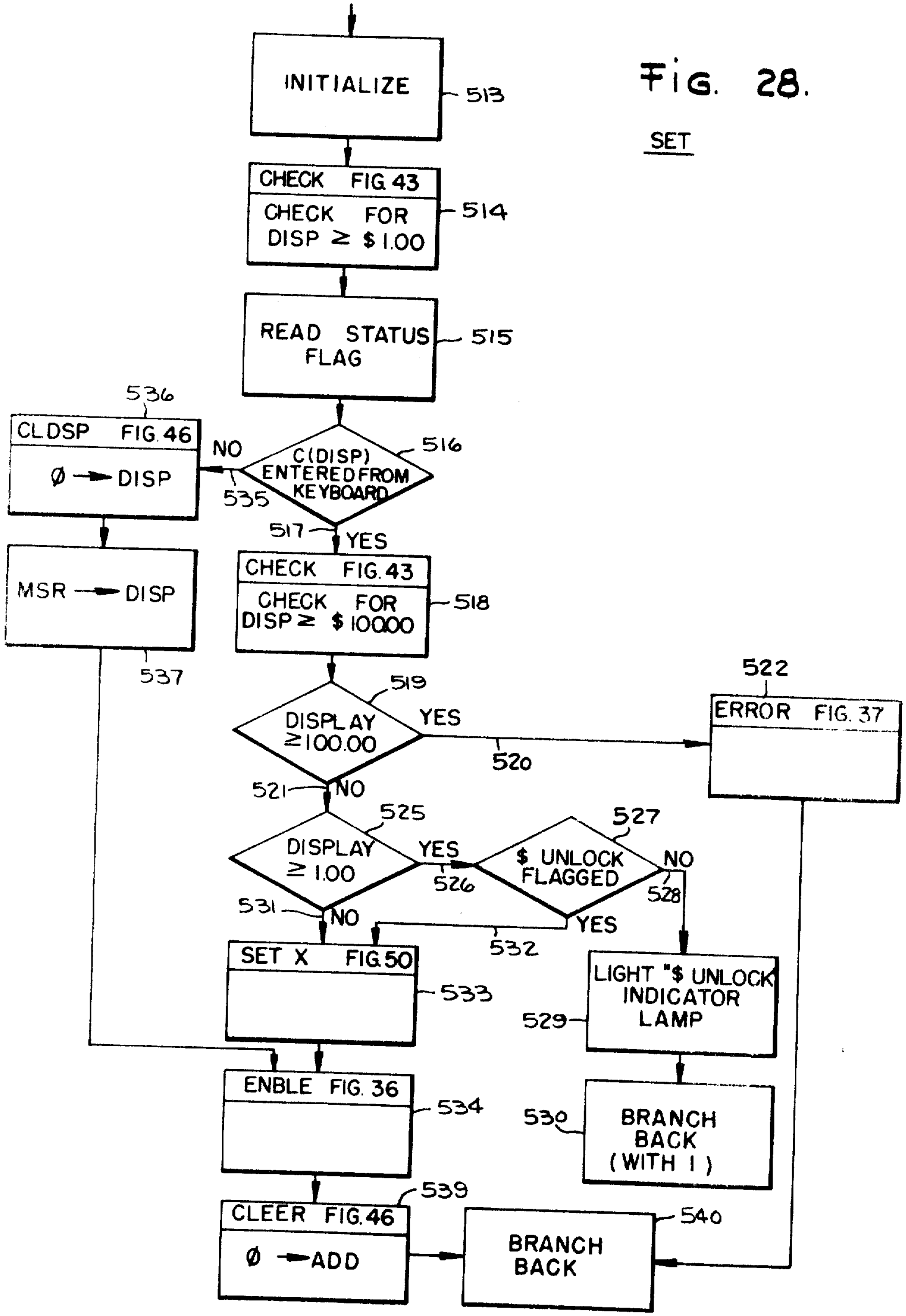
Figure 31:
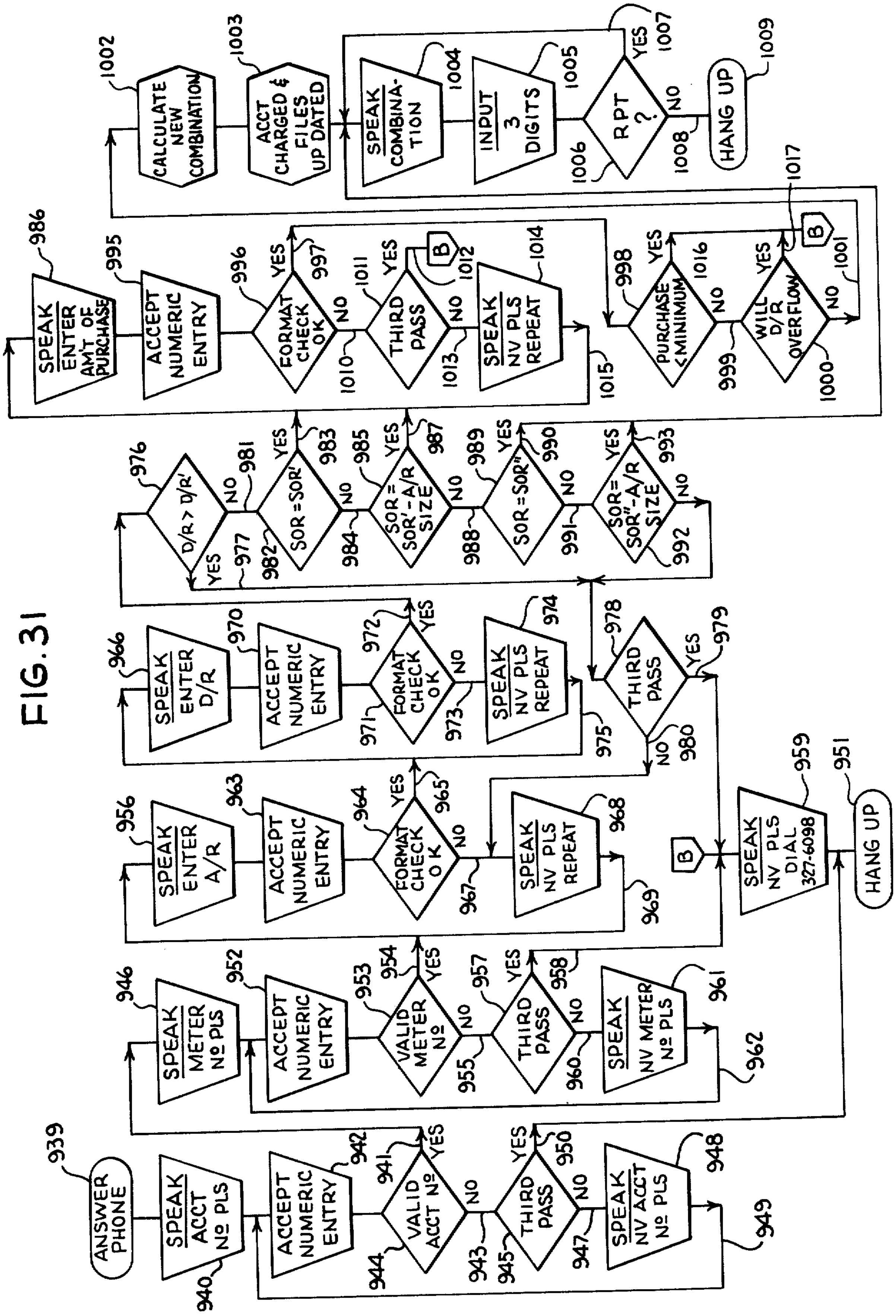
Figure 32:
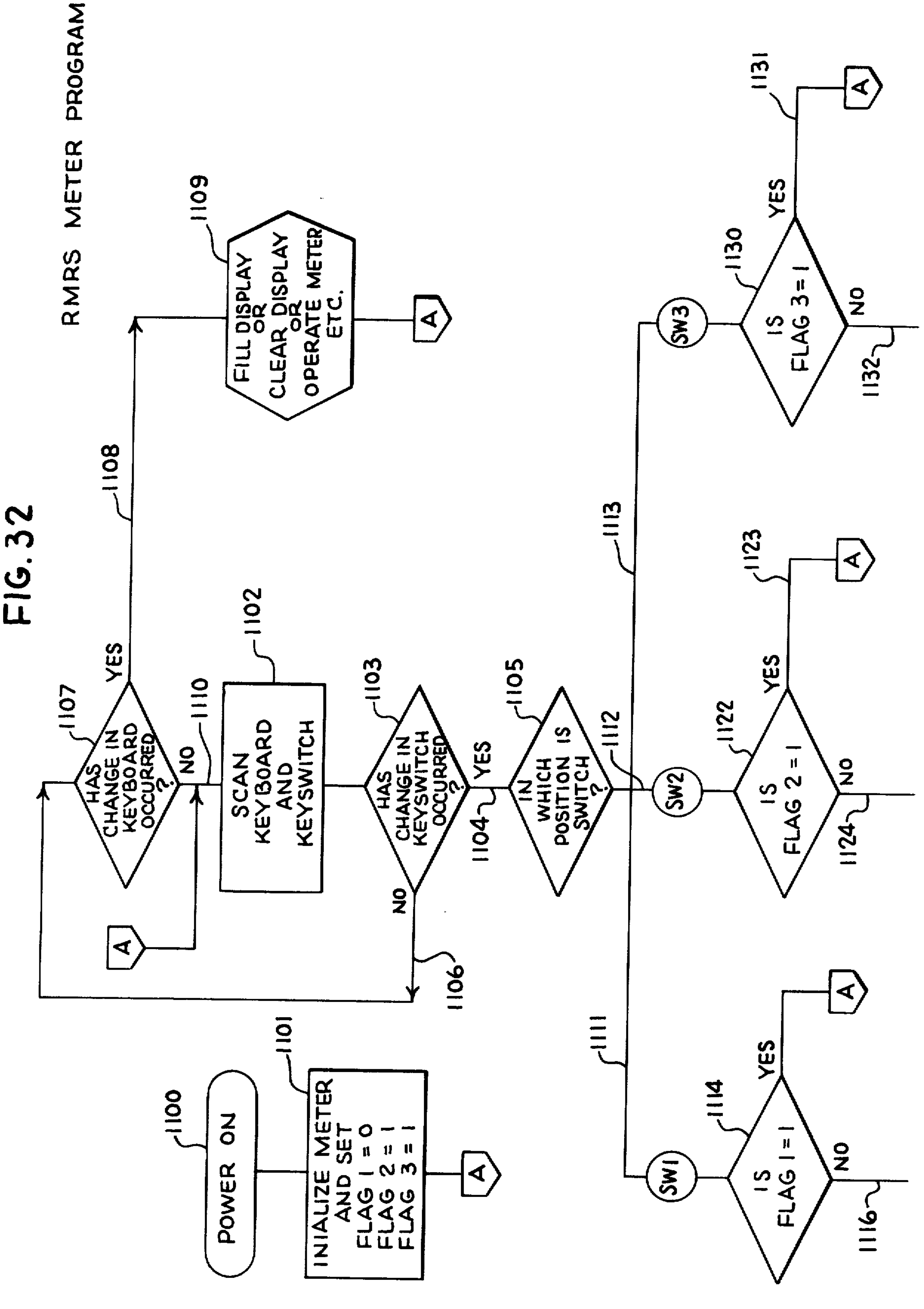
Figure 32A:
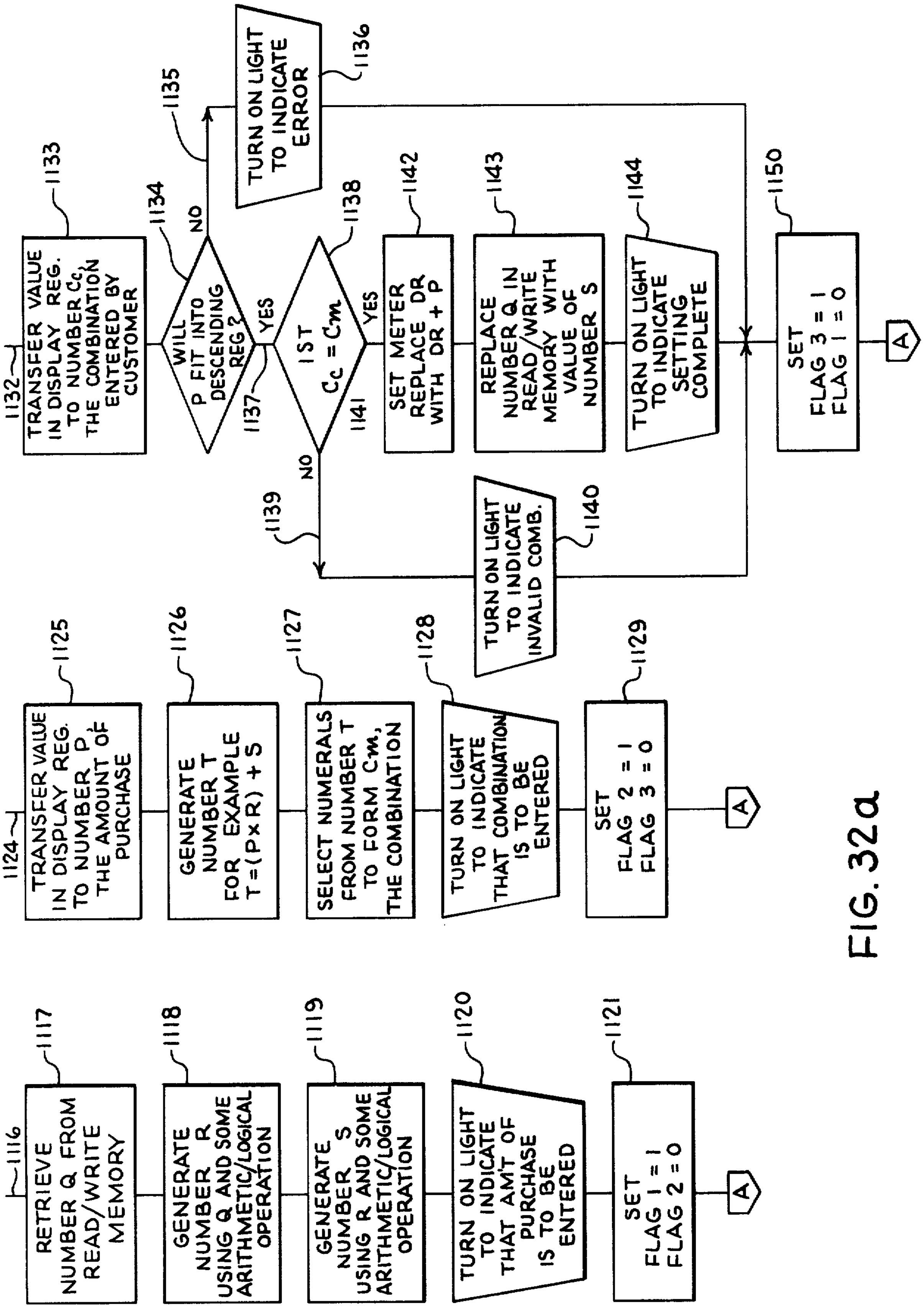
Figure 37:
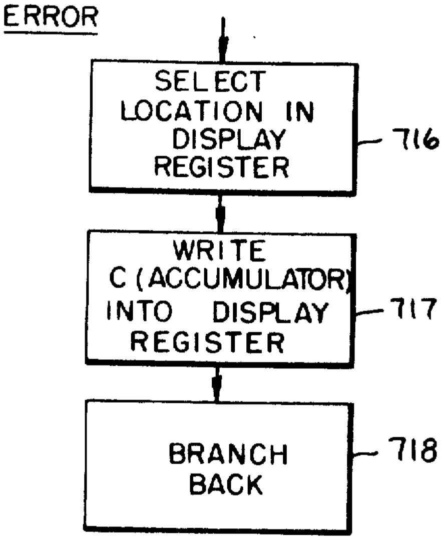
Figure 39:
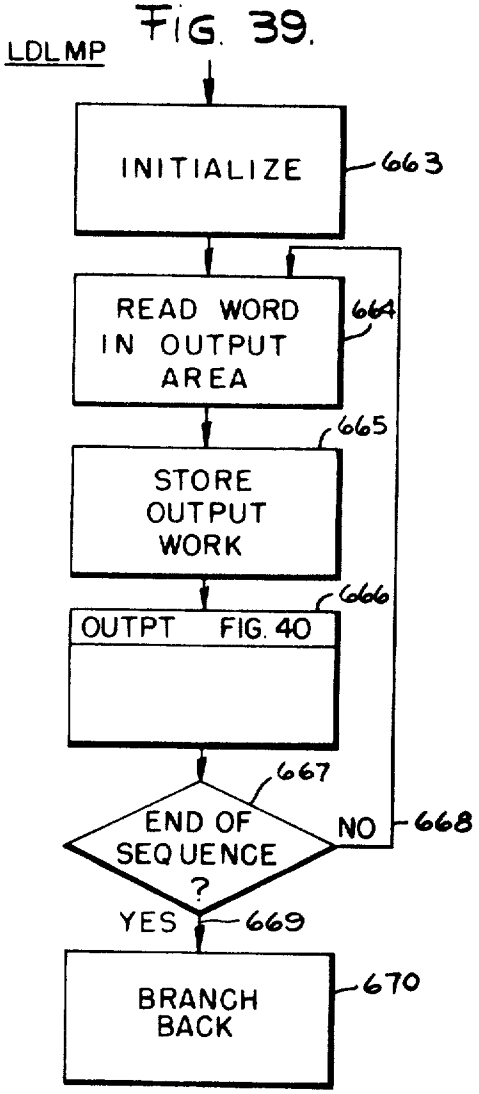
Figure 40:
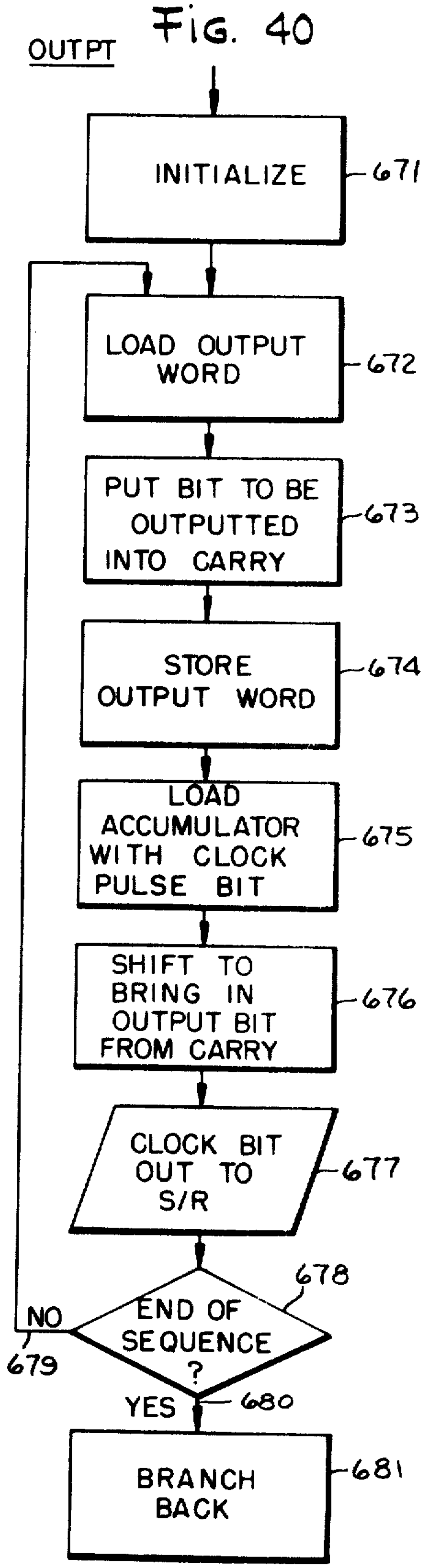
Figure 38:
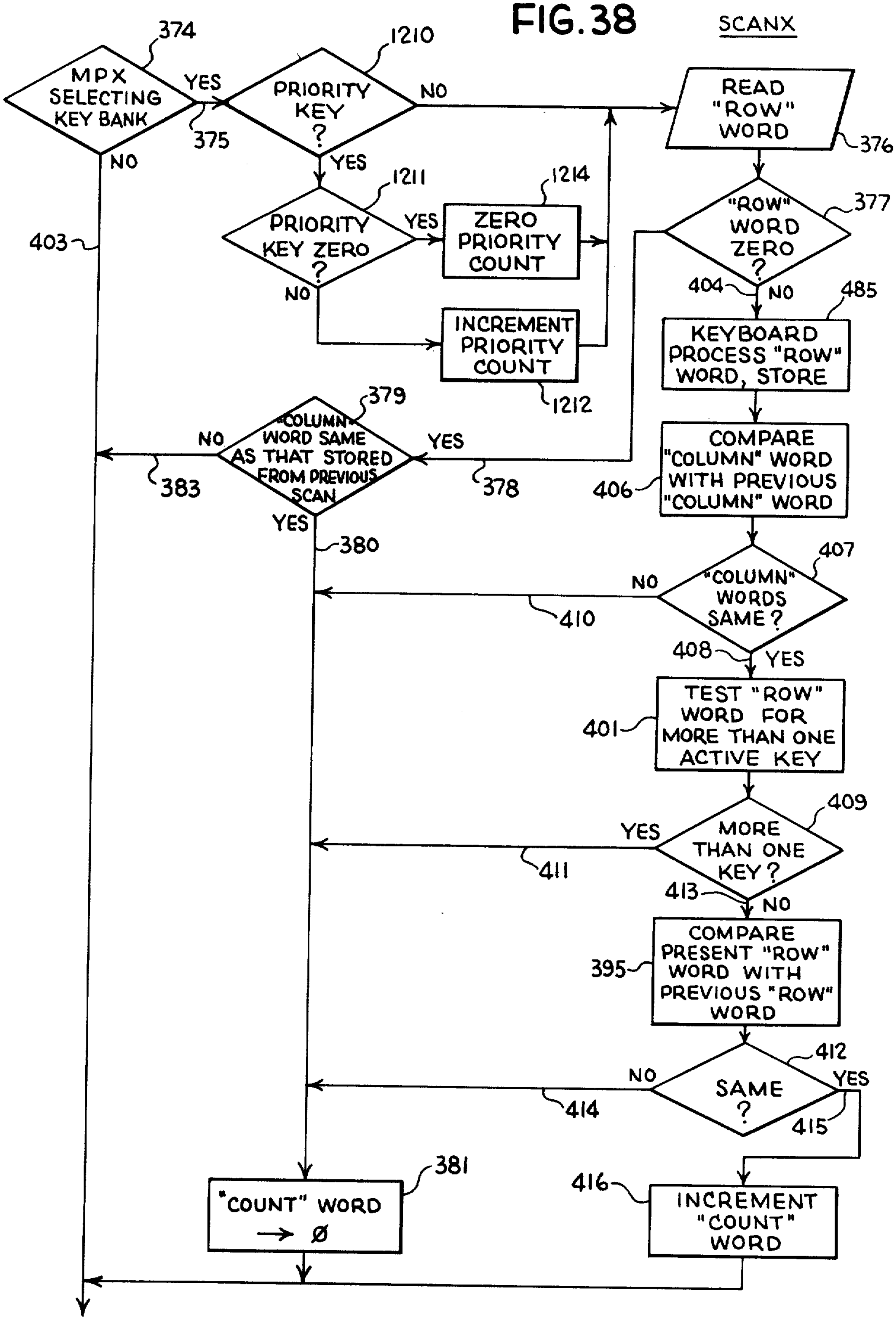
Figure 43:
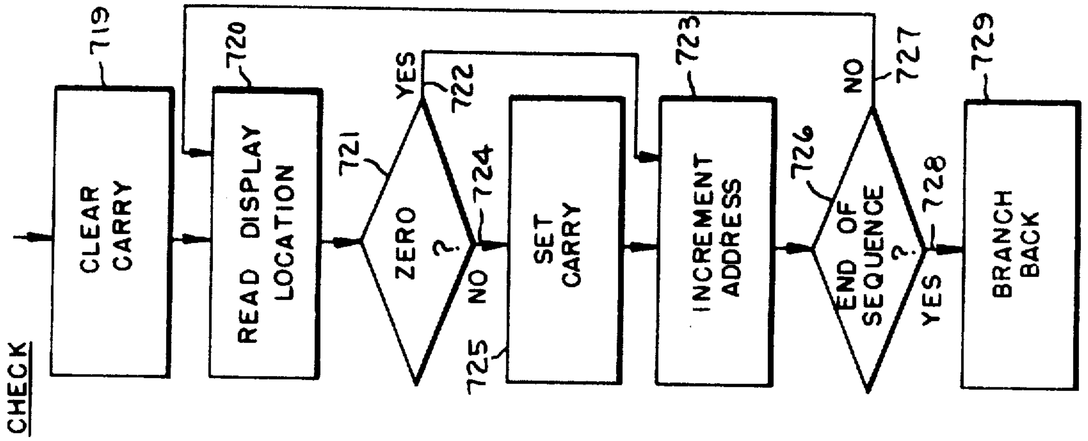
Figure 42:
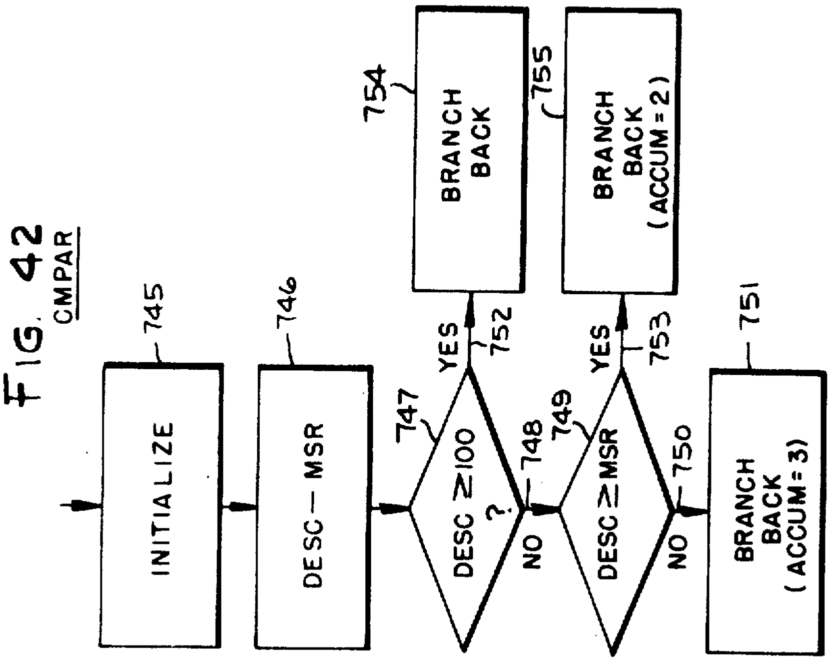
Figure 41:
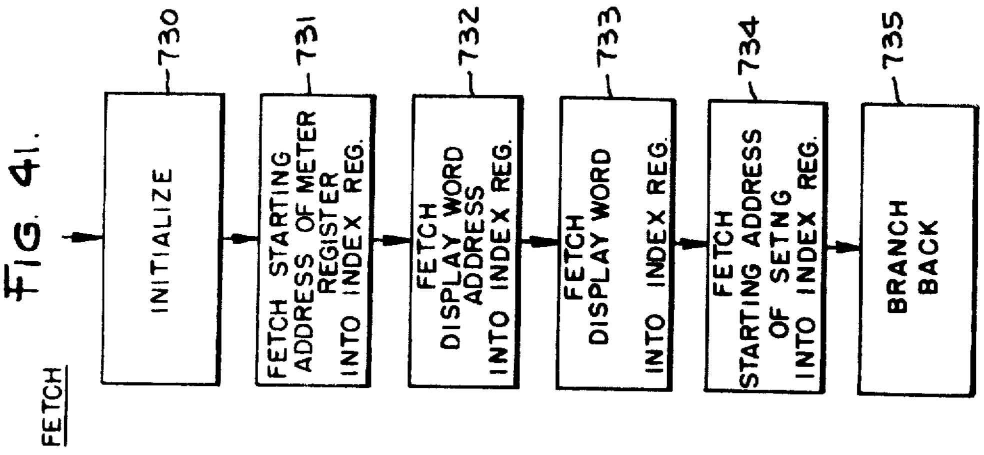
Figure 46:
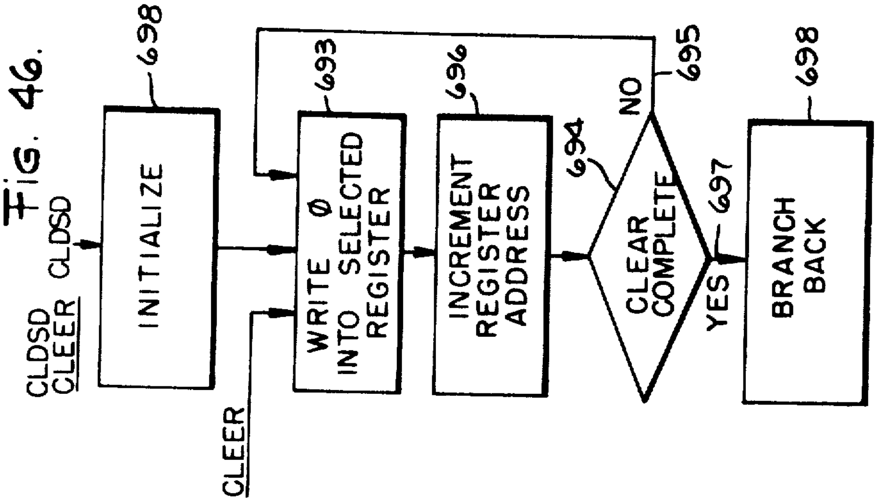
Figure 45:
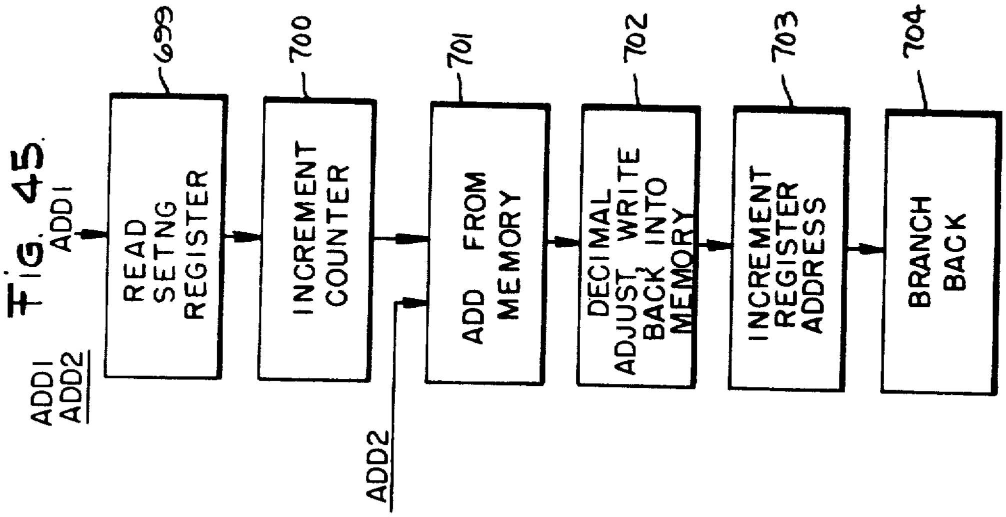
Figure 44:
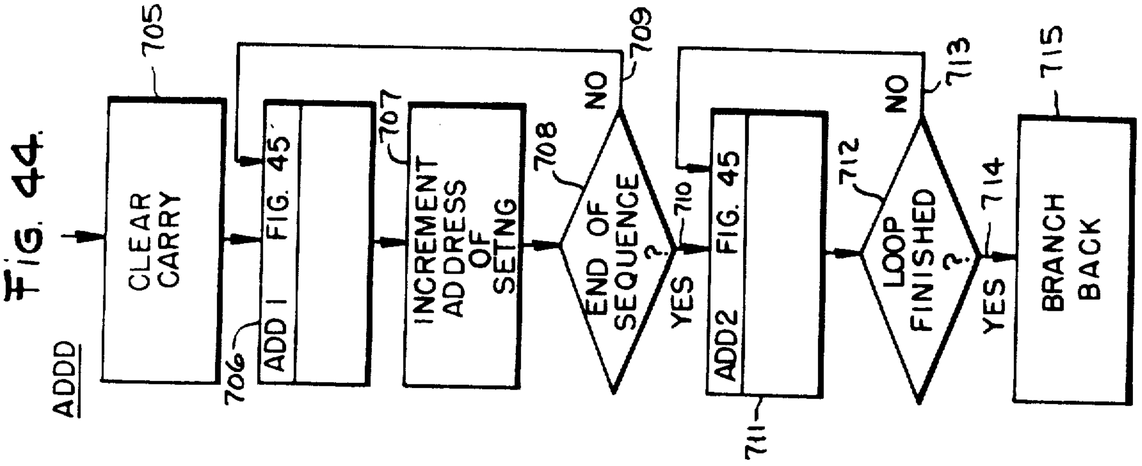
Figure 47:
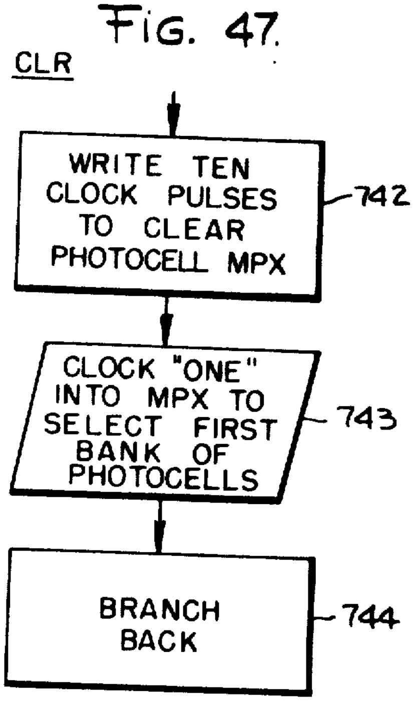
Figure 48:
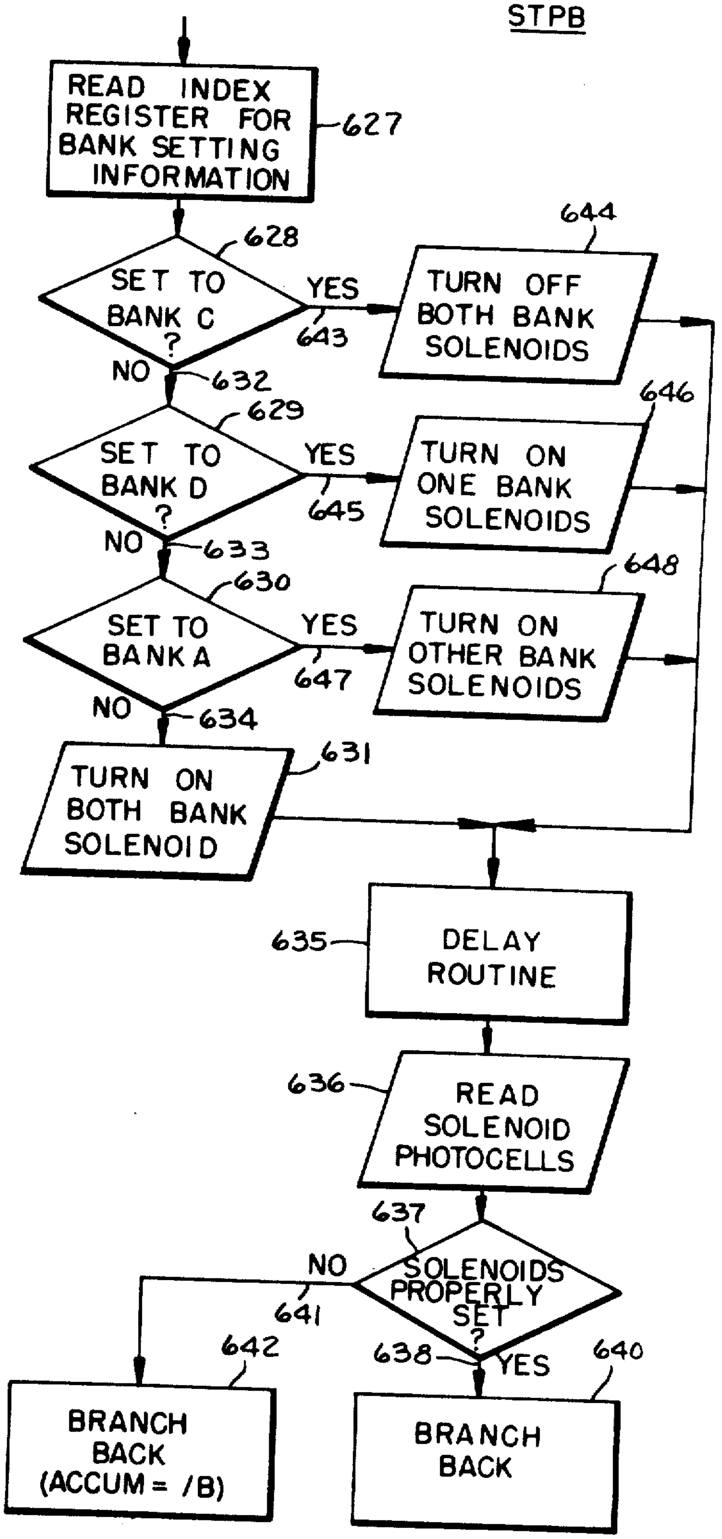
Figure 49:
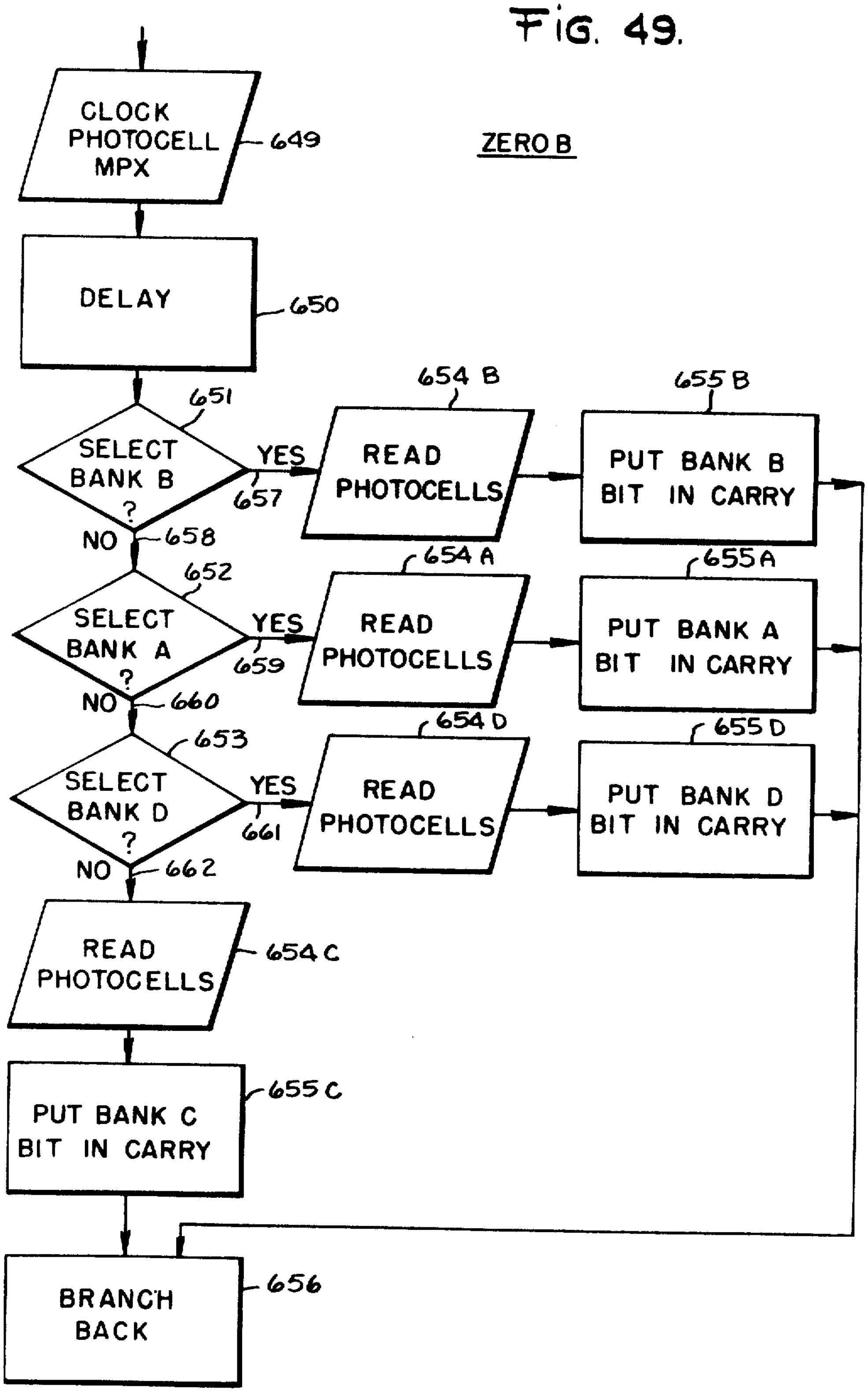
Figure 50:
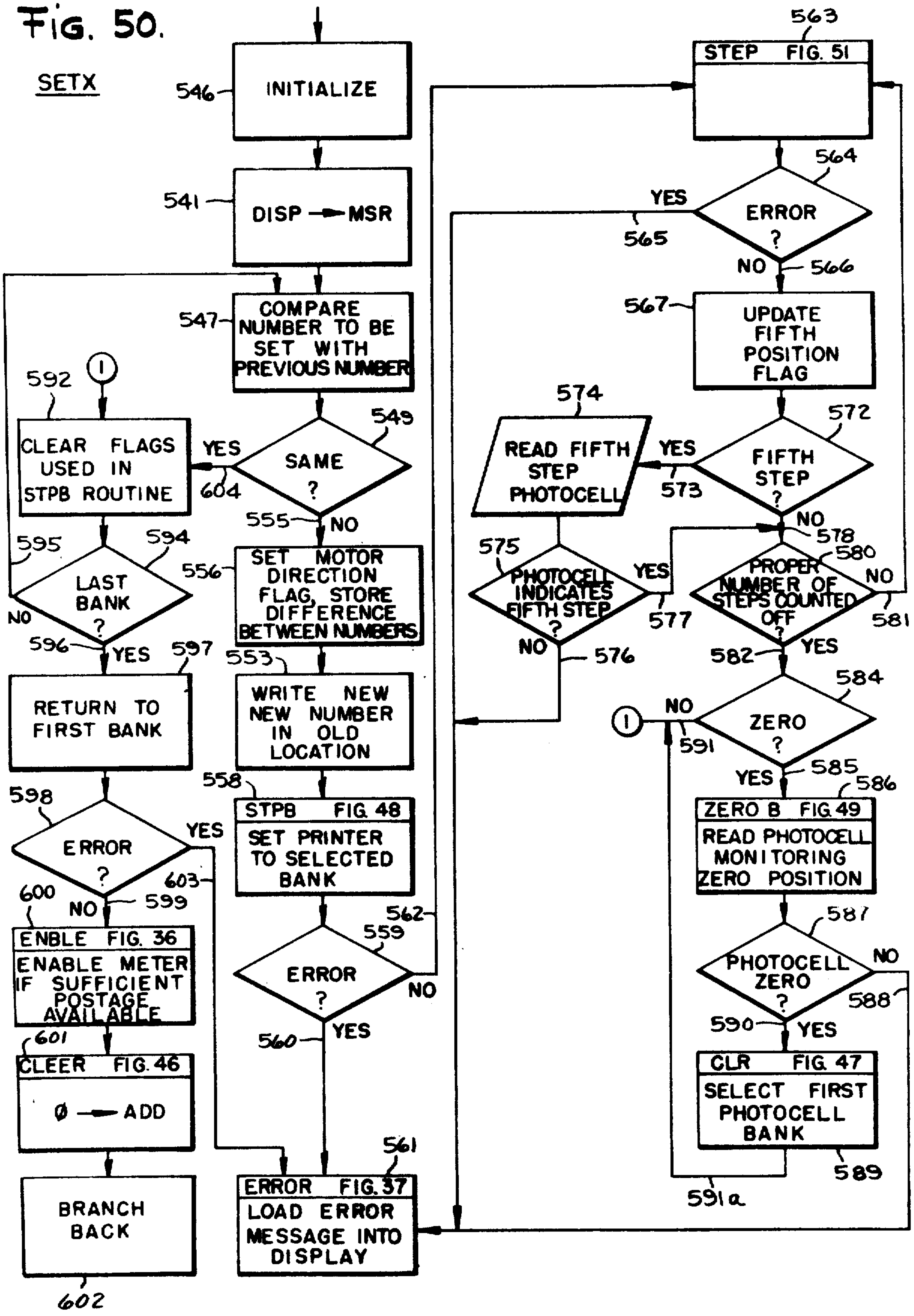
Figure 51:
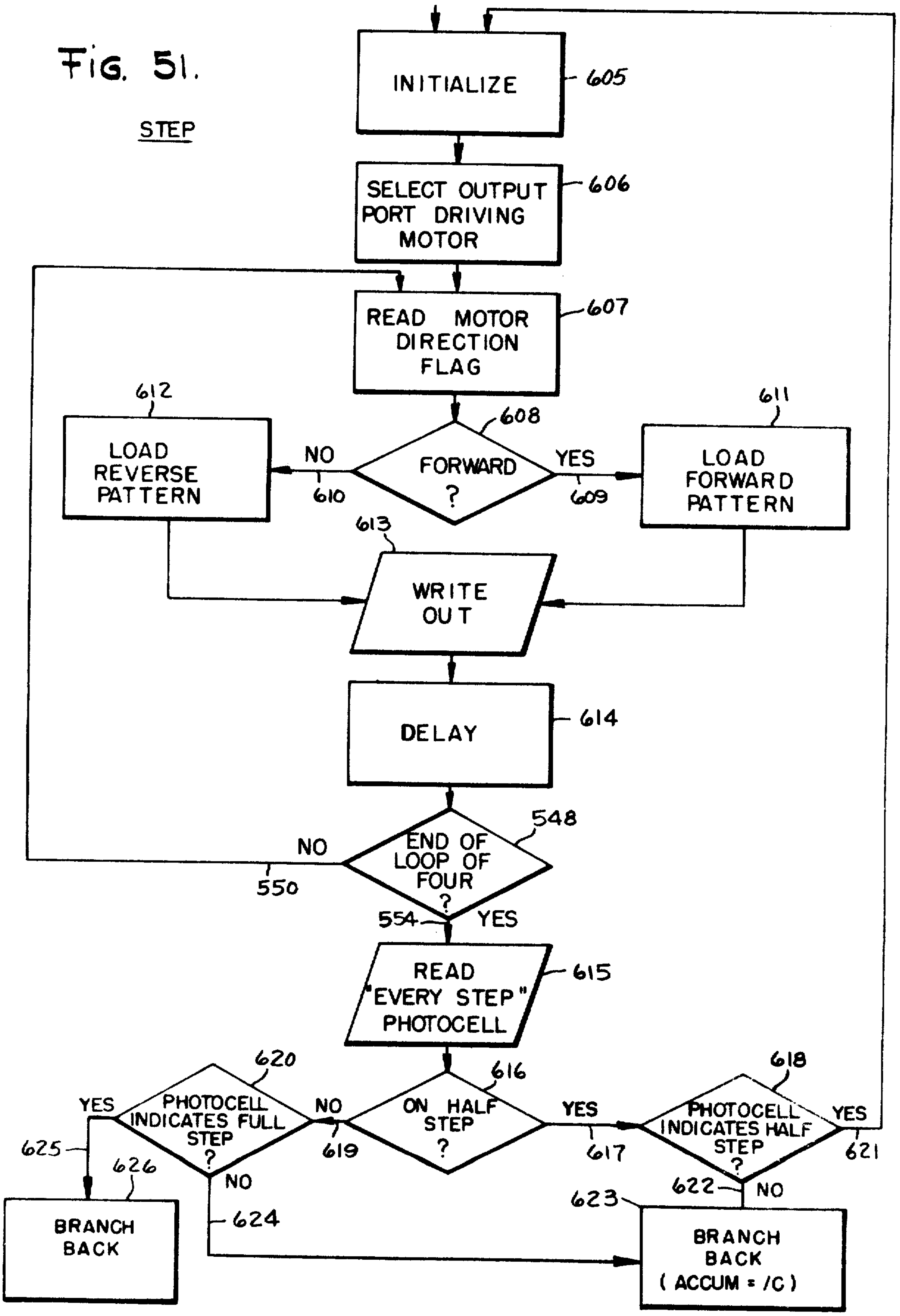

FIG. 17 is an electrical schematic of the circuitry associated with shift registers (1)21 and (2)22 of FIG. 1*d,* for controlling the indicator lamps of FIG. 16;

FIG. 18 is an electrical schematic of the decimal point circuitry and the decoder driver circuitry for the display of FIGS. 1*b,* 1*c* and 16;

FIG. 19 is an electrical schematic for the meter monitoring photocells, the stepper motor coil drivers, and the print sensing photocell of the setting and printing mechanism of FIG. 3;

FIGS. 20 and 21 show a generalized overall operation for the meter of FIGS. 1*d* and 2, in a flow chart form;

FIG. 21*a* shows a flow chart for the subroutine CHCK for the meter of FIGS. 1*d* and 2;

FIG. 22 depicts a flow chart for the subroutine INRAM for the meter of FIGS. 1*d* and 2;

FIG. 23 illustrates a flow chart for the subroutine DOWN for the meter of FIGS. 1*d* and 2;

FIG. 24 shows a flow chart for the HOME subroutine for the meter of FIGS. 1*d* and 2;

FIG. 25 shows a flow chart for the SCAN subroutine for the meter of FIGS. 1*d* and 2;

FIG. 26 depicts the chart for the subroutine FCTN for the meter of FIGS. 1*d* and 2;

FIG. 27 illustrates the flow chart for the digits subroutine for entering numbers into the display for the meter of FIGS. 1*d* and 2;

FIG. 28 shows the flow chart for the subroutine SET for the meter of FIGS. 1*d* and 2;

FIG. 29 depicts the flow chart for the subroutine UNLCK for the meter of FIGS. 1*d* and 2;

FIG. 30 illustrates the flow chart for the subroutine POST for the meter of FIGS. 1*d* and 2;

FIG. 31 shows a flow chart showing the data center operation for the remote meter charging system of FIG. 1;

FIGS. 32 and 32*a* depict a flow chart for the recharging operation for the postage meter of FIGS. 1*d* and 2;

FIG. 33 illustrates the flow chart for the subroutine PLUS for the meter of FIGS. 1*d* and 2;

FIG. 34 shows the flow chart for the subroutine CLEAR for the meter of FIGS. 1*d* and 2;

FIG. 35 depicts a flow chart for a subroutine for calling register contents into the display for the meter of FIGS. 1*d* and 2;

FIG. 36 illustrates a flow chart for the subroutine ENBLE for the meter of FIGS. 1*d* and 2;

FIG. 37 illustrates a flow chart for the subroutine ERROR for the meter of FIGS. 1*d* and 2;

FIG. 38 shows a flow chart for the portion of the subroutine SCAN of FIG. 25 referred to as SCANX for the meter of FIGS. 1*d* and 2;

FIG. 39 depicts a flow chart for the subroutine LDLMP for the meter of FIGS. 1*d* and 2;

FIG. 40 illustrates a flow chart for the subroutine OUTPT for the meter of FIGS. 1*d* and 2;

FIG. 41 shows a flow chart for the subroutine FETCH for the meter of FIGS. 1*d* and 2;

FIG. 42 depicts a flow chart for the subroutine CMPAR for the meter of FIGS. 1*d* and 2;

FIG. 43 illustrates a flow chart for the subroutine CHECK for the meter of FIGS. 1*d* and 2;

FIG. 44 shows a flow chart for the subroutine ADDD for the meter of FIGS. 1*d* and 2;

FIG. 45 depicts a flow chart for the subroutine ADD1; ADD2 for the meter of FIGS. 1*d* and 2;

FIG. 46 illustrates a flow chart for the subroutine CLDSP;CLEER for the meter of FIGS. 1*d* and 2;

FIG. 47 shows a flow chart for the subroutine CLR for the meter of FIGS. 1*d* and 2;

FIG. 48 depicts a flow chart for the subroutine STPB for the meter of FIGS. 1*d* and 2;

FIG. 49 illustrates a flow chart for the subroutine ZERO B for the meter of FIGS. 1*d* and 2;

FIG. 50 shows a flow chart for the subroutine SETX for the meter of FIGS. 1*d* and 2; and FIG. 51 depicts a flow chart for the subroutine STEP for the meter of FIGS. 1*d* and 2.

Referring now to FIG. 1, a schematic block diagram of the remote meter funding system of this invention is shown. A plurality of blocks 1 represent remote postage meter stations capable of communicating with a data center represented by block 5. The remote postage meter stations communicate with data center 5 via telephone exchange equipment generally illustrated by block 4. The transmitter-receiver at each remote station 1 is a conventional tone signalling telephone 3. This telephone is used to establish two-way communication between the postage meter station 1 and the data center 5.

The data center 5 includes a data set 6 of known construction such as a Bell System Model 403 data set. This data set will receive frequency encoded data input from a telephone 3 at any one of the remote stations 1, and transform this input into a suitable machine language for a programmed or special purpose digital computer 7. This computer 7 may be, for example, a Data General "Nova". This computer, in turn, controls a voice answer-back unit 8 of known construction such as a Cognitronics Model 632. The answer-back unit will formulate voice responses for transmission back to the particular postage meter station 1, via the telephone exchange 4.

The telephone 3 at each remote meter station 1, is preferably of the touch-tone type, which provides frequency encoded numeric outputs to the data center. Alternately, a conventional dial phone may be equipped with a touch-tone pad, capable of generating frequency encoded digital data in the same manner as a touch-tone type telephone. Each remote postage meter station 1 is equipped with an advanced microcomputerized postage meter 2 of the type shown in and further described with respect to FIGS. 1*a*–1*d*, and 2.

As will be described in further detail hereinafter, the postage meter 2 has a keyboard 34, for entering postage data and information into the meter. Postage is remotely funded into the meter 2, by first telephoning the data center 5 via the telephone 3. The meter user provides the data center with the identifying number of the meter to be funded, the last readings of the ascending and descending registers of the meter, and the amount of postage which is desired to be entered into the meter system. The computer 7 checks the authenticity of the call, and then formulates a combination which is both a function of the meter identity, and the amount which is to be funded into the meter. The combination is transmitted back to the user via the answer-back unit 8, data set 6, the telephone exchange 4, and telephone 3. Having received the combination, the user of the postage meter then unlocks the meter 2, keys in the desired postage on keyboard 34, and enters the combination. The meter 2 contains a program which processes the entered postage desired, and generates an internal combination. The meter is recharged with postage if the combination entered is in agreement with the internally generated combination.

Referring to FIG. 1*a*, the general functional arrangement of the computerized postal meter 2 of the present invention is shown.

The heart of the system is the CPU and it performs two basic functions: performance of calculations based on input data and controlling the flow of data between various memory units. Three basic memory units are employed with the CPU. The first is the permanent memory PM which is a non-alterable memory storing a specific sequence of operations for performing postal data calculations in accordance with certain predetermined inputs as well as performing other routines for operating the system. The second memory unit is a temporary memory TM which interacts with the CPU for forming a temporary storage, holding and forwarding working data in accordance with the calculations being performed by the CPU. An additional memory component NVM is also coupled to the CPU and performs a storage function which is very significant in the system operation of a postal data system. The NVM is a nonvolatile memory which acts to store certain critical information employed in the postal system as part of a predetermined routine activated either upon shut-down or start-up. This routine may be located in the permanent memory and is accessed by appropriate sensing device sensing either of the two stated conditions, shut-down or start-up, for operating the CPU in accordance with that routine. The function of this routine is to take information stored in the temporary memory TM which represents crucial accounting functions such as descending balances or ascending credits and the like and store them in the NVM (nonvolatile memory) wherein they may be held while the machine is de-energized and recalled upon a subsequent start-up. In this manner, the computer system may continually act upon these balances in the temporary memory without fear or loss of this information upon shut-down. Further, the information may be recalled on reactivation by start-up by retrieving it from the nonvolatile memory NVM and feeding it back into the TM via the CPU. The nonvolatile memory is shown as coupled to the CPU and deriving an output therefrom in accordance with the transfer of information from the temporary storage TM under the control of the permanent memory PM through the CPU in accordance with the shut-down routine. The NVM unit is also shown as providing an output line coupled back into the CPU for transferring the data back into and through the CPU and into the temporary memory TM in accordance with the start-up routine under the control of the permanent memory PM.

The system operates in accordance with data applied from an appropriate input means I. This data is fed into the CPU under control of the program in the permanent memory. At any time during the operation of the system, should the contents of the temporary memory storing the appropriate credit, debit, balances, or other accumulations in accordance with the various features of the system be desired to be displayed, an appropriate instruction provided by the input means I causes the CPU to access the desired location TM storing the information requested. The information is provided through the CPU into the output display unit 0. The input and output units may be multiplexed by a multiplex unit MP to and from the CPU.

Under control of the CPU when appropriate postal data information is provided from the input I, and all of the conditions such as limits and the like which may be preset in accordance with the entered data in storage in the temporary memory TM, are satisfied, a postage setting device SP will respond to an appropriate output signal from the CPU enabling a postal printing unit PP. At this point, the system has now accomplished its immediate function of setting the postage printer and enabling the printer to print postage.

The foregoing functional description of the present meter and its embodiment in an LSI micro integrated form will be described in greater detail with reference to FIGS. **1*d* and 2**. Before going to this explanation, however, a generalized view of the specific features and operations of the postal meter operating in accordance with the present invention will be described.

Referring to FIGS. **1*b* and 1*c***, there is shown a general housing arrangement for the microcomputer postage system.

FIG. **1*b* shows a general housing arragement for the micro computer postage meter. A housing 100 contains modular plug-in circuit panels 101 containing the circuitry and the CPU, ROM's, RAM's and shift registers of the meter. The keyboard 34 and display 35 are mounted on the common top panel 102 of the housing 100. The setting and printing mechanism (FIG. 3) is contained in a forward section generally shown by arrow 103. An envelope 104 which is to be printed with postage is introduced in the slotted portion 105 of meter section 103 after the meter is initialized. The amount of postage to be printed is then keyed into the keyboard 34 via push buttons 107, the set button 119 is pushed to set the postage into the drum, and the print button 108 is depressed. The print button 108 may be replaced by a limit switch or optical sensor located in slot 105, which would automatically provide a print signal when an envelope enters slot 105**.

FIG. **1*c* is an enlarged view of panel 102 of FIG. 1*b* which contains the keyboard 34 and display 35 of the postage meter. The keyboard 34 comprises push buttons 107, as aforementioned, to enter the numerical amount of postage into the system. Push buttons 109, 110, 111, 112, 113 and 114 refer to the electronic registers for batch count, batch amount, piece count, control sum, ascending register, and descending register, respectivey. When any one of these buttons are depressed, the numerical section 115 of the display 35 is cleared, the appropriate register is loaded into the display, and the appropriate indicator lamp section 116** of the display is lighted.

The keyboard and display of this invention provides two new registers (more can be added without too much difficulty). Batch count and batch amount registers supply a running account of the total number of pieces of mail processed during any one run or time period, and the total postage expended for this mail. They can be reset to zero by the user. The control sum register is extremely useful in that it provides a check upon the descending and ascending registers. The control sum is a running account of the total funds being added into the meter. The control sum must always correspond with the summed readings of the ascending and descending registers. The control sum is the total amount of postage ever put into the machine, and is alterable only when adding funds to the meter. Generally mechanical meters are not resettable by the user, but only by Postal authorities. However, with electronic postage systems, a remote resetting capability is feasible and has been programmed into the meter. This remote resetting scheme which is programmed into this system is similar to that shown in U.S. Pat. No. 3,792,446 filed Feb. 12, 1974, except that a variable amount of postage is settable into the system.

The piece count register differs from the batch count in that it is not resettable by the user, and is used to indicate the total number of postage printings (pieces of mail) the machine has experienced. This information is useful to ascertain the life of the machine, and to gage when the system may require servicing and maintenance.

The ascending and descending registers operate in normal fashion as might be expected from a standard postage meter. The ascending register giving a running total of the printed postage, and the descending register informing the operator of the amount of postage funds still remaining in the postage system.

The key (push button 117) provides the function of addition for adding in special charges to the postage such as special delivery, certification, etc.

The clear key 118 clears the numeric display 115, and also sets the batch register to zero if either one is displayed at the time the clear key is actuated.

The set button 119 is depressed after the postage required to mail a letter is keyed in by buttons 107. The set button 119 causes the print wheels in the printing drum 42 of FIG. 3 to set to the desired postage.

The $ unlock key 120 is a precautionary button which must be depressed by the operator in order to set postage equal to, or in excess of, a dollar. This extra physical step acts to prevent costly postage printing mistakes.

The need to add funds to the meter system is signalled by indicator lamp 126.

Funds are added remotely to the meter by obtaining an appropriate funding combination via a data link as will be discussed in more detail hereinafter. After the combination is obtained, a key is inserted in the keyway of lock switch 121. The switch is now free to be turned to a first position, and the indicator light 122 is lit. Light 122 instructs the operator to key in the funding amount into the keyboard 34 via push buttons 107. After the funding amount is entered, the switch 121 is turned to a second position. Indicator lamp 123 now comes on to inform the operator to enter the appropriate combination corresponding to the chosen postage amount, in accordance with the obtained combination. The combination is then entered into the meter using push buttons 107. The switch 121 is now turned to a third position. The turning of the switch to this third position will evoke one of two responses from the system. If the combination is a valid one, then indicator lamp 124 will light to inform the operator that the entered combination is a correct one, and the key should be removed from the lock switch 121. If on the other hand, however, the entered combination was incorrect, indicator lamp 125 will be lit to inform the operator of this fact, and to instruct him to repeat the funding procedure.

A check date reminder is provided by indicator 127, each time the postage meter system is turned on.

A meter enabled indicator 128 lights when (a) the printing drum 42 (FIG. 3) is properly set with postage; (b) the postage to be imprinted is displayed; and (c) sufficient funds are available to imprint the postage desired.

Indicator lamp 129 signals the operator to call the Pitney Bowes Service Department. This indicator lights when there is something wrong in the system, e.g., the sum of the ascending and descending registers to not check with the control sum.

Indicator lamp 130 signals the operator that the postage to be set is over or equal to $1.00, and in order for the postage to be set, the $ unlock button 120 must be pressed prior to the set button 119.

The indicator light 131 shows that the ascending register contents are being displayed in display section 115.

The indicator lamp 132 lights when the contents of the descending register are being displayed in display section 115.

The piece count indicator lamp 133 lights when the piece count is being displayed in display section 115.

The batch amount 134 and the batch count 135 indicators light when the batch registers are being displayed. The batch registers are newly added registers to the normal postage meter. The data shown in the display 115 for the batch count is a whole number (no decimal point) since the information is not dollars and cents data. The piece count information is similarly displayed without the decimal point. The control sum indicator 136 lights when the control sum register is being displayed in display section 115.

The low postage $100.00 indicator 137 lights to tell the operator that the remaining funds in the descending register are currently below a hundred dollars. This alerts the operator that some time soon, he will be required to recharge the "meter".

In several places throughout this description, components have been written with a dual numbered designation, such as RAM(2)18. The number in parenthesis designates the order in the component series, i.e., using the above example, RAM18 is the second RAM in the series of RAMS.

Now referring to FIGS. **1*d* and 2, a block diagram of the LSI integrated form of the micro computerized postage meter of this invention is shown. The system comprises a MCS-4 micro computer set, which is a product of Intel Corporation, Santa Clara, California. The micro computerized set comprises a central processor unit (CPU), 10 which is connected to a number of read only memory (ROM) components 11, 12, 13, 14 and 15, respectively, and a number of random access memory (RAM) components 16, 17, 18 and 19, respectively. A plurality of shift registers (S/R's) 20, 21, 22, 23 and 24 are respectively connected into the system through output ports 25 and 27 located on the RAM chips 16 and 18, respectively. The output ports on the RAMs have four output lines [8 4 2 1] as shown. The ROMs 11, 12, 13, 14 and 15 have input-output ports (I/O's) 29, 30, 31, 32 and 33 respectively, of four-bit capacity [8 4 2 1] as shown. It should be noted that although the input/output ports are physically located on these chips, they electrically communicate separately with the CPU 10**.

The shift registers 20, 21, 22, 23 and 24 respectively, provide port expansion for the postage meter system. In addition, shift register 20 provides a multiplexing capability for operating a keyboard 34, and a numeric display 115. Shift register 23 multiplexes the inputs of the meter setting feed-back photocells 36 to input port 32. A shift register 37 (4 × 128 COS/MOS S/R) with a hold-up battery provides permanent register information to the working memory which is allocated to RAM 16. The input port 31 receives the register information from the non-volatile memory 37 and channels this information to RAM 16 via the CPU 10. Each 4-bit memory word is clocked in sequence from the non-volatile shift register 37 to the working memory in RAM 16 via the CPU, until the shift register memory 37 has been completely shifted.

The numeric display 115 (FIG. 2) is controlled by the decoder/driver 46, which is connected into the system via output port 26. Output line 8 (output port 25) on RAM chip 16 provides a blank-unblank control over the decoder/driver 46 to eliminate leading zeros in the display 115, and to provide a blanking control signal for the particular display of this system (Burroughs Panaplex).

The inputs from the keyboard 34 are fed to the system via port 29. As aforementioned, the inputs from photocells 36 are directed to port 32. The photocells 36 provide feed-back information from the postage meter setting mechanism shown in FIG. 3.

The micro computer system 40 of this invention is powered from two (+5 and −10 volt) power supplies 38 as shown in FIG. 2. A power sensing circuit 39 is interconnected into the micro computer system in such fashion, so as to allow the microprocessor system to detect a power failure. In such a case, the microprocessor calls a routine which transfers working memory to non-volatile memory, and protects it by disabling the memory via bit 8, port 27. A clock 41 serves to correctly phase the operations of the micro computer system 40. Two non-overlapping clock phases $\phi_1$ and $\phi_2$ are supplied to the central processor unit and random access and read only memory chips.

The central processor generates a SYNC signal every eight clock periods as shown in the Intel Users Manual for the MCS-$4^R$ micro computer set, copyright 1972, FIG. 2 on page 6 thereof. The SYNC signal marks the beginning of each instruction cycle. The RAM's and the ROM's will generate internal timing using SYNC, and $\phi_1$ and $\phi_2$. The shift registers (S/R's) are static shift registers and do not use these clock pulses for their operation.

The heart of any postage meter is of course the printing means. With the use of electronics, mechanical accounting registers and setting actuators become superfluous, since all the register information is electronically stored, and the setting of the meter banks is electromechanically controlled.

One of the ways the present micro computer meter can print postage is by using a modified Model 5300 postage meter, manufactured by the assignee of this invention, Pitney-Bowes, Incorporated, Stamford, Connecticut. The modified meter only contains the previous printing drum 42 and the print wheel driving racks 43 as shown in FIG. 3; the mechanical registers and actuator assemblies having been removed. The print wheels within drum 42 (not shown) of the modified meter are set by a mechanism driven by a stepper motor 50 and a pair of solenoids 60 and 70 (FIGS. 2 and 3). The motor and solenoids are powered by a −24 volt power supply 44 shown in block diagram in FIG. 2. The indicator lamps 116 light up various display messages shown in FIG. 1*b*. These indicator lamps are likewise powered by the power supply 44.

Output ports 28 channels control signals to the drivers 47 of stepper motor 50. The output lines 0, 1 of the shift register 24 channel control signals to the setting mechanism solenoids 60 and 70, respectively via drivers 48. The twenty output lines of shift registers 21 and 22 operate indicator lamps 116 via lamp drivers 49.

The meter setting and printing mechanism of this postage meter will be described with reference to FIGS. 3, 4*a*, 4*b* and 5. A stepper motor 50 drives an upper and lower set of postage wheel driving racks 43 (four in all) via a pair of upper and lower nested shafts (four shafts in all) **52*a*, 52*b*, 52*c* and 52*d*** respectively (FIG. 4*a*). Upper shafts **52*a*, 52*b* and lower shafts 52*c*, 52*d* are driven by a master drive gear 51, which is operatively rotatable in a clockwise and counterclockwise direction (arrows 55) by means of a stepper motor 50**.

The printing drum 42 has four print wheels (not shown) to provide a postage impression to the maximum sum of $99.99. Each print wheel provides a separate digit of this sum, and is settable from "0" through "9". The print wheels are sequentially set by means of one of the four driving racks **43*a*, 43*b*, 43*c* and 43*d*, respectively. The driving racks are slidably movable (arrows 56 of FIG. 3) within the drum shaft 57**.

The upper racks **43*a* and 43*b* are controlled by pinion gears 58*a* and 58*b*, respectively, and the lower racks 43*c* and 43*d* are controlled by pinion gears 58*c* and 58*d***, respectively (FIG. 4*a*). The pinion gear **58*a* is affixed to shaft 52*a*; the pinion gear 58*b* is affixed to shaft 52*b*; the pinion gear 58*c* is affixed to shaft 52*c*; and pinion gear 58*d* is affixed to shaft 52*d*. Nested shafts 52*a*, 52*b* and 52*c*, 52*d*, are respectively rotated (arrows 59) by means of respective spur gears 53*a*, 53*b*** (FIGS. 3, 4*a*, and 5) and respective spur gears **53*c*, 53*d*** (FIG. 4*a* and 5) affixed to the shafts at the stepper motor end thereof.

The master driving gear 51 engages each of the gears **53*a*, 53*b*, 53*c*, and 53*d* in the sequential order: 53*b*, 53*a*, 53*d*, 53*c*; with "53*b*" corresponding to the "tens of dollars" print wheel, and "53*c*" corresponding to the "unit cents" print wheel. The master gear 51 is sequentially slidably positioned (arrows 65) in rotational contact opposite each of the spur gears 53*a*–53*d* by sliding the yoke 63 over shaft 62. The master gear 51 is rotatably mounted within slot 64 in yoke 63, and is rotatably driven (arrows 55) by the stepper motor 50 via the motor shaft 50*a* and splined shaft 62. The yoke 63 is not rotatably engaged by the splined shaft 62 due to the sleeve bushing 66 which separates the yoke 63 from the shaft 62. The yoke 63 and master gear 51 are guided and supported by an additional smooth shaft 61, which nests within slot 67 of yoke 63**.

In order that the teeth of the master gear 51 properly align with the teeth of the several spur gears **53*a*, 53*b*, 53*c* and 53*d*, a toothed section 69 of each spur gear is locked into place by a pair of upper and lower tooth profiles 68 and 68', respectively located on upper and lower surfaces of the yoke 63** as shown in FIG. 4*b* and 5.

As the yoke 63 and the gear 51 slide (arrow 65) over the splined shaft 62, the upper and lower laterally extending tooth projections 68 and 68' hold the spur gears **53*a*, 53*b*, 53*c* and 53*d* in place against rotational misalignment. Each of the gears 53*a*, 53*b*, 53*c* and 53*d*, respectively are only free to turn, when the master gear 51** is directly intermeshed therewith.

The sliding movement (arrows 65) of the gear 51 and yoke 63 is controlled by toggle pin 71, which nests within groove 72 of the yoke. The toggle pin 71 pushes against the yoke 63, when the pivotable link 73 to which it is attached, is made to pivot (arrows 74) about a center shaft 75. The link 73 is controlled by two solenoids 60 and 70, respectively, acting through pivot arms 76, 86 and 77, 87 respectively. The solenoids 60 and 70 pull upon their respective pivot arms 76 and 77 via pull rods 78 and 79, which are movably pinned to these arms by pins 81 and 82, respectively. When the pull rod 79 pulls upon arm 77, it is caused to pivot (arrows 80) about shaft 83, which is rotatably affixed to arm 77. When this occurs, arm 87 is caused to be pivoted (arrow 84) against the biasing action of spring 88. This in turn, results in pulling pivot arm 73 forward (arrow 89) via shaft 90. This causes the pivot arm 73 to pivot about center shaft 75, resulting in moving toggle pin rearwardly (arrow 91).

Likewise, when solenoid 60 pulls upon arm 76 via rod 78, arm 76 causes shaft 92 to turn (arrow 93) against the biasing of spring 94. This in turn, causes arm 86 to pivot (arrow 95) about shaft 92. In pivoting, the arm 86 causes the center shaft 95 to move rearwardly (arrow 96). This in turn, forces the toggle pin 71 to move rearwardly (arrow 91).

There are four combined solenoid pull positions corresponding to the four separate mating positions between main gear 51 and each respective spur gear **53*a*, 53*b*, 53*c* and 53*d*; (a) both solenoids are not pulled-position 53*c*; (b) both solenoids are pulled-position 53*b*; (c) solenoid 70 is pulled and solenoid 60 is not pulled-position 53*d*; and (d) solenoid 70 is not pulled and solenoid 60 is pulled-position 53*a***.

The setting mechanism operation is as follows: (1) both solenoids 60 and 70 are pulled; (2) setting spur gear **53*b* via main gear 51 and stepper motor 50; (3) de-energizing solenoid 70 allowing pivot arm 87 to spring back under the action of spring 88; (4) setting spur gear 53*a* via main gear 51; (5) energizing solenoid 70 and de-energizing solenoid 70, allowing pivot arm 76 to spring back under the action of spring 94, and pivot arm 87 to pivot against spring 88; (6) setting spur gear 53*d* via main gear 51; (7) de-energizing solenoid 70 allowing pivot arm 87 to spring back under the biasing of spring 88; and (8) setting spur gear 53c via main gear 51**.

After the spur gears are set to individual postage value positions, causing the racks 43 and the print wheels (not shown) to assume postage value positions, the drum 42 is rotated via shaft 57 (arrow 97) to imprint the set postage.

The home position of the drum 42 is monitored by a slotted disc 98 affixed to shaft 57. When slot 100 of disc 98 moves through the optical read-out well 99, the print cycle is detected.

All optical read-out wells of the setting mechanism as will be hereinafter described, comprise a light emitting diode (LED) and a phototransistor for receiving the light emitted by the LED.

The slide positions of gear 51 and yoke 63 (arrows 65) are monitored by determining the pivot position of pivot arms 86 and 77, respectively. Pivot arm 86 has a finger 101 which will pivot in and out of well 102, when solenoid 60 is actuated and de-actuated. Pivot arm 77 has a finger 103 which pivots in and out of well 104 when solenoid 70 is actuated and de-actuated.

The home positions of shafts 52a and 52b are monitored by slotted discs 105a and 105b, respectively (FIGS. 3 and 4a). When slot 106a of disc 105a is in well 107a, shaft 52a is at zero. Similarly, when slot 106b of disc 105b is in well 107b, shaft 52b is at zero. Shafts 52c and 52d are respectively "zero" monitored via respective discs 105c and 105d, slots 106c and 106d, and wells 107c and 107d (FIG. 4a).

Rotation of the stepper motor shaft 50a, splined shaft 62 and gear 51 is monitored via gears 108 and 108a, slotted monitoring wheel 109 and monitoring well 110. When stepper motor shaft 50a turns splined shaft 62 and main gear 51, a gear 108 attached to shaft 50a is also made to turn. Gear 108 intermeshes with gear 108a carried by the slotted monitoring wheel 109, causing wheel 109 to turn in correspondence with shaft 50a. Every fifth slot 111 on the monitoring wheel 109 is extra long to provide a standard for synchronization. Each slot on wheel 109 corresponds to a change of one unit of postage value. The slotted wheel 109 is optically monitored by well 110. Well 110 has two photosensors, 110a and 110b, respectively, as shown in FIG. 4a. Photosensor 110a monitors every step of the stepper wheel 109 and sensor 110b monitors every fifth step.

In summary, the setting of the postage printer is done by selecting the desired bank with the solenoids and driving the stepper motor in the proper sequence under program control. The results of each step is verified by the micro computer via the monitoring photosensors.

Brief Summary of the Operation of the Postage Meter

The operation of the postage meter can be briefly summarized as follows: With no power applied to the microprocessor, a de-energized "enable" solenoid (not shown) mechanically locks up the printing mechanism of FIGS. 3–5. When power is applied to the system, (turning on the meter), voltage sensing circuits monitoring logic supply voltage (FIGS. 12a and 12b) generate a general system reset pulse, when the logic supplies reach operating levels. This pulse initializes the microprocessor system, which then starts executing the program shown on page 87 from address ϕϕϕ. The non-volatile memory 37 of FIG. 2, is loaded into working storage in RAM, the printing mechanism is set to zero, the descending register is loaded into the numeric display 115 of FIGS. 1b and 1c to inform the operator how much funds are available, and a "check date" reminder 127 is turned on. The system then loops in a SCAn routine (FIGS. 25 and 38) which multiplexes the display and searches for keyboard 34 inputs. The meter remains in this routine until a keyboard input is detected at which time the program branches to execute the routine called for by the key. The program then returns to the SCAN routine.

The postage amount to be printed is set by entering the number into the display via keyboard 34 and operating the SET button 119 (amounts $1.00 or more require the pressing of the $ UNLOCK button before pressing SET). If sufficient funds are available in the descending register to print the amount of postage the meter is set to, the "enable" solenoid is set (enables printing mechanism). There are two ways of tripping the print mechanism: (1) feeding a letter into the meter (2) operating the postage request lever 108. When tripped, the amount of postage shown in the display is printed. The operation of the print mechanism generates a signal to the SCAN routine which branches to a routine which updates the meter registers and checks to see if sufficient postage is available for again printing the postage amount the meter is set to. If available, the print mechanism remains enabled, if not, it is disabled.

If in the course of running postage through the meter, the sequence is interrupted, as by calling register contents into the display, the printing mechanism is disabled until a postage amount is again put back into the display. This can be done by depressing the SET button 119, which recalls the postage amount the meter is set to into the display, when operated after a non-numeric (not 0–9) key or by entering a new number and depressing the SET button which sets the meter printing mechanism to the new number.

Provision is made for entering funds into the meter (incrementing descending register and control sum) by means of lock-switch 121 located on keyboard 34. Funding the meter is accomplished by obtaining a funding combination from a centralized data center. Next, a key is inserted into the keyway of the lock-switch to free the switch. The switch is turned to a first operative position to enter the amount of postage desired.

Having entered the funds desired with the keyboard 34 the meter program calculates a combination based upon the entered amount.

Switch 121 is turned to a second position and the combination received from the data center is entered into the keyboard. The program now compares the internally generated combination with the entered combination. If they match, the meter will be recharged when the switch is turned to a third position.

Within the SCAN routine, periodic checks of the logic power supplies are made to determine when to shut down the meter. When the voltage sensors (see FIGS. 12a and 12b) detect the voltage falling below a preset level, there is a certain minimal amount of time available (even with complete external power removed) in which to complete any routine in progress, sense the low voltage condition, disable the printing mechanism, and transfer register contents from working memory to the nonvolatile memory. This sequence is entered in shut-down and low line voltage situations where there isn't sufficient voltage to guarantee proper operation. The main program can only be re-entered through a complete powerup cycle described previously.

Each RAM chip of this particular system (MCS-4) also provides an output port (for example, port 25 of FIG. 6) for providing the system with communication capability with peripheral devices. As aforementioned, these ports have four [8 4 2 1] output lines.

The RAM chip 16 shown in FIG. 6 allocates the first 6 locations (0 through 5) in the first bank (200) for the descending register 815. The six locations will provide for a maximum dollar allocation of $9,999.99 (six digits). In other words, the postage meter system can be funded to a maximum of $9,999.99.

The allocation for the piece counter 817 (201) provides 7 locations, which on a piece count basis will provide a total of 9,999,999 pieces. The capacity of the piece counter must necessarily be large, since it is the total running account of each and every piece of mail that is processed over the life of the machine.

Similarly, the control sum register 818 (202, locations 0 through 9) and the ascending register 816 (200, locations 6 through F) provide a very large capacity (a dollar total of $99,999,999.99) because these sums are continuously increasing for the life of the system.

Batch Sum 819 (201, location A through F) and Batch Counter 820 (202, location A through F) have capacities equal to the capacity funding of the descending register, since in any batch run one can never spend more in a pre-funded system than the available funds stored.

The locations 0 through 3 and C through F of bank 203 are reserved for registers which are used to control the setting of the printer mechanism from a previous meter setting ("number meter set to" (SETNG) register 211) to a new meter setting ("meter setting" register (MSR) 307).

These registers only require four word lines, since the printing mechanism of this invention as shown in FIGS. 3 through 5, has a maximum setting of $99.99. Naturally, if the printer had only a three bank setting ($9.99), only three word spaces would be needed in these particular registers.

Status flag 821 is used in the programming to monitor stepper motor 50 (FIG. 3). Status flags 822, 823, and 824, respectively are used in the programming to monitor the setting of the printer banks (FIG. 3).

FIG. 7 shows the memory allocation provided by RAM chip 17. The first bank of RAM chip 17 (locations 0 through F) contain the seed number for generating an internal funding combination for the RMRS program. This seed number is changed for each funding operation. This number is one of a series of numbers varying in a pseudo-random manner such that the generated combinations are continuously changing. This aspect of the RMRS program will be explained in more detail with reference to FIG. 32. Bank (204) contains storage for an addition register 210 in locations 7 through F. The addition register is for the purpose of temporary storage and for adding to the regular postage to be printed, an increment of additional or special charges, i.e., insurance, certification, special delivery, etc. For example, suppose it was desired to add 50 cents additional postage to the regular postage amount of 10 cents. First, the numbers one and zero (ten cents) would be entered into the numeric display 115 by means of keys 107 of the keyboard. Next, the button 117 is depressed, which transfers the 10 cents from the display to the additions register 210. A five and a zero (50 cents) are then keyed in, and appear in the display. The button 117 is again depressed to add the 50 cents to the additions register 210, and the display providing a total of 60 cents stored in the additions register. The set button 119 is then depressed to set the meter to sixty cents.

FIG. 8 depicts the memory allocation in RAM chip 18. Bank 205 (location B through F) contains the lamp output area 206 shown in more detail in FIG. 8*a*. Bank (207) has locations 7 through F allocated for the images of the display contents 208. The numeric words from this storage space appear in display section 115 (FIG. 5*a*). Lamp output register 206 (spaces B through F) in bank (205) applies to the display section 116.

Storage space 212 (space 6 of bank 207) is allocated for placement of a new digit word prior to its being entered into display contents 208. The purpose of this storage space is that it serves to provide a means to clear display contents 208, if the previous operation was not one which allowed for entering a number into display contents 208. In other words, the new digit space is an intermediary storage facility for storing a new display digit, until it is determined where in the sequence of events is the information being entered to the display.

The word spaces in banks (205) and (207) of FIG. 8, corresponding to "batch flag" 305 (bank 205, status location 0); "status flag" 311 (bank 207, status location 0); and "$ unlock flag" 309 (bank 207, status location 2) are used in the programming to indicate a particular operation conditions. These indicators will be further discussed hereinafter.

RAM chip 19 is illustrated in FIG. 9. The first bank (214) of ram (3) 19 is used for storing the working area for seed number "Q". The stored constants "R" and "S" (banks 2 and 3) are used together with the seed number "Q" to obtain an internal meter combination for the RMRS program (see FIG. 32). The fourth bank at this RAM is used as a working area for calculating this combination.

Status flags 829, 830 and 831, respectively, are used in the RMRS program to indicate the operative stages in the RMRS funding operation (see FIG. 32). The status words 215 and 216, respectively, of bank 214 are used in the operational control of the setting and printing mechanism of FIG. 3.

FIG. 10 shows the various input ports of the ROM's.

FIG. 11 is an electrical schematic diagram of the non-volatile memory circuitry 37 shown in block diagram in FIG. 2. The non-volatile memory consists of two dual 128 bit static shift register 140 and 141, respectively, as shown. These shift registers are of the complementary MOS (CMOS) type. CMOS was chosen because of its very low power consumption in the quiescent state. This allows for powering the memory by means of a battery 143, which will maintain the integrity of the memory for extended periods of time, i.e., the memory will not be erased. The particular shift register components (SCL 5172) were manufactured by Solid State Scientific, Inc. of Montgomeryville, Pennsylvania 18936. These components have been presently discontinued, but there are many other similar components currently on the market, e.g., RCA's CD 4031 AE and Motorola's MC 14157CL.

In their power off state, the shift registers 140 and 141, as well as the transmission gates 142 and 143, respectively, the NOR gates 144 and 145, respectively, and the flip flop 146 all operate from the power supplied by battery 143. Flip flop 146 is in the low logic state ($Q$=0; $Q$=) at this time, which disables gates 142, 143, 144 and 145. Transmission gates 142 and 143 effectively disconnect the battery operated circuitry outputs from the microprocessor system. This prevents excessive battery current required to supply the low impedance inputs of the ROM(2) 13 and load resistors 139 during the power off condition. Thus, battery life is extended considerably. The inputs to the shift registers 140 and 141 are of characteristically high impedance (CMOS) and therefore, do not require this form of isolation. Gates 144 and 145 are disabled by flip flop 146 in the "power-down" and transition states. This inhibits spurious signals on lines 147 (clock signal line) and the memory disable line 148. This is necessary, because during "power-up" and "power-down" sequences, there may be spurious signals on the output port 27 (FIG. 1*d*) supplying the control signals. This is so, because at this time the power signals are non-zero, but have not as yet reached their specificed operating values. During "power-up" and "power-down" the microprocessor is not functioning predictably and memory must therefore be protected, which is accomplished by gates 144 and 145.

During "power-up", transistor 149, which is initially off, remains off until line 150 is connected to ground. This occurs when optical switches 152 and 153 (FIGS. 12*a* and 12*b*, respectively) turn on. Optical switches 152 and 153 are part of the −10-volt and +5-volt power supply monitoring circuits, and turn on when the −10 volt and +5 volt supplies respectively, reach their operating values. Both of these power supplies are necessary for the proper operation of the microprocessor system.

As power begins to come on, diode 155 through which battery current flows, turns off and diode 156 turns on. This switches the memory over to the main power supply. The reverse procedure is experienced during shut-down. When line 150 becomes low, transistor 149 turns on, causing connection point 154 to go high. This in turn causes the Q output of the flip flop 146 to go high via line 157. This enables gates 142, 143, 144 and 145 resulting in making the memory fully operative with the microprocessor system.

During start-up, a reset signal to the microprocessor is generated by the circuit of FIG. 13. The reset signal initializes the central processor unit (CPU 10 of FIG. 1*d*), and starts the program of the system executing from location/φφφ in ROM. The beginning portion of the program contains initialization procedures which are only executed once during the start-up sequence. Included in this start-up sequence, is a subroutine INRAM described with reference to FIG. 22. This subroutine transfers the contents in the shift registers 140 and 141 to the working area (RAM) of the microprocessor system. Data from these non-volatile shift registers 140 and 141, comprising "postage meter register" data, is read into the microprocessor system through ROM input port (2) 31 as shown in FIGS. 1*d* and 10. Each sequential word of data in the shift register memory is accessed by writing out a clock pulse to shift registers 140 and 141 via bit 8 of output port 27 as shown in FIGS. 1*d* and 8. After all of the 128 words of the shift register memory are loaded into RAM, the non-volatile memory remains idle until a shutdown sequence (subroutine DOWN of FIG. 23) is initiated. The shutdown sequence will result if either or both of the power supplies (+5 volt and −10 volt) begin to turn off. The optical switches 152 and 153 (FIGS. 12*a* and 12*b*) then turn off, thereby turning off transistor 149. This in turn causes connection point 154 to go low. In addition, the voltage on line 158 goes low. The line 158 is connected to the test input on the CPU 10. This test input is read periodically during program execution, and when it is read as a logical low, the program branches to the DOWN subroutine (FIG. 23). The "postage meter register" data in RAM is now read, and then written out to the shift register memory via output port 26 of FIG. 7. This "postage meter register" data may have changed in the hiatus between initialization and shutdown due to the entering of new postage. After the data word information is written out to CMOS shift register memory, a clock pulse is written out via bit 8 output port 27 of FIG. 7. This enters the data word into the non-volatile memory, and then the next sequential word is accessed in RAM memory. The sequence of accessing and writing of the sequential data words continues until the entire contents of RAM memory has been transferred back into the shift registers (non-volatile memory). After the transfer has been completed, a memory disable signal is written out to the flip flop 146 via bit 4 of output port 27 and line 148. This causes the "Q" of the flip flop to go to zero, which disables the memory. To reinitiate the memory system, both optical sensors 152 and 153 must turn on to start the sequence again.

It should be noted, that the above scheme of transferring the contents of memory need not be required, where the "working" memory areas are themselves indestructable. For example, the RAM memory may be furnished with a hold-up battery, thus eliminating the need for the CMOS shift register memory. "Working" storage may also comprise a core memory or other similar non-volatile storage components, such as a plated wire memory, a magnetic domain memory, a MNOS memory, etc.

FIG. 12*a* shows the electrical schematic for the −10 volt supply monitoring circuit. The −10 volt supply is monitored by a voltage regulator IC 159, connected to form a voltage sensing circuit. The input voltage applied to line 160 powers this circuit. The circuit contains an internal zener reference diode. The input voltage is compared against this reference, and when it exceeds a predetermined value set by the potentiometer 161, the output switches on. This causes the LED 162 of the optical switch 152 to energize. This turns on the phototransistor 163 of the optical switch 152, which provides the part of aforementioned input to the memory circuit of FIG. 11, and also provides an input to the reset circuitry of FIG. 13. The optical switch 152 is made by the Monsanto Company, and has a part No. MCT-2. The IC regulator 159 is a standard part No. 723, manufactured by Teledyne, Signetics, Motorola, etc.

FIG. 12*b* depicts the electrical schematic for the +5 volt supply monitoring circuit. This circuit performs a similar function as that shown in FIG. 12*a*. The external zener diode 164 is used as a reference. A differential amplifier 165 (RCA, CA3046) compares the input voltage supplied on line 166, against the reference. When the input exceeds a predetermined value set by the potentiometer 167, the LED 168 of the optical switch 153 turns on. This causes the phototransistor 169 of the optical switch to supply an output to the memory circuit of FIG. 11, and also to the reset circuitry of FIG. 13. In the circuit of FIG. 12*b*, a 723 IC is not used because the voltages being monitored are not sufficiently large to properly bias the circuit.

The monitoring circuits shown, are respectively connected across the filter capacitors 170 and 171 of the power supplies. The monitoring circuits are set to switch at a threshold several volts greater than the output voltage on lines 174 and 175, respectively. If power is lost from the AC line supplying power to the rectifiers, and the load connected to the output voltage lines 174 and 175 remains constant, the filter capacitors 170 and 171, will respectively discharge in a nearly linear fashion until the respective regulators 172 and 173 start failing to regulate due to the insufficient supply voltage.

When the rectified voltage drops below the sensing voltage threshold set by the potentiometers 161 and 167, respectively, of FIGS. 12a and 12b, the optical switches 152 and 153 (FIGS. 12a and 12b) turn off. This in turn generates a signal sensed on the CPU test line, which initiates the aforementioned shutdown routine.

As long as the maximum time to detect the shutdown signal and the time to transfer the register contents from working RAM memory to the non-volatile memory, does not exceed 20 milliseconds, there will be sufficient time to preserve the memory, and operate the microprocessor in a defined mode. The time parameter is a function of the filter capacitors, load, sensing voltage, and output voltage. The 20 millisecond value has been obtained by choosing the worse load condition for the system.

The reset circuitry of FIG. 13, comprises a one shot 178 set to provide a guaranteed minimum width pulse. The input to the one-shot 178 is from the outputs of the power supply monitoring circuits of FIGS. 12a and 12b, respectively.

FIG. 14c illustrates the power supply circuitry (−24 volts) used to operate the stepping motor 50, the solenoids 60 and 70 of FIG. 3, and the message display lamps of section 116 of FIG. 5a. The zener diode 179 regulates the voltage outputted on the line 180.

FIG. 15 shows the circuitry associated with the multiplexing shift register (φ) 20 of FIG. 1d. This shift register is a 10 bit serial-in/parallel-out S/R, which is used in this postage system to multiplex both the display and the keyboard (see FIGS. 1d, 1b and 16). The multiplexing is accomplished by entering a logic "1" into the shift register, and shifting it through, thus enabling the outputs one at a time. Nine of the outputs as shown in FIG. 15, are connected to anode drivers 181, which operate the Panaplex display in a multiplexed mode. The Panaplex display of FIG. 16 is manufactured by the Burroughs Corp. The anode drivers 181 are of a common, well known type, similar to those described in the technical brochure (advance copy) put out by the Sperry Information Displays Division, Scottsdale, Arizona, entitled: "Multiplexing Sperry SP-700 Series Information Displays", Page 28.

FIG. 16 illustrates the electrical schematic for the keyboard and the display (sections 115 and 116) of FIG. 1c. Section 115 of the display is shown at the top of FIG. 16, and represents the aforementioned gas discharge Panaplex display. Below the gas discharge display, are shown the indicator lamps, (section 116) which are powered by the voltage supply of FIG. 14c, and are controlled by the shift register and switching circuitry shown in FIG. 17. The 300 ohm resistors in the lamp circuit are used to limit the current to the lamps (the lamps are 12 volt lamps). The electrical schematic for the keyboard 34 is shown below the lamp circuitry. The four horizontal (row word) lines, and ten vertical column word) lines intersect to provide a select position. The "row word" lines are connected to the ROM input port 29 (FIG. 1d), and seven (all ten vertical lines are not used) "column word" lines are connected to the shift register 20 of FIGS. 1d, and 15. A discussion on multiplexing a keyboard using an Intel shift register (4003) and microprocessor (4001) can be found on pages 51-52 of the Intel Users Manual for the MCS-4[R] Micro-Computer Set, the Feb. 1973 edition (Revision 4).

FIG. 17 depicts the electrical schematic for the shift register circuitry controlling the indicator lamps of FIG. 16. Shift register 21 and 22 (see FIG. 1d) are 10 bit serial-in/parallel-out S/R's which are utilized as port expanders. A bit pattern corresponding to the particular indicator lamps to be turned on, is transferred to the shift registers 21 and 22 in a serial manner from register 206, RAM(2)18, (please refer to subroutine LDLMP of FIG. 39). The shift registers 21 and 22 provide logic "1" outputs to respective transistors 182 (typical) which act as switches, which in turn light their associated lamp (FIG. 16).

FIG. 18 illustrates the decimal point circuitry which turns on the decimal point separating the "dollars" and "cents" in the numeric display 115. The decimal point is inhibited from appearing in the display, (lines 184 and 185, respectively) when the "piece count" or the "batch count" is being displayed. The digit to be displayed is written out in BCD form on RAM output port 26 (FIG. 1d) to the decoder driver 183 as shown. The output of the decoder driver 183 is decoded for the seven segment display shown in FIG. 16 (top). The decoder driver 183 (DD 700) is manufactured by Sperry Rand (SP-700 Technical Bulletin, Oct. 1971).

The blanking feature incorporated into the decoder driver 183 is driven by RAM output port 25 (FIG. 1d) bit 8. Besides suppressing leading zeros, this blanking is also used in the multiplexing process. A discussion of blanking requirements for multiplexed gas discharged displays can be found on page 5 of the aforementioned brochure: "Multiplexing Sperry SP-700 Series Information Displays".

The resistor 186 is a current limiting resistor used in the power supply for the stepping motor. Resistors 187 and 188 are current limiting resistors used in the power supply to the LED's of the optical switches 190, 191, 192, 193 and 194, 195, 196, 197, respectively (FIG. 19).

FIG. 19 shows the electrical schematics for the meter monitoring photocells, the stepper motor coil drivers, and the print sensing photocell. The print sense photocell 189 of well 99 in FIG. 3 is shown in electrical schematic at the bottom of FIG. 19. This photocell detects the completed rotation of the printing drum 42 (FIG. 3). When this photocell senses that postage has been printed, the program branches to a routine that updates all the "postage meter" registers by the amount of postage to which the meter was set. This photocell is multiplexed into the "meter" along with keys of the keyboard 34 (FIGS. 1b and 1c).

The optical switches 190 through 197, which monitor the mechanical functions of the "meter" are multiplexed into the input port 32 by shift register (3)23 (FIG. 1d).

RAM output port 28 (FIG. 1d) is used to drive the stepping motor 50 (FIG. 3). This output port is connected to an RCA CD4050 buffer, which in turn drives darlington transistor swiches 250, 251, 252 and 253, respectively via lines 254, 255, 256 and 257, respectively. The motor 50 is powered by the −24 volt supply of FIG. 14c. The stepping motor 50 (FIG. 3) is a RAPID-SYN, Model 23D-6102A, manufactured by Computer Devices Corporation, Santa Fe Springs, California. The characteristics of the motor (specifications, switching, sequence, schematic, etc.) are given in bulletin C and D, Pages 6–73.

The respective darlington transistor switches 258 and 259 are used to energize the bank select solenoids 60 and 70 of FIG. 3. These switches receive their inputs from shift register (4)24 of FIG. 1*d*, via lines 262 and 263, respectively.

The darlington transistor switch 260 is used to energize the "meter enable" solenoid (not shown), which is used to free shaft 57 (FIG. 3) for rotation. The switch is inputted on line 264 (FIGS. 19, 19), by the signal used to power the "meter enabled" lamp of the display (FIG. 16).

All the connections not specifically mentioned, and which are relevant to the circuitry depicted in FIGS. 11 through 19, are shown by pin connection numbers as illustrated.

Remote Meter Charging Operation

Generally speaking, most security systems in one way or the other require that there be two separate but matching kinds of information to effect access, i.e., two complementing combinations. With the meter recharging system illustrated in FIG. 1, there are two combination generating machines: a) a digital computer located at a data center, and b) one or more remotely located electronic postage meters. Each of these two machines exist to generate a combination which being the match or complement of the other, will allow postage meter users to refund (recharge ) their postage meters. This will be done without the inconvenience of physically having to transport their meters to postal authorities.

The operator or user of a postage meter refunds his meter by first calling the data center via telephone, and in some way identifying himself, or the meter. This can be accomplished by informing the data center of the meter number, or by giving the center a unique account number, or both. This stage of the transmission can be accomplished by either a voice or tonal input. The computer at the data center uses this information to verify that the call is authentic. In other words, that the call is originating from a valid postage meter user.

When the call is validated, the computer formulates a response to the user via the answer-back unit, requesting the numerical values of one or more funding registers in the meter. After the user supplies these values via the telephone push buttons, the computer checks to see if the meter is functioning correctly. The computer also checks one register against the other to see whether a mistake may have occurred in the entry of these values. The user is then asked to supply the amount of postage funds he desires to add into the meter. The computer then determines whether there is a possibility that the descending register of the meter may overflow with the addition of the desired funds. Assuming that no problem exists, the computer proceeds to calculate a combination which is a function of the postage requested. The computer then updates the file of the user's transactions, and the generated combination is furnished to the user via the answer-back unit.

Upon receiving the combination provided by the data center, the user unlocks his postage meter. The meter may be fashioned with a variety of locking devices such as a combination lock, a key operated mechanical lock, etc. The particular lock used in the instant invention combines a switch and lock combination, i.e., a switch is operative to various switching positions by the insertion and turning of a key.

When the user of the present system receives the combination, he inserts a key into the switch-lock, and turns the switch to a first position. This action initiates a sequence of events. First, the meter's "addition register" is cleared. Then, an indicator light is activated in the display, that informs the user to enter the amount of postage. This amount must of course be the same as that submitted to the data center. Finally, the turning of the switch to the first position initiates the call up of one or more stored constants in the non-volatile memory of the postage meter. These constants will be used to first generate random numbers, which will be subsequently used to generate a complementary combination to the one furnished by the data center.

After the user enters the postage amount, he then turns the switch to a second position. A second indicator lamp is now lit, instructing the user to enter the combination supplied to him by the data center. Meanwhile, the postage meter has operatively combined the entered postage with the generated random numbers to provide an internal combustion. Now, when the user enters the combination from the data center, the two combinations will be compared. These complementary combinations being unique to any previous contents of the meter, and to the postage amount entered, provide a high security against detection which is so essential to postal transactions.

After the user enters the combination supplied by the data center, he turns the switch to a third position. The postage meter now compares the entered combination with the internally generated combination. If these combinations are a match, an indicator lamp will be lit informing the user that the entered combination has been validated. If on the other hand, there has been a mistake in entering a proper combination, an alternate indicator light will inform the user that he must repeat the funding procedure.

The amount of postage funded into the meter will be displayed in the numeric section of the display, when the combination has been validated. At the same time, this amount is added to the "descending" and "control sum" registers. Finally, the random numbers which were generated in this meter funding operation will be stored in the non-volatile memory to provide the necessary constants for a subsequent meter funding procedure.

The general method of data processing by the data center 5 will be explained in more detail with reference to FIG. 31. The inventive method is similar in many ways to that depicted in U.S. Pat. No. 3,792,446.

One of the important differences of the present method, however, is that a means is provided of inputting variable postage amounts into a postage meter, rather than a fixed increment as aforementioned. The combination presented to the meter user will be a function of the amount of postage requested and the data center will provide a different combination depending upon the amount requested for recharging the meter.

Now referring to FIG. 31, a flow chart is shown which illustrates how an incoming telephone call from a user at one of the remote meter stations 1 (FIG. 1) is processed by the data center 5.

When a user at a remote postage meter station seeks to recharge his meter 2, he keys in the telephone number of the data center 5 on his telephone 3 (FIG. 1). The data center answers, as indicated by block 939. This completes the telephone connection. A voice response is now provided (block 940) by the computer controlled answer back unit 8 (FIG. 1). This response is transmitted to the user and requests a numeric input which will identify the user, the meter, or both (in other words, which remote station 1 is on the line). This identifying input can comprise either an account number, a meter serial number, or both. These identifying numbers will be held in the memory of the computer 7.

After requesting the numeric input, the computer 7 converts to an input mode illustrated by block 942. The computer now awaits a user response. The numeric response is in the form of a tonal input provided by the depressing of the touch-tone telephone keys of telephone 3 (FIG. 1). The frequency encoded digit inputs are converted by the data set 6 at the data center 5 into computer language for computer 7. The numeric input need not be limited to a fixed number of digits. A fixed number of digits, however, can be used to terminate that portion of the transmission.

When the computer receives this information, it searches its memory to determine whether the submitted account number is stored therein. If a comparable account is located in memory, the submitted account number is valid, and decision block 944 is exited along branch line 941 to block 946.

If on the other hand, a comparable account number cannot be located in memory, the decision block 944 will exit along branch line 943 to a second decision block 945. The computer now determines how many chances the caller has thus far taken in attempting to input a valid account number. If the caller has committed less than three attempts to enter the proper account number, decision block 945 is exited along branch line 947 to block 948. The computer 7 now commands the voice answer back unit 8 (FIG. 1) to transmit a request to the user for a resubmission of the account number.

The program branches back via line 949 to block 942, and the computer is again conditioned to receive an identifying numeric input.

The user is given three tries to enter a valid account number. If on three passes through decision block 945 the caller has failed to present a proper identity number, the decision to terminate the telephone connection is made via line 950 to block 951.

However, should the user succeed in entering a valid number in one of the three allotted tries, decision block 944 is exited via line 941, as aforementioned.

In the preferred embodiment of this invention, block 946 is now entered, and a voice response is generated and then transmitted to the user, requesting entry of the postage meter number. This request, however, could have been made during the first request for identification, if so desired. The request for the meter number can be made to replace the account number, or can be used in conjunction with it, as in the present embodiment.

The computer now converts to an input mode via block 952, and awaits for the meter number entry. When the meter number is entered, the computer then determines (decision block 953) whether this entry is valid. It must be considered, that some particular accounts (identifying account numbers) may have more than one meter assigned to them. However, every account will comprise meter numbers which are themselves individually unique so as to prevent the likelihood of confusion.

When the entered member number is found to be part of the account previously identified, branch line 954 is taken to block 956. On the other hand, if a valid postage meter number cannot be matched to the account, decision block 953 is exited via line 955 leading to a second decision block 957. A check is now made to determine if more than three attempts hve been made to enter a valid meter number. If less than three attempts were made, branch line 960 is taken to block 961. A voice response is formulated and then sent to the user requesting a resubmission of the meter number. Block 961 is exited via line 962, and block 952 is re-entered. The computer now awaits a resubmitted number. If three attempts at submitting a valid postage meter number do not provide an acceptable number, then decision block 957 will be exited along branch line 958 to block 959. The postage meter user is now advised to call a particular telephone number for personal assistance. The computer then breaks the telephone connection via block 951.

The purpose in asking the user to seek assistance is to determine why the user is having difficulty in submitting a valid meter number, after having submitted a valid account number. Having previously entered a proper account number, the caller is in all probability a valid account party, and therefore should not now be experiencing difficulty.

As aforementioned, a valid member number entry will provide an exiting from decision block 953 along branch line 954 to block 956. The computer now controls the voice answer back unit to transmit a request for the user to enter the current balance existing in the meter's ascending register. To obtain this value, the user pushes button 113 (FIG. 1*c*) on keyboard 34 of meter 2. The amount in the ascending register will then appear in the numeric display 115 (FIG. 1*c*). The user then communicates this number to the data center 5 via telephone 3 (FIG. 1) as requested. The computer 7 enters an input mode via block 963 to accept the ascending register entry. Decisin block 964 is now entered, and the entered ascending register amount is checked to determine whether this amount is consistent and reasonable with the known size of this register. In other words, whether the amount reported is not larger than the maximum storage capacity of the register. If the entered amount is a reasonable value, then decision block 964 is exited via line 965 to block 966.

If, however, the amount of the ascending register does not check out, then branch line 967 is taken to block 968. The computer now generates a voice response via the answer back unit, requesting the user to repeat the procedure. Line 969 is then taken to block 956, and a voice response is again transmitted to the user requesting the ascending register value. The computer again goes into an input mode (block 963), accepts the entry, and makes a format check of the ascending register value (decision block 964). The present ascending register value can also be checked against the previous ascending register amount to determine if it is greater or equal thereto.

Block 966 is entered via line 965, when the format check is proper. The computer now generates and then transmits a response via the answer-back unit, requesting entry of the contents of the descending register. The user obtains this value by depressing key 114 on keyboard 34 of meter 2 (FIG. 1*c*). The value of the ascending register will now be cleared from the numeric display 115, and the descending register amount will appear therein.

The user then transmits this value back to the data center 5 via telephone 3 (FIG. 1). Block 970 is entered and the computer then goes into an input mode to accept the descending register value. Decision block 971 then calls for determining whether the entered value of the descending register is consistent and reasonable with the known size of this register. If the value submitted checks out, then decision block 971 is exited via line 972. Block 976 is then entered. If some error is detected in the format check, then decision block 971 is exited via line 973, and block 974 is entered. The computer then generates a voice response via the answer-back unit, informing the user to repeat the procedure. Line 975 is taken to block 966, and the user is again instructed to enter the contents of the descending register. The user again transmits this information to the data center, and it is accepted by the computer (block 970). Decision block 971 is re-entered, and if the format check is proper, the program continues via line 972 to block 976. Block 976 calls for checking the submitted descending register amount against a previous reading in memory, which was obtained during a prior recharging of the user's meter. The current decending register reading cannot be greater than the stored memory value, since the descending register is decremented by the amount of postage issued for each recharging of the meter. If, however, the present reading is in fact greater than the stored value, decision block 976 is exited via line 977. Decision block 978 is then entered to determine whether there has been three passes through the previous decision block 976. If in fact there has been three passes through the prior decision block, this indicates that a problem may exist with the descending register. Decision block 978 is then exited via line 979 and block 959 is entered. The user is then advised to call a service telephone number and obtain assistance. The telephone connection is severed (block 951) thereafter.

If, however, three passes have not occurred through decision block 976, it is assumed that the user has made a mistaken entry to the data center, and decision block 978 is exited on line 980 to block 968. The user is now requested to repeat the ascending and descending register readings as was previously required.

If upon reaching decision block 976, it is determined that the present descending register reading is properly a lesser value than the stored prior reading, line 981 is taken to decision block 982. The sum of the ascending and descending register readings is now checked against a summation of the stored prior ascending and descending register values. If an equality is obtained, then branch line 983 is taken to block 986. If, however, the sums do not match, the decision block 982 is exited along branch line 984 to another decision block 985. This decision block checks whether the disparity in the register sums is due to an overflow condition in the ascending register. If an equality can now be found, line 987 is taken to block 986. If, however, an equality is still not obtained, then a fourth decision block 989 is entered via branch line 988. This decision block seeks to determine an equality between the present register sum and a stored sum prior to the previous stored sum. If this check provides an equality, it means that a previous funding combination was requested, but never entered into the meter. Branch line 990 is then taken to block 1004, and the computer formulates a response via the answer-back unit for supplying the postage meter user with the previously provided funding combination and postage amount, which had not been entered.

If, an equality is still not obtained in decision block 989, a fifth decision block 992 is entered via line 991. This decision block determines whether there is an equality in the sums under consideration in block 989, with further consideration of there being an overflow of the ascending register. If an equality is found for this condition, block 1004 is entered via branch line 993. The postage user will then be given the previously generated funding combintion which had not been entered.

If an equality is not obtained after the fifth decision block 992, branch line 994 is followed to decision block 978, which tests for three passes through decision block 992. If there has not been three passes, it is assumed that a mistake has occurred in a register entry, and block 968 is entered via line 980. If, however, there has been three passes through block 992, then it is assumed that a more serious problem exists, and block 959 is entered via branch line 979. The postage meter user is instructed to telephone a service number, and then the connection between the user and the data center is severed via block 951.

As aforementioned, an equality in either decision blocks 982 and 985 will provide access to block 986. The computer formulates a response via the answer-back unit requesting the meter user to enter the amount of postage to be funded into the machine. The computer then goes into an input mode (block 995) to accept the entry of the postage meter user. Decision block 996 is then entered to determine whether the amount requested is of sufficient numerical size to be handled by the registers without causing an overflow condition. In other words, the amount requested cannot be so large, that it cannot be properly set into the funding registers. If the amount is properly within the upper limit of the funding registers, branch line 997 is taken to decision block 998. It is now determined whether the amount requested is less than a given minimum. The reason for this determination is that it is desirable to prevent the meter user from soliciting a frivolous amount of postage, to discourage tampering, and the otherwise wasting of valuable computer time.

If the amount requested is not frivolous, branch line 999 is taken to a third decision block 1000. Determination is now made to see whether the added amount will cause the descending register of the meter to overflow. If it is determined that this will not occur, then branch line 1001 is taken to block 1002. The computer now calculates a new combination for the postage meter user. This combination is both a function of the requested amount of postage and a series of random-type numbers. A typical method of deriving a postage combination will be described hereinafter with reference to the flow chart illustrated in FIG. 32.

After the computer formulates the new combination, the record (user's file) in memory is updated to reflect the changes to the ascending and descending registers of that particular meter wrought by the present recharging (block 1003). The computer now goes into an output mode, and block 1004 is entered to transmit the new combination to the user.

It should be noted that the update of the computer registers (block 1003) proceeds the transmittal of the information to the user (block 1004). This procedure acts as a safeguard against the issuance of postage without it being properly recorded. Also, if a prior combination was never entered, as when block 1004 is entered over lines 990 or 993, then the prior combination will be revealed to the user without updating the file. This is only natural, since the file was already updated in the prior request for funds.

After the combination has been given to the user (block 1004), there may be need to repeat it. Block 1005 is entered, and the computer is conditioned to receive three digits from the user. Decision block 1006 is entered, and if no digits have been received, the connection is severed (line 1008 to block 1009). If the user, however, taps three digits "RPT" on his touch telephone, decision block 1006 is exited on line 1007, and the combination is repeated (block 1004).

As aforementioned, the computer checks the amount of the requested postage (block 996) to determine whether it can be accommodated by the meter registers. If it cannot, branch line 1010 is taken to decision block 1011. The computer then determines whether three passes have been made through block 996. If three passes have been made branch line 1012 is taken to block 959, and the user is instructed to telephone for assistance. If three passes have not been made, then the user is requested to repeat the postage amount desired (branch line 1013 to block 1014). Block 1014 is exited along line 1015 to block 986, and the computer enters an input mode to await the postage input.

The user is also asked to seek assistance (block 959) if either a postage amount is below a mimimum value (exit block 998 on line 1016) or if the descending register will overflow (exit block 1000 on branch line 1017).

Once having received the combination from the data center, the user is then ready to recharge his meter. The flow chart illustrating the recharging postage meter routine for operating upon the combination received from the data center, is shown in FIGS. 32 and 32*a*.

The meter is turned on (block 1100) and initialized, and the flags are set in memory (block 1101). The keyboard 34 and the meter recharging switch 138 (FIGS. 1*b*) and 1*c*) are scanned for inputs (block 1102). Decision block 1103 is entered to determine whether the key switch 138 has been turned to a new position. If there has been a change in the key switch, as when a key is initially inserted and the switch is turned to position 1, decision block 1105 is entered via branch line 1104. If no change in the key switch has occurred, then a determination is made to see if there is a keyboard input (decision block 1107 is entered via branch line 1106). The program will then either branch to perform a function called for by the keyboard (line 1108 is taken to block 1109) or the keyboard and key switch is recrutinized for an input (block 1102 is entered via branch line 1110).

Once a determination has been made that the key switch 138 has been activated (block 1103), then it is determined what step in the recharging procedure is being taken by the user, i.e., whether the user is preparing to key in the desired postage in the keyboard (turns switch to position 1); whether the user is about to enter the combination from the data center (turns switch to position 2); or whether the user has turned the key switch to position 3 to validate the recharging of the meter.

Having determined which position the switch is in, the routine branches to the corresponding line (position 1, line 1111; postion 2, line 1112; and position 3; line 1113).

Along branch line 1111, a decision block 114 first determines whether flag 1 in memory (RAM(3)19) is tagged (equals one). If this condition exists, it indicates that the routine corresponding to the first switch position has been already completed, and the routine then branches back to block 1102 (via line 1159) to scan for the next switch position routine. If not, block 1117 is entered via branch line 1116. A first number "Q" is retrieved from read/write memory (RAM(3)19, bank 2). A number "R" is then generated by mathematically operating upon the number "Q" (block 1118). Next a second number "S" is generated by mathematically operating upon the first generated number "R" (block 1119). After the numbers "R" and "S" are generated, an indicator light 122 lights upon the display panel 116 (FIG. 1*c*) requesting the operator to enter the desired postage amount (block 1120). The routine for the first switch position is terminated by tagging the first flag and clearing the second flag (block 1121). The routine then returns to block 1102 to scan for the next key switch position.

The operator of the meter now keys in the postage amount and turns the key switch to position 2. Decision block 1122 is entered via line 1112, and it is determined whether flag 2 is tagged. If so, the routine branches back to block 1102 via line 1123. If not, block 1125 is entered via branch line 1124. The value in the display (postage amount keyed by the operator) is then transferred to a working location "P" in memory. A number "T" is generated (block 1126) using the values "R", "S" and "P" (postage requested). One way of accomplishing this is by combining "R", "S" and "P" according to the formula:

$$T = (P \times R) + S.$$

Next, a portion of this resulting number "T" is selected to derive a combination "C" (combination of the meter) as per block 1127.

It should be noted at this point in the discussion that the computer in the data center has generated a combination "Cc" (computer combination) in exactly the same way as the meter has generated combination "Cm"; i.e., the computer had stored a distinct number "Q" for this particular postage meter, and then proceeded to generate numbers "R" and "S". When the user entered the postage amount "P", the computer generated "T" using the numbers "R", "S" and "P". The combination "Cc" was formed by selecting in like fashion with the meter, a portion of the generated number "T". The meter will only recharge, therefore, if "Cm" is equal to "Cc".

After the meter routine generates the "Cm" combination, an indicator light 123 (FIG. 1*c*) is lit on display panel 116 requesting the user enter the combination "Cc" obtained from the computer (block 1128). The second flag is set, and the third flag is cleared as per block 1129. The routine returns to block 1102.

The user now enters the computer combination "Cc" via the keyboard 34 (FIG. 1*b*) and turns the key switch 138 to position 3. The final portion of the meter recharging routine is entered via line 1113. Decision block 1130 determines if the third flag is tagged. If yes, the line 1131 is taken back to block 1102. If not, the combination "Cc", which has been keyed in and displayed, is transferred from the display register to a working portion of storage (line 1132 is taken to block 1133). Decision block 1134 is entered to determine whether the requested postage "P" will be accommodated by the descending register. If not, branch line 1135 is taken to block 1136, and an error indicator lamp is lit in display section 116. The routine is then terminated by tagging the third flag, clearing the first flag, (block 1150) and returning to the scanning of the keyboard (block 1102).

If, however, the third flag has not been tagged, decision block 1138 is entered via branch line 1137. Combinations "Cc" and "Cm" are now compared. If these combinations do not match, block 1140 is entered via branch line 1139, and indicator lamp 124 is lit to inform the operator that the recharging has not been validated. The routine is then terminated via block 1150.

If, however, the combinations are a match, branch line 1141 is taken to block 1142. The decending register of the meter is the incremented by the requested postage "P". The number "Q" is then replaced with the last generated number "S" (block 1143), and the indictor lamp 125 is lit on display panel 116 to inform the operator that the recharging is valid. The third flag is tagged and the first flag is cleared (block 1150) thus terminating the recharging routine.

Operation of the Meter

The operation of this computerized postage meter will be explained with reference to the flow charts shown in FIGS. 20 to 51, and the associated program appended to this specification.

While the above program has been of necessity written about the particular meter setting mechanism shown in FIGS. 3, 4*a*, 4*b* and 5, it should be understood that the essence, spirit, scope, and limits of this invention are considered to be of a broader character. In other words, the present computerized postage meter could have been easily programmed about a jet printing postage apparatus of the type shown and described in copending application, Ser. No. 433,805, filed Jan. 16, 1974. Also, it is to be understood that many other high speed printing apparatuses can be made compatible with the present computerized meter. Other such apparatuses include matrix and line printers.

With all such printing devices, the basic safeguards regarding postal security must of necessity be maintained, such as securing the printer against physical and electronic tampering.

Referring to FIG. 20, a generalized overall representation of the operation of this postage meter is shown in flow chart form. The meter system is first given power as shown per block 300. When the meter system is powered, a general system reset pulse initializes the microprocessor system. This causes the CPU registers, RAM memory, and I/O ports to be cleared, and starts the postage meter program executing from address ϕϕϕ.

The postage meter system operation is set in motion by recalling postage meter register data from the non-volatile memory and placing this data in the working area of RAM. Also, when the postage meter system starts its operation, the printer banks of the printing and setting mechanism of FIGS. 3, 4*a*, 4*b* and 5 are all set to zero. These are some of the major procedures represented by "initialization" block 301. In addition to these procedures, other functions are also performed, as will be explained hereinafter with reference to FIGS. 21 and 21*a*.

After "initialization", the system enters a SCAN routine shown in the general sense by blocks 302, 303 and 308 and in more detail hereinafter, by the flow chart of FIG. 25. The SCAN routine consumes the greatest portion of postage meter operation time. The principle function of the SCAN routine is to search for a depressed key on the keyboard 34 and multiplex the numeric display 115 of FIGS. 1*b* and 1*c* (block 302). Once having found a validly depressed key (block 308), the SCAN routine will branch to the appropriate subroutine corresponding to the function called for by that particular key. The SCAN routine will generate an address to a "look-up" table where the particular address of the subroutine corresponding to the key is stored. This stored address is transferred to register pair 6 in the CPU. The subroutine FCTN (which is a jump to the address in register pair 6) is then executed.

After a particular key is serviced (block 310), the SCAN routine is re-entered to re-inspect the keyboard for new and subsequent inputs. The spring photocell input is given priority over other keybord inputs to prevent the printing of postage without it being registered.

During the course of the SCAN routine, a periodic check is made as to the power condition of the system (block 303). In case of a power failure, the postage meter system must be able to complete any on-going opertions, and to retransfer the contents of working memory (RAM contents) back into non-volatile storage (block 304). The "powering down" and "save memory" sequences will be more fully explained hereinafter, with reference to the DOWN subroutine of FIG. 23. When there is a "power-down", a trap (block 306) is entered, and the program cannot re-enter the SCAN routine except by the initiation of a complete "power-up" sequence.

The meter initialization sequence block 301 is shown in more detail with reference to FIG. 21. The information in the non-volatile memory is transferred into working memory (RAM) via subroutine INRAM (block 312) which will be described in more detail with reference to FIG. 22. All four inprint wheels are then set to zero as per block 313 using the subroutine HOME of FIG. 24. Descending register contents are then loaded into the numeric display (block 314) and the check date reminder indicator lamp is lighted (block 316). The descending register contents are displayed at start-up to inform the operator how much funds are available for printing postage. The check date reminder, reminds the operator to set the date on the postage printing mechanism. The system then goes into the SCAN routine as previously mentioned.

An important part of the initialization procedure is the subroutine CHCK (block 315) shown in more detail in FIG. 21*a* Subroutine CHCK is used to detect errors that cause non-correspondence in the meter funding registers. If the sum of the descending and ascending registers minus the control sum register does not equal zero (block 801), the CHCK routine turns the "call PB service" indicator lamp on (block 804), and disables the meter from printing postage. If the registers properly correspond (block 802) the subroutine will branch back via line 803. This subroutine is very novel with regards to postage meter operation, since this is the first time a postage meter has had the capability of monitoring its own funding registers.

FIG. 22 depicts the flow chart for subroutine INRAM, which can be found in the appended program at the instruction address/142.

The subroutine INRAM transfers data from the non-volatile shift register memory into working area in RAM.

CPU index registers are initialized (block 317) to specify input and output ports operatively connected to the shift register memory, and to specify RAM memory locations where this data is to be stored. The output of the shift register memory is read through an input port (block 318), written into RAM (block 319) and written out on an output port to the shift register memory (block 320). The shift register is then clocked (block 321) to access the next memory word. The index register specifying RAM address is incremented (block 322) in preparation for storing the next word. A counter is checked to see if transfer of data is complete (block 373). If not, a branch is made back into the program (line 325) to pick up the next sequential word. When transfer of data is complete, the INRAM subroutine branches back via block 324.

FIG. 23 illustrates the flow chart for the subroutine DOWN, which can be found in the appended program at the instruction address/15A. As aforementioned, the DOWN subroutine is a procedure for saving the contents of the memory (transfer RAM contents to the non-volatile memory) in the event of a power failure or normal turn off.

This routine is entered from the SCAN routine only when an impending power failure has been detected.

CPU index registers are initialized (block 327) to specify location of working area in RAM, and to specify input and output ports connected with the shift register memory. A data word from RAM is read (block 328), then written out to the shift register memory (block 329). A clock pulse to the shift register (block 330) enters the data into memory. The RAM address is incremented (block 331) and a test made on a counter to determine if everything has been transferred (block 332). If not, the program loops back (line 333) to transfer another data word to the shift register. When the transfer of data has been completed, the loop is terminated via (line 334) and a "turn off" signal is written to the shift register memory (block 335). The program then loops in a trap (336). A complete "power-up" sequence is needed to get back into the program.

The subroutine HOME is flow charted as shown in FIG. 24, and has a program address/174.

The HOME routine is part of the aforementioned initialization procedure for the meter. It sets the print wheels to zero to establish a reference for subsequent setting operations. The only position of the print wheels that can be directly read by the system is the $\phi$ (zero) position. This position is determined by monitoring the wells 107*a, b, c, d,* respectively, by detecting the slot (zero postion) in slotted wheels 105*a, b, c, d,* respectively (FIG. 4*a*).

An index register is initialized (block 337) to specify the location of the Meter Setting Register 307, FIG. 6. Subroutine CLR of FIG. 47 selects the first set of photocells (block 338). The Meter Setting Register 307 is cleared (block 339) and the every step photocell 110*c* of FIG. 4*a* is read (block 340). If on a print step, (block 341) the program proceeds (via line 342) to select the printer bank (block 343). Monitoring wells (102 and 103, respectively monitoring the solenoids 60 and 70, of FIG. 3) are read and checked against the selected bank (block 344). If no contradiction exists, the following operation (via line 345) is selecting the next photocell bank and reading the monitoring well (107*a, b, c, d,* respectively of FIG. 4) corresponding to that bank to determine if the respective slotted disc (105*a, b, c, d,* respectively of FIG. 4*a*) indicates the selected print wheel is at the zero position (block 346). The CLR routine (block 347) is again used to select the first photocell bank. If the print wheel corresponding to the selected printer bank is not at zero (block 348), the print wheel is given one full printer step (block 354) corresponding to changing the setting of the print wheel by one unit towards zero. If no error is flagged in the step routine, the loop is re-entered via line 355 to again check for the zero position of the print wheel. This procedure is used to determine if the wheel needs another print step to reach zero. The loop is terminated via line 349, when the selected print wheel is at zero. If all four printer banks have not yet been set to zero, block 351 is exited via line 352 to block 343 where the next printer bank is selected. Setting the next print wheel to zero is done in the aforementioned manner. When all printer banks have been set to zero, the fifth position photocell (110*b* of FIG. 4*a*) is read (block 354). It should indicate a fifth position slot. If this is so, the HOME subroutine is terminated via line 356 through a branch back (block 360). Should any error be flagged, such as a photocell not indicating a mechanical response to a given signal, the error routine (block 359) is called via lines 364, 368, and 358, respectively.

If reading the every step photocell (block 341) at the beginning of the routine, does not show the printer to be at a full printer step, half a print step is generated (block 362) to align the main gear 51 with the tooth profiles 68, 68' on the yoke 63 of FIG. 4*b*. This procedure frees the yoke, so that it can move to select the printer banks.

FIG. 25 illustrates the SCAN routine having a program address of/01D. The primary purpose of the SCAN routine is to process keyboard inputs to the meter. The routine rejects multiple key depressions, (except for the print photocell input which is given priority over other inputs of the keyboard) and debounces the key input. When a single key depression is read for three successive scans, the routine generates an address in a look-up table where the address of the routine corresponding to that particular key is stored. The routine contains operations preparatory to, and following, the servicing of the key via FCTN (FIG. 26). A secondary function of the SCAN routine is multiplexing the numeric display 115 of FIGS. 1*b* and 1*c*.

Index registers are initialized (block 369) to specify display address, length of various counting loops, and I/O ports. Display blanking is determined (block 370) by examining the most significant digits of the display for leading zeros and storing an indicator. A bit is loaded into the multiplexer shift register 20 of FIG. 15 to start the multiplexer (block 371). A display character is read from the display register in RAM and written out to the decoder driver 183 (FIG. 18). The display is unblanked, if the character is not a leading zero. The keyboard input is then read and processed as per block 373 (see FIG. 38 for a detailed description). A delay routine (block 382) is entered to allow sufficient time for display. A check (block 384) is made to determine if the "power-down" sequence should be initiated. If not, the display is blanked and the multiplexer clocked to select the next display digit and set of keyboard inputs (block 388). A check (block 389) is made to see if the loop has been completed. If not, the loop is re-entered via line 390, the next display digit is written out, and the next set of keyboard inputs is read in. Upon completion of the loop, a check is made (line 391) to see if a valid priority input (print photocell) has been sensed (block 1200). If so, the LDLMP register 206 of FIG. 8 is cleared (block 1202) via line 1201. Next, the POST subroutine is initiated via block 1203. Upon completion of the POST subroutine, block 399 is entered, and the accumulator contents are stored in the status flag 311 of FIG. 8. The routine continues via blocks 400-402 as will be described hereinafter.

If no priority input has been read, a check is made (via line 1204) to see if a valid key depression has been sensed (block 392). If so, a batch indicator 305 (FIG. 8) is stored (block 396) (this indicator shows if the last operation had been calling a batch register into the display — this indicator is used in the CLEAR routine of FIG. 34). An address of a location in a look-up table is generated from the "ROW" and "COLUMN" words.* The LDLMP register 206 of FIG. 8 is cleared (block 397), because a routine called by the selected key may require that different indicator lamps be selected. A branch to the keyboard function is made in block 398. Upon return to the SCAN routine, the accumulator contents are stored in the status flag 311 of FIG. 8 (block 399), which is used to identify the last performed operation. This is necessary, because some keyboard functions are dependent on the previous function performed. The descending register is compared to the meter setting register 307 of FIG. 6 (block 400) to generate the "low postage" and "no postage" indications on the indicator panel 116 of FIG. 1c.

*The "Row word" is the information read into the input port 29 from the keyboard 34. The "Column word" identifies active multiple output, i.e. the bank of keys selected by the multiplexer. (Also refer to discussion with respect to FIG. 16.)

The meter checks its funding registers (block 401) as per the CHCK routine of FIG. 21a. The selected lamps are then turned on (402) and the beginning of the SCAN routine re-entered via line 403. If a valid key had not been read after reading the last bank of keys, re-entry would have been made from decision block 392 via line 393. If a "power down" condition would have been sensed in block 384, a branch via line 385 would have been made to the DOWN routine of block 386.

FIG. 26 is a chart of the subroutines called for through FTCN (program address/2C4). FCTN is a generalized entry point into the subroutines called by the keys. When a valid key is detected, an address in a look-up table in ROM is generated from the "ROW" and "COLUMN" words. This location contains the address of the subroutine corresponding to the key. FCTN jumps to this address and executes the specified subroutine. The chart in FIG. 26 specifies all the keys and the labels of the subroutines called.

FIG. 27 illustrates a subroutine for entering numbers into the display register from the keyboard. Each of the multiple entry points correspond to a particular digit.

Upon entry to this routine, a number is generated corresponding to the entry point, and thus to the particular key calling the routine (block 427). This number is temporarily stored (block 248) while the status flag 311 (FIG. 8) is checked to determine if the previous keyboard operation was entering a digit (block 429). If not, the display is cleared (block 431) before continuing. The contents of the display are shifted left (block 432) and the new number entered on the right. The UNLOCK flag 309 (FIG. 8) is set to zero (block 434), and a branch back with ACC=1 is initiated (block 435). The 1 is used to flag this operation in the status flag 311.

FIG. 28 shows the subroutine SET having a program address/2C8. The SET routine has basically two modes of operation: (1) it sets the meter print wheels to the value entered into the display via the keyboard, and (2) if the display contents are not from the keyboard, the last setting value is recalled. This value is displayed and the meter enabled, if sufficient postage is available for printing the amount of the setting.

Index registers are initialized (block 513) to set up the CHECK routine (block 514). The CHECK routine examines the contents of the display for $1.00 or more. The status flag 311 (FIG. 8) is next examined to determine if numerical entry from the keyboard is in the display (block 515). If so, the CHECK routine then looks for a value of $100.00 in the display (block 518). If the value is both less than 100.00 (block 519) and less then $1.00 (block 525) the routine proceeds to set the meter (block 533), enable the meter (block 534), clear the ADD register 210 of FIG. 7 (block 539) and branch back (block 540). If $1.00 or more is in the display, the UNLOCK flag 309 of FIG. 8 is checked. If flagged, setting the meter would continue as before via line 532. If the $ UNLOCK has not been flagged, an indicator light showing "$ UNLOCK" would go on (block 529) and a branch back would be (block 530) made without ever setting the meter. If the amount in the display is greater than $99.99 an error would be indicated (block 522), because the meter, being a four bank meter, cannot set to a value that is higher than $99.99.

The second mode of operation occurs where the contents of the display have not been entered by the keyboard (block 516). In that case, the display is cleared (block 536), the meter setting put into the display (block 537), and the meter is enabled if sufficient postage is available in the machine (block 534). The ADD register 210 is then cleared (block 539) as before, and the routine branches back (block 540).

FIG. 29 depicts the subroutine UNLCK having a program address/266. The UNLCK routine sets the $ UNLOCK flag 309 of FIG. 8, (block 492), if the previous function executed was that of entering a number into the display (block 490). The $ UNLOCK flag is used to enable the printer, if the setting is $1.00 or more of postage. In such a case, there is a branch back with ACC=1 (block 493).

FIG. 30 illustrates the flow chart 30 for the subroutine POST having a program address/29A. The POST routine updates the meter registers each time postage is printed. This occurs when the photocell 99 (FIG. 3) detects the slot 100 in the disc 98 mounted on the drum shaft 57. This signifies a drum rotation, and hence, the printing of postage.

The ascending register 816 (200) of FIG. 6, and the batch amount register 819, are incremented by the amount in the meter setting register 307 (MSR) (see blocks 470 and 471). The piece count 817 and batch count 820 also of FIG. 6 are incremented by 1 (blocks 472 and 473), and the descending register 815 is decremented by the amount in the meter setting register (block 474). The ENBLE routine (block 475) determines if the printer may be enabled for a subsequent print of the same amount. The routine is then terminated (block 476).

FIG. 33 illustrates the flow chart for the PLUS subroutine having a program address/27E. The PLUS routine adds the contents of the display to the ADD register 210 (FIG. 7), and puts back the result in both the display and the register. This allows chain addition of a series of numbers entered via the keyboard. This routine is summoned when the "  " button 117 is depressed on the keyboard (FIGS. 5 and 5a). This routine provides the capability of adding ancillary charges to the main postage, such as insurance, special delivery postage, etc.

Index registers are initialized to specify the registers concerned (block 496). The status flag 311 of FIG. 8 (block 497) is fetched to determine if the contents of the display are from the numerical entry of the keyboard (block 498). If so, block 500 is entered. The ADD register 210 (FIG. 7) and display (DISP) register 208 (FIG. 8) are added together and the result placed back in both registers. If no overflow occurs (block 505), a branch back is made (block 510). If an overflow has been detected, an error message via line 506 is flagged (block 507) before branching back (block 508). If the PLUS routine had been called without the previous operation having been from the numerical entry of the keyboard, a branch back (block 508) would have been made via line 511 without performing any operation.

FIG. 34 shows the flow chart for the subroutine CLEAR having a program address/23D. The CLEAR routine performs the following functions: (1) clears the display; (2) recalls contents of the "ADD" register 210 (FIG. 7) into the display; (3) clears the "ADD" register 210 on the second successive clear; and (4) clears batch registers 819 and 820 (FIG. 6) if either register is displayed at the time the CLEAR routine is called.

The display register 208 (FIG. 8) and the $ UNLOCK flag 309 (FIG. 8) are cleared (block 477 and 478). The status word 311 (FIG. 8) is checked (block 479) to see if the previous operation had been the CLEAR routine. If not, block 482 is entered. Contents of the "ADD" register 210 are transferred to the display (DISP) register 208 (contents of the "ADD" register are nonzero only when in the process of adding up a series of numbers) using the key 117 of FIG. 1*b*. The effect of the clear key 118 in this case, is to clear a keyboard entry and recall into the numeric display 115, the subtotal up to that point. The addition process may be continued upon entry of the next number. The "LDLMP" area 206 (FIGS. 8 and 8*a*) is cleared (block 484). The batch flag 305 is checked (block 485) to see if the previous keyboard operation was calling either of the two batch registers into the display (batch sum or batch count). If not, a branch to the main program is made (block 488). If so, line 486 is taken to block 487. The batch registers are cleared before returning to the main program (block 488).

If the previous keyboard operation had been CLEAR as per decision block 479, the "ADD" register 210 would have been cleared via line 480 to block 481, before entering block 482.

FIG. 35 shows a subroutine for calling register contents into the numeric display 115 of FIGS. 1*b* and 1*c*. This routine has six entry points corresponding to six meter registers which can be called into the display. Its purpose is to load the display with the contents of the specified meter register, and to turn on the indicator lamp corresponding to the selected register.

The meter register being called is specified by the entry point into the routine (block 420). Both the display (DISP) and addition (ADD) registers 208 and 210, respectively (FIGS. 8 and 7) are cleared (blocks 421 and 422). Then the FETCH routine of FIG. 41 is called. This initializes index registers to specify the meter register being called. The indicator lamp corresponding to the specified meter register is selected by writing a bit in the appropriate word in the LDLMP area 206 of RAM(2)18 (block 424). The contents of the specified register are then written into the display register 208 (block 425), and a branch back initiated via block 426.

FIG. 36 illustrates the flow chart for the subroutine ENBLE having a program address/100. The subroutine ENBLE generates the signal for the printer enabling solenoid. The ENBLE routine first calls CMPAR (block 736) which compares the meter setting register 307 of FIG. 6 against the descending register 815 (block 737). If the descending register is greater than or equal to the meter setting, an enabling bit is put into the LDLMP area 206 (block 739) (see FIG. 8*a*, word 8D, bit 4) before branching back (block 740). Otherwise, a branch back is made directly from block 737 via line 741.

FIG. 37 relates to a flow chart for the ERROR subroutine having a program address/133. The ERROR routine is used to flag certain errors. The error message is contained in the accumulator at the time the ERROR routine is called. The most significant (leftmost) place in the display register 208 (block 716) is selected and the contents of the accumulator (block 717) is written into the display register before branching back (block 718) to the main program.

FIG. 38 shows a flow chart for the portion of the SCAN routine of FIG. 25 which is referred to as SCANX (see block 373 of FIG. 25). The SCANX procedure is used to debounce the keys check for a valid key depression, and a valid priority input (print photocell). The four input lines from the keyboard matrix (FIG. 16) generate what will be hereinafter referred to as the "ROW" word. A number corresponding to the active output of the multiplexer (FIGS. 15, 16) will be hereinafter referred to as the "COLUMN" word. A nonzero "ROW" word and "COLUMN" word identify a particular activated key in the keyboard matrix. The term "count" word as used herein is defined as the number of times the same key depression has been successively read.

The detailed operation of reading the keyboard follows: If the multiplexer (MPX) has selected an output connected to the keyboard (block 374), made (line 375) a check is to determine if the priority "key" is being detected (decision block 1210). If it is being read, then decision block 1211 is entered to determine if there is a priority input (if zero, there is no input). The priority "key" has its own counter. If the "priority count" word* shows sufficient scans to indicate postage is being printed, the "priority count" is incremented (block 1212). Subsequent scans will not provide a postage print out, even if the postage print key remains depressed.

*"priority count" word is defined as the number of times the priority key has been read.

If the priority "key" is zero, block 1214 is entered, and the priority counter is set to zero. This allows for a new postage printing to take place as soon as the priority key is validated (sufficiently scanned). After the priority "key" is serviced (or not serviced as the case may be), block 376 is entered. The scan routine now considers non-priority key inputs. The "ROW" word is read. If not zero (block 377), the keyboard process instruction is used to detect multiple keyboard depressions in the group of four input lines being read. If the "COLUMN" word is the same as that of a previous scan (blocks 406 and 407), and only one key is pressed, (blocks 409 and 410), the last "ROW" word is compared with the present one (block 395). If both are the same, the "COUNT" word is incremented (block 416). Block 392 in the SCAN routine of FIG. 25 uses this number to decide when to branch to a selected routine. If the "COLUMN" (block 407) and "ROW" (block 409) words are not the same as in the previous scan, or more than one key is pressed (block 410), the "COUNT" word is reset to zero (block 381) starting a new count sequence, before a new key will be recognized. If the multiplexer (MPX) is not selecting a group of keys, or if the "ROW" word is zero but the "COLUMN" word is different from that stored from the previous pass, the keyboard processing is bypassed via line 387.

FIG. 39 depicts the flow chart for the LDLMP subroutine having a program address/10A. The LDLMP routine transfers data in the LDLMP register 206 of FIGS. 8 and 8a to the shift registers 21 and 22 of FIG. 1d. These shift registers drive the lamp display (section 116 of FIG. 1c).

Index registers are initialized (block 663) to specify the LDLMP register 206. The first word of the register is read (block 664) and temporarily stored (block 665). The OUTPT routine (block 666) enters the 4 bit word into the shift register in a serial manner. If the last word has not been serviced by the OUTPT routine, the routine jumps back via line 668 and gets the next sequential word in the LDLMP register 206. The routine branches back (block 670) after the last word has been outputted.

FIG. 40 illustrates the flow chart for the subroutine OUTPT having a program address/114. The OUTPT routine is called by the LDLMP routine. Its purpose is to output a 4 bit word in serial manner into a shift register.

First, index registers (for counting and for specifying ports) are initialized (block 671). The output word is loaded into the accumulator (block 672), and then rotated right to store a bit in the carry (block 673). The remaining bits are stored (block 674). A clock pulse bit is loaded into the accumulator (block 675) and rotated left to bring in the bit stored in the carry and to bring the clock pulse bit into position (block 676). The data is then written out to the shift register (block 677). If not at the end of the sequence (block 678) a jump back to block 672 is made via line 679 so as to output the next bit. If the sequence is finished, a branch back is made per block 681.

FIG. 41 shows a flow chart for the subroutine FETCH having a program address/OBD. The FETCH routine is used to initialize CPU index registers with data from a look-up table specifying a particular meter register (block 730). The FETCH routine affords some economy in instruction count.

The accumulator is loaded with a number corresponding to the desired meter register before the call to "FETCH" is made. The FETCH routine first generates from the contents of the accumulator, an address specifying the location of the desired data. Then, the starting address of the selected meter register is loaded into an index register pair (block 731). The lamp display word address is loaded into another index register pair (block 732), and the lamp display word itself is loaded into an index register (block 733). The starting address of SETNG ("number meter set to" register 211 of FIG. 6) is put into yet another index register pair (block 734) before branching back as per block 735.

FIG. 42 depicts a flow chart for subroutine CMPAR having a program address/450. Subroutine CMPAR compares the meter setting register 307 (FIG. 6) with the descending register 815 of FIG. 6. There are three conditions which are considered:

(1) descending register ≧ $100.00 (block 747 — unconditionally larger than meter setting)

(2) $100.00 > descending register > meter setting (blocks 747 and 749)

(3) meter setting > descending register (block 749)

These conditions are respectively flagged by the contents of the accumulator upon branch back to the main program, i.e. branch back is made with ACC=0, 2, 3, depending upon which one of the aforementioned conditions is observed (see blocks 754, 755 and 751, respectively). The overall objective of this routine is to check the funding available (descending register) as against the called for postage (meter setting register) to be printed. If not enough funds are available to print postage, the printer will not be enabled.

FIG. 43 illustrates the flow chart for the subroutine CHECK having a program address/138. The CHECK routine is used to determined if the contents of a meter register exceeds a specified amount by testing high order digits to see if they are nonzero.

An index register is initialized with an address in the meter register corresponding to the higher order digits being checked, before the CHECK routine is called. The carry is cleared (block 719) and the location specified by the address is read (block 720). If zero (block 721), the address is incremented (block 723), and the next higher order digit is read (block 720 via line 727). Any non-zero digit causes the carry to be set (block 725). Branch back occurs (block 729) at the end of the sequence (block 726). A carry equal to zero indicates that all specified higher order digits were zero. A carry equal to 1 indicates at least one of these digits was nonzero.

FIG. 44 shows a flow chart for the subroutine ADDD having a program address/129. The ADDD routine adds the SETNG register 211 of FIG. 6 to a specified meter register, and writes the result back in the specified meter register. The meter register is specified by the contents of an index register initialized prior to calling the ADDD routine.

The carry (CPU) is cleared (block 705) before calling subroutine ADD1 which adds a SETNG register digit to a meter register digit (block 706). Then, the SETNG address is incremented (block 707), and a test made for the end of the loop (block 708). If the loop has not been completed, the next digits in each register are added together via line 709. At the end of the sequence, ADD2 is entered (block 711). ADD2 propagates the carry through the longer meter register. After completing this (block 712) a branch back to the main routine is made via block 715.

FIG. 45 depicts a flow chart for the subroutine ADD1; ADD2 having program address/120;/123. The ADD1 routine adds a digit from the SETNG register 211 of FIG. 6 to a digit from a meter register, decimal adjusts the result (binary to BCD conversion), and writes it back into the meter register.

A second entry point (ADD2) allows propagation of a carry through a meter register by adding a zero to the digit, decimal adjusting, and writing back in.

This routine adds one pair of digits at a time and is called repeatedly to add two registers together (see subroutine ADDD).

FIG. 46 relates to subroutine CLDSP; CLEER having a program address/25E;/260. CLDSP writes zeros into the display area. CLEER writes zeros into an area specified by a preset index register.

An index register is initialized to specify the display register (block 698). A zero is written into this location (block 693), the address incremented (block 696) and the next sequential location is cleared (block 694) until the clear operation is complete (loop 695). A branch back (block 699) to the calling routine is made upon completion thereof.

FIG. 47 shows a flow chart for the subroutine CLR having a program address/1B9. Subroutine CLR clears the photocell multiplexer 23 of FIG. 1d (block 742) and then selects the first set of photocells (every step, fifth step, solenoid monitoring photocells) as per block 743. Branch back is per block 744.

FIG. 48 shows a flow chart for the subroutine STPB having a program address/300. The STPB routine is called by the SET routine of FIG. 28 to operate setting mechanism solenoids 60 and 70 of FIG. 3. This routine controls the solenoids so as to select a particular printer bank by bringing the master gear drive 51 (FIG. 3) into engagement with one of the respective spur gears *53a, 53b, 53c, 53d* (FIG. 3).

An index register used in the SET routine conveys information as to which printing bank is to be selected (block 627). A series of tests (blocks 628, 629, 630, respectively) determine which one of the four printer banks *a, b, c, d,* is selected. If, for example, bank *b* were selected, block 631 would be entered which requires both solenoids to be actuated. This is done by loading the appropriate bits (two 1's in this case) into the shift register (element 24 of FIG. 1*d*). After the solenoids are selected, a delay routine (block 635) provides time for the mechanism of the printer to respond to the electrical signals. Photocells (102 and 103 of FIG. 3) monitoring the position of the solenoids are then read (block 636) and compared with what they are expected to read (block 637). If the reading is in correspondence, a branch back with a zero in the accumulator (block 640) is made. Otherwise, an error is flagged (line 641) by branching back as per block 642 with the accumulator =/B.

A bank "*c*" selection (decision block 628) will require that both solenoids be deactuated (block 644). Banks d or a will require one or the other of the solenoids to be actuated (blocks 646 or 648).

FIG. 49 illustrates a flow chart for the subroutine ZEROB having a program address/353. Subroutine ZEROB reads photocells *107a, b, c, d,* of FIG. *4a,* which detects the zero positions of the print wheels of the printer. The reading from a selected bank is placed into the carry bit of the accumulator.

The second photocell set is selected by clocking the photocell multiplexer (block 649). A slight delay (block 650) allows time for the photocells to respond. A series chain of decision blocks (651, 652 and 653) is entered to determine from preset status characters, which of the photocell readings (banks a, b, c or d) is to be selected. If for example, bank a were selected, the photocells would be read (block 654a) and the data shifted in the CPU accumulator until the photocell bit corresponding to bank a is in the carry bit (block 655a). A branch back (block 656) then follows.

FIG. 50 relates to the flow chart for subroutine SETX having a program address/37E. The SETX routine is that portion of the SET subroutine of FIG. 28, that performs the detailed setting of the print wheels to the value shown in the display.

Index registers are initialized (block 546) to specify the display register 208 (FIG. 8) address and the meter setting register (MSR) 307 (FIG. 6) address. The contents of the display are transferred to the meter setting register (block 541). The number to be set (MSR) is compared with the previous number i.e., with "number meter set to" register 211 of FIG. 6 (SETNG). This is accomplished digit by digit (block 547). If not the same, the motor direction flag 215 (FIG. 9) is initialized as per block 556 (direction determined by which number is greater [MSR digit or SETNG digit]) and the difference between the numbers is stored. The new number (MSR) is then written into the previous number area (SETNG) as per block 553. The printer is set to the appropriate bank for the digit being considered (block 558). If the bank selection mechanism does not respond, photocells detect an error. If no error, line 562 is taken to block 563. One step in the appropriate direction is taken, and a check is made to ascertain if there is a stepping error (block 564). If no error has been flagged, the fifth position flag 216 (FIG. 9) is updated (block 567). If the flag indicates that the photocell (*110b* of FIG. *4a*) should be seeing the fifth position slot, (block 572) the photocell is read (block 574). If it verifies that the motor is on a fifth step (block 575), a check is made to see if the proper number of steps has been counted off (line 577 to block 580). If not, a return via line 587 is taken to block 563 (STEP). The above procedure is then repeated. When the selected print wheel has been fully stepped to its new position, and if the position is zero (block 584), the ZEROB subroutine is called (block 586) to read the zero position photocells. This is to verify if in fact, the selected print wheel is at zero (decision block 587). If so, the photocell multiplexer is restored to selecting the first bank (block 589). The flags used in the STPB routine are cleared via line 590 to block 592. If not the last bank to be set (block 594), a branch back via line 595 is made to compare the next new number digit with the previous number digit. The setting process is then repeated. If any bank does not have to be altered (decision block 549) the setting process for that particular bank is bypassed via line 604. If the last bank had been selected in block 594, the setting mechanism is returned to the (first bank) rest position (block 597). If no error is detected (block 598) in returning to the rest position, the ENBLE routine is called (block 600) which enables the meter if a sufficient amount of postage is available in the descending register. The "ADD" register 210 (FIG. 7) is cleared (block 601), before branching back (block 602). Any error in stepping the motor 50 (FIG. 3) or bank selection causes a branch to the error routine (block 561) which causes an error message to be placed in the display.

FIG. 51 relates to the flow chart for the STEP routine, having a program address/1C7. The STEP subroutine changes the setting of a selected print wheel of the printer of FIG. 3 by one unit. The flag for motor direction is set up before calling the STEP routine. Normally, the motor starts from a STEP reference position. On start-up, the motor word* (1001) is written out which turns the motor and puts the monitoring wheel 109 (FIG. 3) of the motor in either a "STEP" or "HALF-STEP" reference position. The "every step" photocell *110a* of FIGS. 3 and *4a* sensing the wheel 109 position is read. If it indicates that the motor wheel 109 is on a "HALF-STEP" reference position, the motor is advanced half a step. From that point on, the STEP routine pulses the motor in increments of eight motor words, i.e. from one "STEP" reference position to a succeeding "STEP" reference position.

*The bit pattern corresponding to energizing or deenergizing stepper motor coils is referred to as the "motor word". There are eight "motor words" for each step, and four "motor words" for each half-step of the motor. (See APPENDIUM B for a discussion of motor operation.).

Index registers are initialized (block 605) to specify look-up table addresses when the motor word pattern for "STEP-UP" and "STEP-DOWN" is stored. The output port to the motor drivers is selected (block 606). A status character 215 of FIG. 9 is read to determine the direction the motor is to be stepped (block 607). The appropriate motor word is loaded (blocks 6111 or 612) then written out (block 613). A delay loop is entered (block 614) to give the motor time to respond. If not at the end of the loop (block 548), a return via line 550 is made to block 607 to get the next bit pattern. (There are four different bit patterns per half-step.) After the fourth word is written out, the "every step" photocell 110*a* of FIG. 4) is read (block 615). On the first pass through this routine, the monitoring wheel should have gone from "STEP" to "HALF-STEP" reference positions. The photocell (block 618) is read to verify that it is on a "HALF-STEP" (photocell should be blocked by a tooth on slotted monitoring wheel 109 [FIG. 3]). If on a half-step, re-entry to block 605 is made via line 621 to re-enter the routine to write out four more words. The monitor wheel should now be on a full "STEP" again. Photocell 110*a* is read (block 620) to verify the full step position. Then there is a branch back (block 626). If at any place the photocell doesn't agree with what is should be, there is a branch back with an error message (1*c*) as per block 623.

APPENDIUM A

Comments on the Postage Meter Program Printout

The representation of some of the instructions has been slightly altered from those representations Intel uses in their Users Manual (copyright March 1972, Rev. 2). Double instructions are printed on two lines, rather than one. The second line contains data or an address associated with the double word instruction. Data, numbers, and addresses are generally given in hexadecimal notation, rather than the decimal and octal notation found in the Users Manual. The following list indicates the format of instructions which differ from the format in the Users Manual. "D" indicates data in hexadecimal notation. "R" represents an index register number in hexadecimal. Reference should be made to the Users Manual for a complete description of the instructions.

| MNEMONIC | PROGRAM REPRESENTATION | COMMENTS |
|---|---|---|
| LDM | LDM+D | |
| LD | LD+R | |
| XCH | XCH+R | |
| ADD | ADD+R | |
| SUB | SUb+R | |
| INC | INC+R | |
| BBL | BBL+D | |
| ISZ | ISZ+R | |
| JCN | JCN+TZ | where condition is TEST =0 |
| | JCN+AZ | where condition is ACCUMULATOR = 0 |
| | JCN+AN | where condition is ACCUMULATOR ≠ 0 |
| | ICN+CZ | where condition is CARRY = 0 |
| | ICN+CN | where condition is CARRY ≠ 0 |
| JIN | JIN+R | |
| SRC | SRC+R | R is even, refers to register |
| FIN | FIN+R | pair R, R+1 |
| FIM | FIM+R | |

INTERPRETATION OF THE COMPUTER PRINTOUT

```
      STATEMENT
      NUMBER                      COMMENTS

01116   *SUBROUTINE ADP                    30 JAN 74
01117   *ROUTINE TO ADD POSTAGE TO METER (BOTH
01118   *DESCENDING REGISTER AND CONTROL SUM)

HEXADECIMAL REPRESENTATION OF
INSTRUCTION ADDRESS
        MACHINE INSTRUCTION IN HEXADECIMAL
               STATEMENT NUMBER
                      LABEL OF INSTRUCTION
                                  INSTRUCTION IN MNEMONIC FORM
                                                      COMMENTS

1400 0 8020  01119  ADP   DC  FIM+/C
1401 0 00B7  01120        DC  /B7
1402 0 802D  01121        DC  SRC+/C
1403 0 80EC  01122        DC  RCD      (B) READ STATUS CHARACTER
1404 0 80F6  01123        DC  RAR      CHECK FOR XXX1
1405 0 801A  01124        DC  JCN+CZ
1406 0 143B  01125        DC  ERRR
1407 0 802E  01126        DC  FIM+/E
1408 0 0000  01127        DC  /00
1409 0 806F  01128  RTN1  DC  INC+/F   DETERMINE NUMBER OF CHARACTERS
140A 0 802D  01129        DC  SRC+/C   IN DISPLAY
140B 0 80E9  01130        DC  RDM
140C 0 8014  01131        DC  JCN+AZ
140D 0 1410  01132        DC  END
```

APPENDIUM B

Description of the Stepping Motor Operation

The stepping motor 50 (FIGS. 3, 4*a*) has four driving coils, two of which are energized at a time. The motor rotates one increment (motor step) when the pattern of energized coils changes. The schematic of the motor driving circuitry is shown in FIG. 19.

In the following table, "1" will represent an energized coil, "$\phi$" will represent a de-energized coil. The stepping sequences are as follows: The "STEP-UP" sequence turns the motor in such a direction as to increase the meter setting, the "STEP-DOWN" sequence decreases the meter setting. The bit pattern corresponding to energized and de-energized coils will be referred to as the "MOTOR WORD".

TABLE

| TIME PERIODS | | | MOTOR WORD (STEP-UP) Coil 1 | Coil 2 | Coil 3 | Coil 4 | MOTOR WORD (STEP-DOWN) Coil 1 | Coil 2 | Coil 3 | Coil 4 |
|---|---|---|---|---|---|---|---|---|---|---|
| One Full Step | $T_0$ | One-Half Step | 1 | 0 | 0 | 1 | 1 | 0 | 0 | 1 |
| | $T_1$ | | 0 | 0 | 1 | 1 | 1 | 1 | 0 | 0 |
| | $T_2$ | | 0 | 1 | 1 | 0 | 0 | 1 | 1 | 0 |
| | $T_3$ | | 1 | 1 | 0 | 0 | 0 | 0 | 1 | 1 |
| | $T_4$ | | 1 | 0 | 0 | 1 | 1 | 0 | 0 | 1 |
| | $T_5$ | | 0 | 0 | 1 | 1 | 1 | 1 | 0 | 0 |
| | $T_6$ | | 0 | 1 | 1 | 0 | 0 | 1 | 1 | 0 |
| | $T_7$ | | 1 | 1 | 0 | 0 | 0 | 0 | 1 | 1 |
| | $T_0$ | | 1 | 0 | 0 | 1 | 1 | 0 | 0 | 1 |

($T_0$; $T_0'$) is the "rest" state where the motor remains when it is not being stepped. When stepping, $T_n - T_{n-1} \approx$ delay in the stepping routine (STEP, FIG. 51). The gears coupling the motor to the print wheels are such that a sequence of motor steps as above (from $T_0$ to $T_0'$) will change the meter setting by a single unit in the selected bank. A slotted wheel 109 (FIG. 3) is coupled to the motor such that when the motor is at $T_0$ (or $T_0'$) the photocell 110$a$ (FIG. 3) sees a slot, and at the T time period the photocell sees a tooth. Thus, in changing the print mechanism by one digit the photocell should see a slot-tooth-slot sequence. This provides a means of monitoring the stepping sequence to verify motor operation.

It will be appeciated by those skilled in the postage meter art, that a new postage meter system has been disclosed herein. As a result of the many new concepts and novelties thereby introduced, it is probable that many modifications of any obvious nature will occur to the skilled practitioner in this art. All such obvious changes are intended to be within the spirit and scope of this invention as presented by the appended claims.

```
LCG CRIVE   CART SPEC   CART AVAIL   PHY CRIVE
  0000        0001        0001         0000
  CC01        0002        0002         0001

V2 M09   ACTUAL 16K  CONFIG 16K

*ECUAT(PAPTX,PAPTY)

// ASM
*MACLIB INTAS
*XREF
                  00001       .     ABS
                  00002             CLEAR
1580              00003    S1       EQU       /158D
154F              00004    S2       EQU       /154F
1512              00005    S3       EQU       /1512
                  00006    *PROGRAM AS OF 30 JAN 1974         EPM-2
                  00007    ************************************************************
                  00008    * RCM *0 ***************************************************
                  00009    ************************************************************
                  00010    *** INITIALIZATION                          ********************
1000 0  8000      00011             DC        NOP
1001 0  802E      00012             CC        FIM+/E     SET MOTOR TO FIRST STEP
1002 0  00C0      00013             CC        /C0        RAM 3 PORT USED
1003 0  802F      00014             DC        SRC+/E
1004 0  6009      00015             DC        LDM+9
1005 0  80E1      00016             CC        WMP        RAM3
1006 0  6050      00017             CC        JMS        LOAD MEMORY
1007 0  1142      00018             CC        INRAM
1008 0  802A      00019             CC        FIM+/A     CLEAR METER SETTING REGISTER
1009 0  0030      00020             CC        /30
100A 0  8050      00021             CC        JMS
100B 0  1260      00022             CC        CLEER
100C 0  6050      00023             CC        JMS        SET METER TO 0000
100D 0  1174      00024             CC        HOME
100E 0  8004      00025    WW       CC        LDM+4      LOAD DESCENDING REGISTER
100F 0  80FA      00026             CC        STC
1010 0  8026      00027             DC        FIM+6
1011 0  1224      00028             CC        DESC
1012 0  6050      00029             CC        JMS
1013 0  12C4      00030             CC        FCTN
1014 0  802C      00031             DC        FIM+/C      WRITE  SET DATE  REMINDER INTO
1015 0  008D      00032             CC        /8D         DISPLAY WORD
1016 0  8020      00033             DC        SRC+/C
1017 C  80C1      00034             DC        LDM+1
1018 0  80E0      00035             CC  -     WRM
1019 0  3050      00036             CC        JMS
101A 0  1479      00037             CC        CHCK
101B 0  6050      00038             CC        JMS
101C 0  110A      00039             CC        LCLMP
                  00040    *SUBRCUTINE SCAN                                     08 JUNE 1973
                  00041    *REGISTERS 0X,6X,8X,AX,CX,EX ARE USED TEMPORARILY BY ROUT.
                  00042    *REGISTER 2 'COUNT' WORD       SAVE
                  00043    *REGISTER 4 'ROW' WORD         SAVE
                  00044    *REGISTER 5 'COLUMN' WORD      SAVE
101D 0  802E      00045    SCAN  CC           FIM+/E     SET UP CNTR TO CHECK BLANKING
101E 0  0069      00046          CC           /69
101F 0  802A      00047          DC           FIM+/A     SELECT S R PORT LOCATION
1020 0  0000      00048          CC           /00
1021 0  8028      00049          DC           FIM+8      OUTPUT PORT DISPLAY LOCATION
1022 0  0049      00050          CC           /49        R9 NUMBER OF DISPLAY DIGITS
1023 0  802F      00051    CCNT3 DC           SRC+/E     ROUTINE TO DETERMINE BLANKING
1024 0  80E9      00052          CC           RDM
```

```
1025 0 8014              DC     JCN+AZ   CHECK FOR NON-ZERO DIGIT
1026 0 1029              DC     CONT4
1027 0 80AF              DC     LD+/F
1028 0 80B9              DC     XCH+9    UPDATE COUNT REGISTER FOR DIGITS
1029 0 807F        CONT4 DC     ISZ+/F
102A 0 1023              DC     CONT3
                    *S/R PORT RAM 0, DISPLAY PORT RAM 1
                    * FIRST PART OF PROGRAM DETERMINES BLANKING
                    *
102B 0 802E              DC     FIM+/E   INITIAL DISPLAY BUFFER LOCATION
102C 0 0086              DC     /86
102D 0 80D3              DC     LDM+3    GET MPX STARTED
102E 0 8050              DC     JMS
102F 0 1474              DC     CP
1030 0 802F        STRT  DC     SRC+/E   SELECT LOCATION IN DISPLAY BUFFER
1031 0 80E9              DC     RDM      READ DISPLAY CHARACTER
1032 0 8029              DC     SRC+8
1033 0 80E1              DC     WMP      RAM1
1034 0 80F1              DC     CLC
1035 0 80A9              DC     LD+9     INDICATES DIGITS TO BE DISPLAYED
1036 0 809F              DC     SUB+/F   CHECK TO SEE IF NUM. TO BE DISPLAYED
1037 0 80D0              DC     LDM+0
1038 0 80F6              DC     RAR
1039 0 802B              DC     SRC+/A   RAM0  8 BIT
103A 0 80E1              DC     WMP      RAM0  0 BLANKS, 1 UNBLANKS
                    # GOES TO DECODER DRIVER
103B 0 80F1              DC     CLC
103C 0 80D7              DC     LDM+7
103D 0 808F              DC     ADD+/F
103E 0 801A              DC     JCN+CZ
103F 0 106F              DC     T4
                    * SKIP OVER FIRST FEW BANKS OF KEYS
1040 0 801C              DC     JCN+AN
1041 0 104F              DC     X
1042 0 80EA              DC     RDR
1043 0 80F5              DC     RAL
1044 0 80F5              DC     RAL
1045 0 801A              DC     JCN+CZ
1046 0 104D              DC     X1
1047 0 80EC              DC     RD0
1048 0 80FA              DC     STC
1049 0 80F5              DC     RAL
104A 0 80E4              DC     WR0
104B 0 8040              DC     JUN
104C 0 104F              DC     X
104D 0 80D0        X1    DC     LDM+0
104E 0 80E4              DC     WR0
104F 0 80EA        X     DC     RDR      ROM0 READ  ROW  WORD
1050 0 8014              DC     JCN+AZ   TEST FOR INPUT
1051 0 1066              DC     T1
1052 0 80FC              DC     KBP      KEYBOARD 1-4 IF KEY ON
1053 0 80B3              DC     XCH+3    STORE
1054 0 80AF              DC     LD+/F
1055 0 80B5              DC     XCH+5    UPDATE 'COLUMN' WORD
1056 0 80F1              DC     CLC
1057 0 8095              DC     SUB+5    COMPARE WITH PREVIOUS 'COLUMN' WORD
1058 0 801C              DC     JCN+AN   WORD NOT EQUAL, JUMP 'COUNT' WORD =0
1059 0 106D              DC     T2
105A 0 8063              DC     INC+3    CONTINUE IF SAME R3 = 2-5
105B 0 80A3              DC     LD+3     CHECK TO SEE IF MORE THAN ONE KEY
105C 0 8014              DC     JCN+AZ   MORE THAN ONE KEY, JUMP,
105D 0 106D              DC     T2       SET 'COUNT' WORD = 0
105E 0 80B4              DC     XCH+4    COMPARE WITH PREVIOUS 'ROW' WORD
105F 0 80F1              DC     CLC
1060 0 8094              DC     SUB+4    COMPARE
1061 0 801C              DC     JCN+AN   NOT SAME, JUMP, SET 'COUNT' = 0
1062 0 106D              DC     T2
1063 0 80A2              DC     LD+2     INCREMENT 'COUNT' WORD IF WORD SAME
1064 0 80FA              DC     STC
1065 0 80F5              DC     RAL
1066 0 8040              DC     JUN
1067 0 106E              DC     T3
1068 0 80AF        T1    DC     LD+/F    COMPARE 'COLUMN' WORD
1069 0 80F1              DC     CLC      F NOT 5, 'COUNT' WORD SAME
106A 0 8095              DC     SUB+5    F = 5 'COUNT' WORD SET TO ZERO
106B 0 801C              DC     JCN+AN
106C 0 106F              DC     T4
106D 0 80D0        T2    DC     LDM+0    SET 'COUNT' WORD TO ZERO
106E 0 80B2        T3    DC     XCH+2    UPDATE 'COUNT' WORD
106F 0 802C        T4    DC     FIM+/C   INITIALIZE REGISTER
1070 0 00F0              DC     /F0
1071 0 807D        CIRC  DC     ISZ+/D   DELAY LOOP
1072 0 1071              DC     CIRC
1073 0 8011              DC     JCN+TZ   TEST FOR SHUTDOWN
1074 0 10E7              DC     DWN3
1075 0 807C              DC     ISZ+/C
1076 0 1071              DC     CIRC
1077 0 80D2              DC     LDM+2    GENERATE CP TO ADVANCE SCAN
1078 0 8050              DC     JMS*     TO NEXT DIGIT
1079 0 1474              DC     CP
107A 0 807F              DC     ISZ+/F   LOOK FOR END OF SCAN
107B 0 1030              DC     STRT
107C 0 80F1              DC     CLC
107D 0 802A              DC     FIM+/A
107E 0 0000              DC     /00
107F 0 802B              DC     SRC+/A
1080 0 80C9              DC     LCM+9
1081 0 80BF              DC     XCH+/F
1082 0 80EC              DC     RD0
1083 0 808F              DC     ADD+/F
1084 0 801C              DC     JCN+AN
1085 0 108F              DC     X2
1086 0 802A              DC     FIM+/A
1087 0 0088              DC     /88
1088 0 8050              DC     JMS
```

```
1089 0  1260          DC      CLEER
108A 0  80FA          DC      STC
108B 0  8050          DC      JMS
108C 0  129A          DC      POST
108D 0  8040          DC      JUN
108E 0  10AB          DC      X3
108F 0  80F1    X2    DC      CLC
1090 0  8007          DC      LDM+7      PROCESS KEY ON 'COUNT' WORD = 0111
1091 0  8092          DC      SUB+2
1092 0  801C          DC      JCN+AN     CHECK TO SEE IF PROPER 'COUNT' WORD
1093 0  10BB          DC      T5         IF NOT 0111, GO BACK TO SCAN
1094 0  80F1          DC      CLC
1095 0  80DA          DC      LDM+/A     PLACE TABLE
1096 0  8084          DC      ADD+4      SET UP FIN
                *ADD CONTENTS OF R4 (2-5)
1097 0  80B0          DC      XCH+0
1098 0  8045          DC      LC+5       6-F
1099 0  80B1          DC      XCH+1      0X SET UP WITH ADDRESS
                *
109A 0  8036          DC      FIN+6
109B 0  802A          DC      FIM+/A     ADDRESS CONTAINING BATCH
109C 0  008E          DC      /8E        INDICATORS
109D 0  802B          DC      SRC+/A
109E 0  80E9          DC      RDM
109F 0  80F1          DC      CLC        ISOLATE BATCH INDICATORS
10A0 0  80F6          DC      RAR
10A1 0  80F1          DC      CLC
10A2 0  80F6          DC      RAR
                *READ TO SEE IF BATCH DISPLAYED
                *
10A3 0  80E4          DC      WR0        (B) STORE
10A4 0  802A          DC      FIM+/A     CLLMP CLEAR LAMP DISPLAY AREA
10A5 0  0088          DC      /88
10A6 0  805C          DC      JMS
10A7 0  1260          DC      CLEER
10A8 0  80FA          DC      STC        TEMPORARY CARD CHANGE SUBROUTINES
10A9 0  8050          DC      JMS        JUMP TO FUNCTION REPRESENTED BY KEY
10AA 0  12C4          DC      FCTN
10AB 0  802A    X3    DC      FIM+/A     SELECT STATUS CHARACTER
10AC 0  0080          DC      /80
10AD 0  802B          DC      SRC+/A
10AE 0  80E4          DC      WR0        (B) ACCUMULATOR CONTENTS UPON RETURN
                *                        FROM FCTN STORED HERE
10AF 0  8050          DC      JMS        COMPARE METER SETTING REGISTER WITH
10B0 0  1450          DC      CMPAR      DESCENDING REGISTER
10B1 0  802A          DC      FIM+/A     SELECT OUTPUT WORD
10B2 0  008C          DC      /8C        LOW POSTAGE, NO POSTAGE
10B3 0  802B          DC      SRC+/A
10B4 0  80F1          DC      CLC
10B5 0  80EB          DC      ADM        WRITE LOW POSTAGE, NO POSTAGE IN
10B6 0  80E0          DC      WRM        DISPLAY LAMP REGISTER
10B7 0  8050          DC      JMS
10B8 0  1479          DC      CHCK
10B9 0  8050          DC      JMS
10BA 0  110A          DC      LDLMP
10BB 0  8040    T5    DC      JUN        RETURN TO SCAN
10BC 0  101D          DC      SCAN
                *SUBROUTINE FETCH                                   08 JUNE 1973
                *REGISTERS 0X,8X,AX,CX,EX ARE USED
                *ROUTINE INITIALIZES REGISTERS 8X,AX,CX,EX
                *8X  INITIAL ADDRESS OF 'NUMBER METER SET TO' REGISTER
                *AX  INITIAL ADDRESSES OF VARIOUS REGISTERS
                *CX  WORD ADDRESS FOR LOAD LAMP
                *E WORD FOR LOAD LAMP, F COUNTER FOR LOOP IN ADD SUBROUTINE
10BD 0  80B1    FETCH DC      XCH+1      ACCUMULATOR CARRIES ADDRESS (0-6)
10BE 0  80DD          DC      LDM+/D
10BF 0  80B0          DC      XCH+0      0X TO DX
10C0 0  803A          DC      FIN+/A     AX INITIALIZED
10C1 0  8060          DC      INC+0      0X TO EX
10C2 0  803C          DC      FIN+/C     CX INITIALIZED
10C3 0  8060          DC      INC+0      0X TO FX
10C4 0  803E          DC      FIN+/E     EX INITIALIZED
10C5 0  8028          DC      FIM+8      8X INITIALIZED
10C6 0  003C          DC      /3C
10C7 0  80C0          DC      BBL+0
                *SUBROUTINE LOOK-UP TABLE                           08 JUNE 1973
1CC8                  ORG     /10C9
10C9 0  1276          DC      TT1        T1   ADP                     C9
10CA 0  1223          DC      COUNT      PIECE COUNT                  CA
10CB 0  1201          DC      ONE        NUMBER 1                     CB
10CC 0  1202          DC      TWO        NUMBER 2                     CC
10CD 0  1203          DC      THREE      NUMBER 3                     CD
10CE 0  1226          DC      CNTRL      CONTROL SUM                  CE
10CF 0  0000          DC      /00                                     CF
                *
10D0 0  0000          DC      /00                                     00
10D1 0  002A          DC      /2A        BATCH COUNT                  D1
10D2 0  001A          DC      /1A        BATCH SUM                    D2
10D3 0  0010          DC      /10        PIECE COUNT                  D3
10D4 0  0000          DC      /00        DESCENDING REGISTER          D4
10D5 0  0006          DC      /06        ASCENDING REGISTER           D5
10D6 0  0020          DC      /20        CONTROL SUM                  C6
                *INITIAL ADDRESSES OF REGISTERS     AX
                *
10D7 0  0000          DC      /00                                     D7
10D8 0  0000          DC      /00                                     D8
10D9 0  1273          DC      TT2        T2   SUBP                    D9
10DA 0  1222          DC      BSUM       BATCH SUM                    DA
10DB 0  1204          DC      FOUR       NUMBER 4                     DB
10DC 0  1205          DC      FIVE       NUMBER 5                     DC
10DD 0  1206          DC      SIX        NUMBER 6                     CD
10DE 0  1225          DC      ASC        ASCENDING REGISTER           DE
10DF 0  0000          DC      /00                                     DF
                *
10E0 0  0000          DC      /00                                     E0
```

```
1CE1 0  008E          CC     /8E      BATCH COUNT                      E1
1CE2 0  008E          CC     /8E      BATCH SUM                        E2
1CE3 0  008F          CC     /8F      PIECE COUNT                      E3
1CE4 0  008F          CC     /8F      DESCENDING REGISTER              E4
1CE5 0  008F          CC     /8F      ASCENDING REGISTER               E5
1CE6 0  008E        * CC     /8E      CONTROL SUM                      E6
                *SELECT WORD FOR LOAD LAMP AREA   CX
                *
1CE7 0  8040    CWN3  CC     JUN                                       E7
1CE8 0  115A          CC     DOWN                                      E8
1CE9 0  1279          CC     KEY3     E9
1CEA 0  1221          CC     BCNT     BATCH COUNT                      EA
1CEB 0  1207          CC     SEVEN    NUMBER 7                         EB
1CEC 0  1208          CC     EIGHT    NUMBER 8                         EC
1CED 0  1209          CC     NINE     NUMBER 9                         ED
1CEE 0  1224          CC     DESC     DESCENDING REGISTER              EE
1CEF 0  0000          CC     /00                                       EF
                *
1CF0 0  0000          CC     /00                                       F0
1CF1 0  004C          CC     /4C      BATCH COUNT                      F1
1CF2 0  008A          CC     /8A      BATCH SUM                        F2
1CF3 0  0029          CC     /29      PIECE COUNT                      F3
1CF4 0  004A          CC     /4A      DESCENDING REGISTER              F4
1CF5 0  0086          CC     /86      ASCENDING REGISTER               F5
1CF6 0  0026          CC     /26      CONTROL SUM                      F6
                *WORD FOR LDLAMP, COUNTER   E,F
                *
1CF7 0  0000          CC     /00                                       F7
1CF8 0  0000          CC     /00
1CF9 0  1278          CC     TT4      S3
1CFA 0  1230          CC     CLEAR    CLEAR                            FA
1CFB 0  1266          CC     UNLCK    $UNLOCK                          FB
1CFC 0  1200          CC     ZERO     NUMBER 0                         FC
1CFD 0  0000          CC     /00                                       FD
1CFE 0  127E          CC     PLUS     +=                               FE
1CFF 0  12C8          CC     SET      SET                              FF
1100                  CRG    /1100
                ****************************************************
                * ROM =1 *******************************************
                ****************************************************
                *SUBROUTINE METER ENABLE                      08 JUNE 1973
                *REGISTERS AX USED
1100 0  8050    ENBLE CC     JMS      COMPARE WITH REGISTER CONTENTS
1101 0  1450          CC     CMPAR    METER SETTING VS DESC. REG.
1102 0  801A          CC     JCN+CZ
1103 0  1109          CC     Z11      JUMP OUT IF TOO LARGE C=0
1104 0  80D4          CC     LDM+4
1105 0  802A          CC     FIM+/A   IF YES, LOAD BIT TO ENABLE METER
1106 0  008D          CC     /8D      LOCATION IN OUTPUT WORD
1107 0  802B          CC     SRC+/A
1108 0  80E0          CC     WRM
1109 0  80C0    Z11   CC     BBL+0
                *SUBROUTINE LOAD LAMPS                        08 JUNE 1973
                *REGISTERS AX,CX,F USED
110A 0  802C    LDLMP CC     FIM+/C   FIRST ADDRESS IN LAMP STORAGE
110B 0  008B          CC     /8B      LOCATION
110C 0  802D    RTN   CC     SRC+/C   SET UP INITIAL ADDRESS
110D 0  80E9          CC     RDM      READ WORD
110E 0  80BF          CC     XCH+/F   TEMP. STORE
110F 0  8050          CC     JMS
1110 0  1114          CC     OUTPT
1111 0  807D          CC     ISZ+/D
1112 0  110C          CC     RTN
1113 0  80C0          CC     BBL+0
1114 0  802A    OUTPT CC     FIM+/A   SET UP COUNTING LOOP
1115 0  000C          CC     /0C
1116 0  80BF    OUT   CC     XCH+/F   RECALL WORD
1117 0  80F6          CC     RAR      PUT RIGHT BIT IN CARRY
1118 0  80BF          CC     XCH+/F   STORE REST OF WORD
1119 0  80D2          CC     LDM+2    WRITE IN CP
111A 0  80F5          CC     RAL
111B 0  8050          CC     JMS      JUMP TO CLOCK PULSE
111C 0  1474          CC     CP
111D 0  807B          CC     ISZ+/B
111E 0  1116          CC     OUT
111F 0  80C0          CC     BBL+0
                *SUBROUTINE ADD SUBROUTINES                   08 JUNE 1973
                *REGISTERS 8X,AX,F USED
1120 0  8029    ADD1  CC     SRC+8    INITIAL ADDRESS OF METER REGISTER
1121 0  80E9          CC     RDM
1122 0  806F    ADD1X CC     INC+/F   INCREMENT COUNTER
1123 0  802B    ADD2  CC     SRC+/A   SELECT REGISTER ADDRESS
1124 0  80EB          CC     ADM      ADD
1125 0  80FB          CC     DAA
1126 0  80E0          CC     WRM      WRITE
1127 0  806B          CC     INC+/B   INCREMENT REGISTER ADDRESS
1128 0  80C0          CC     BBL+0
1129 0  80F1    ADDD  CC     CLC
112A 0  8050    ADDY  CC     JMS
112B 0  1120          CC     ADD1
112C 0  8079          CC     ISZ+9    INCREMENT ADDRESS OF METER REGISTER
112D 0  1124          CC     ADDY     TERMINATE LOOP WHEN COMPLETED
112E 0  8050    ADDX  CC     JMS
112F 0  1123          CC     ADD2
1130 0  807F          CC     ISZ+/F   INCREMENT COUNTER, TERMINATE LOOP
1131 0  112E          CC     ADDX     WHEN FINISHED
1132 0  80C0          CC     BBL+0
                *SUBROUTINE ERROR                             08 JUNE 1973
                *REGISTERS AX USED
1133 0  802A    ERROR CC     FIM+/A   SELECT LOCATION IN DISPLAY BUFFER
1134 0  00BF          CC     /BF
1135 0  802B          CC     SRC+/A
1136 0  80E0          CC     WRM      WRITE IN ERROR MESSAGE
1137 0  80C0          CC     BBL+0
                *SUBROUTINE CHECK (USED IN SET)               08 JUNE 1973
```

```
                 *REGISTERS AX,C USED
                 *CHECKS TO SEE IF CERTAIN LOCATIONS ARE NON-ZERO.  IF
                 *NON-ZERO, CARRY IS SET
                 *REGISTERS SET UP BEFORE SUBROUTINE CALLED
1138 0  80F1     CHECK  DC      CLC
1139 0  802B     CK1    DC      SRC+/A
113A 0  80E9            DC      RDM
113B 0  8014            DC      JCN+AZ
113C 0  113E            DC      CK2
113D 0  80FA            DC      STC
113E 0  806B     CK2    DC      INC+/B
113F 0  807C            DC      ISZ+/C
1140 0  1139            DC      CK1
1141 0  80C0            DC      BBL+0
                 *SUBROUTINE INITIALIZE                             08 JUNE 1973
                 *REGISTERS 0X,2X,4X,6X ARE USED
1142 0  8020     INRAM DC       FIM+0     SELECT PORT  RAM1
1143 0  0040            DC      /40       BCD OUTPUT
1144 0  8022            DC      FIM+2     SELECT PORT   RAM 2
1145 0  0080            DC      /80       CP
1146 0  8024            DC      FIM+4     INTEL RAM WHERE CONTENTS DUMPED
1147 0  0000            DC      /00       ADDRESSING
1148 0  8026            DC      FIM+6     SELECT PORT   ROM2
1149 0  0020            DC      /20       BCD INPUT
114A 0  8027     LD1    DC      SRC+6
114B 0  80EA            DC      RDR       ROM2  OUTPUT OF SHIFT REGISTER
114C 0  8025            DC      SRC+4     MEMORY
114D 0  80E0            DC      WRM       PUT IN MEMORY
114E 0  8021            DC      SRC+0
114F 0  80E1            DC      WMP       RAM1  WRITE BACK IN S/R
1150 0  8023            DC      SRC+2
1151 0  80D8            DC      LDM+8     GENERATE CLOCK PULSE
1152 0  80E1            DC      WMP       RAM2
1153 0  80D0            DC      LDM+0
1154 0  80E1            DC      WMP       RAM2
1155 0  8075            DC      ISZ+5     INCREMENT RAM ADDRESS
1156 0  114A            DC      LD1
1157 0  8074            DC      ISZ+4     INCREMENT RAM ADDRESS
1158 0  114A            DC      LD1
1159 0  80C0            DC      BBL+0
                 *SUBROUTINE SHUTDOWN                               08 JUNE 1973
                 *REGISTERS 0X,2X,4X USED
115A 0  8020     DOWN   DC      FIM+0     SELECT S/R INPUT
115B 0  0040            DC      /40       BCD INPUT
115C 0  8022            DC      FIM+2     SELECT PORT
115D 0  0088            DC      /88       CP
115E 0  8024            DC      FIM+4
115F 0  0000            DC      /00       ADDRESSING, RAM
1160 0  8025     DWN1   DC      SRC+4
1161 0  80E9            DC      RDM       READ RAM
1162 0  8021            DC      SRC+0
1163 0  80E1            DC      WMP       RAM1  WRITE OUT TO S/R
1164 0  8023            DC      SRC+2
1165 0  80D8            DC      LDM+8     GENERATE CLOCK PULSE
1166 0  80E1            DC      WMP       RAM2
1167 0  80D0            DC      LDM+0
1168 0  80E1            DC      WMP       RAM2
1169 0  8075            DC      ISZ+5     INCREMENT RAM ADDRESS
116A 0  1160            DC      DWN1
116B 0  8064            DC      INC+4
116C 0  8073            DC      ISZ+3
116D 0  1160            DC      DWN1
116E 0  80D4     DWN2   DC      LDM+4     TURN OFF MEMORY
116F 0  80E1            DC      WMP       RAM2
1170 0  80D0            DC      LDM+0
1171 0  80E1            DC      WMP       RAM2
1172 0  8C40            DC      JUN       STAY IN LOOP UNTIL RESET OCCURS
1173 0  116E            DC      DWN2
                 *SUBROUTINE HOME                                   08 JUNE 1973
                 *REGISTERS 0X,CX,EX USED
1174 0  802C     HOME   DC      FIM+/C    SET UP ADDRESS OF OLD
1175 0  0030            DC      /30       NUMBER LOCATON RAM ADDRESS
1176 0  80DC            DC      LDM+/C    COUNT OF 4
1177 0  80B0            DC      XCH+0
1178 0  8050            DC      JMS       CLEAR PHOTOCELL S/R
1179 0  1189            DC      CLR       FIRST BANK OF PHOTOCELLS ENABLED
117A 0  802D     BLANK  DC      SRC+/C    WRITE ZEROS IN ALL OLD
117B 0  80E0            DC      WRM       NUMBER LOCATIONS
117C 0  806D            DC      INC+/D
117D 0  8070            DC      ISZ+0     LOCATIONS 30-33
117E 0  117A            DC      BLANK
117F 0  802E            DC      FIM+/E    WRITE ZEROS IN ALL STATUS
1180 0  00C0            DC      /C0       CHARACTERS USED
1181 0  802F            DC      SRC+/E
1182 0  80E4            DC      WR0       (C)
1183 0  80E5            DC      WR1       (C)
1184 0  8020            DC      FIM+0
1185 0  0030            DC      /30
1186 0  8021            DC      SRC+0
1187 0  80E4            DC      WR0       (3)
1188 0  80E5            DC      WR1       (3)
1189 0  80E6            DC      WR2       (3)
118A 0  80E7            DC      WR3       (3)
118B 0  80EA            DC      RDR       ROM3  CHECK EVERY STEP PHOTOCELL
118C 0  80F5            DC      RAL       USING CARRY BIT
118D 0  8012            DC      JCN+CN    IF CARRY IS ONE CONTINUE
118E 0  1198            DC      HOME1     WITH PROGRAM
118F 0  80DF            DC      LDM+/F    IF CARRY IS ZERO INSTRUCT
1190 0  80E4            DC      WR0       (3) MOTOR TO TAKE ONE
1191 0  8050            DC      JMS       HALF STEP
1192 0  11C7            DC      STEP
1193 0  8014            DC      JCN+AZ    IF NO ERROR FLAGGED CONT.
1194 0  1198            DC      HOME1     WITH PROGRAM
1195 0  8050     ERR1   DC      JMS       IF ERROR FLAGGED JUMP TO
```

```
1196 0  1133          CC      ERROR     DISPLAY IT
1197 0  80C0          CC      BBL+0
1198 0  80DC    HOME1 CC      LDM+/C    FLAG BANK IN REGISTER D
1199 0  80BD          CC      XCH+/D
119A 0  8050    HOME4 CC      JMS       JUMP TO SET ROUTINE
119B 0  1300          CC      STPB      SET TO PROPER BANK
119C 0  8014          CC      JCN+AZ    IF NO ERROR FLAGGED CONT.
119D 0  11A0          CC      HOME3     WITH PROGRAM
119E 0  8040          CC      JUN       IF NO ERROR FLAGGED, JUMP TO
119F 0  1195          CC      ERR1      DISPLAY IT
11A0 0  8050    HOME3 CC      JMS       CHECK FOR BANK AT ZERO
11A1 0  1353          CC      ZEROB
11A2 0  8050          CC      JMS       CLEAR PHOTOCELL S/R
11A3 0  11B9          CC      CLR
11A4 0  8012          CC      JCN+CN    IF BANK IS ZERO CONT. WITH
11A5 0  11AC          CC      HOME2     PROGRAM
11A6 0  8050          CC      JMS       IF BANK IS NOT ZERO STEP
11A7 0  11C7          CC      STEP      TO ZERO
11A8 0  8014          CC      JCN+AZ    IF NO ERROR FLAGGED CONT.
11A9 0  11A0          CC      HOME3     WITH PROGRAM
11AA 0  8040          CC      JUN       IF ERROR FLAGGED, JUMP TO
11AB 0  1195          CC      ERR1      DISPLAY IT
11AC 0  8021    HOME2 CC      SRC+0     CLEAR STATUS CHARACTERS
11AD 0  80E5          CC      WR1       (3)
11AE 0  80E6          CC      WR2       (3)
11AF 0  80E7          CC      WR3       (3)
11B0 0  807D          CC      ISZ+/D    LOOP TO ZERO ALL FOUR
11B1 0  119A          CC      HOME4     BANKS
11B2 0  80EA          CC      RDR       RCM3  CHECK FIFTH POSITION
11B3 0  80F5          CC      RAL       PHOTOCELL
11B4 0  80F5          CC      RAL
11B5 0  80DE          CC      LDM+/E
11B6 0  801A          DC      JCN+CZ    IF CARRY IS ZERO FLAG
11B7 0  1195          CC      ERR1      ERROR
11B8 0  80C0          CC      BBL+0     BRANCH BACK WITH NO ERROR
                *SUBROUTINE CLEAR S/R                                08 JUNE 1973
                *REGISTERS 6X USED
                *RAM 2 S/R OUTPUT
11B9 0  8026    CLR   CC      FIM+6     CLOCK IN TEN ZEROS
11BA 0  0086          CC      /86       PHOTOCELL S/R TO
11BB 0  8027          CC      SRC+6     CLEAR ALL OUTPUTS
11BC 0  80D1    CL1   CC      LDM+1     GENERATE CLOCK PULSE
11BD 0  80E1          CC      WMP       RAM2
11BE 0  80D0          CC      LDM+0
11BF 0  80E1          CC      WMP       RAM2
11C0 0  8077          CC      ISZ+7
11C1 0  11BC          CC      CL1
11C2 0  80D3          DC      LDM+3     CLOCK ONE TO FIRST OUTPUT
11C3 0  80E1          CC      WMP       RAM2   OF PHOTOCELL S/R
11C4 0  80D0          CC      LDM+0
11C5 0  80E1          CC      WMP       RAM2
11C6 0  80C0          CC      BBL+0
                *SUBROUTINE STEP                                     08 JUNE 1973
                *REGISTERS 0X,8X,EX USED
11C7 0  8020    STEP  CC      FIM+0     SET UP ADDRESS FOR STEP          *6
11C8 0  00FC          CC      /FC       SEQUENCE
11C9 0  802F          CC      SRC+/E    SELECT MOTOR OUTPUT PORT
11CA 0  8038    STEP6 DC      FIN+8
11CB 0  80EC          CC      RDO       (C) CHECK DIRECTION
11CC 0  801C          CC      JCN+AN    LOAD APPROPRIATE PATTERM
11CD 0  11D1          CC      STEP5     FOR DIRECTION
11CE 0  80A8          CC      LD+8
11CF 0  8040          DC      JUN
11D0 0  11D2          CC      STEP2
11D1 0  80A9    STEP5 CC      LD+9
11D2 0  80E1    STEP2 CC      WMP       RAM3  WRITE PATTERN TO MOTOR
11D3 0  8028          CC      FIM+8     WAIT FOR MOTOR TO RESPOND
11D4 0  0008          DC      /08
11D5 0  8078    STEP3 CC      ISZ+8
11D6 0  11D5          CC      STEP3
                *INSERT TEST FOR SHUTDOWN HERE
11D7 0  8079          CC      ISZ+9
11D8 0  11D5          CC      STEP3
11D9 0  8071          CC      ISZ+1     LOOP TO STEP 4 TIMES
11DA 0  11CA          CC      STEP6
11DB 0  8020          CC      FIM+0
11DC 0  0030          CC      /30       RAM 0
11DD 0  8021          CC      SRC+0
11DE 0  80EA          CC      RDR       RCM3  READ EVERY STEP PHOTOCELL
11DF 0  80F5          CC      RAL
11E0 0  80EC          CC      RDO       (3) CHECK FOR HALF STEP OR
11E1 0  80F4          DC      CMA       FULL STEP
11E2 0  80E4          CC      WRO       (3)
11E3 0  8014          CC      JCN+AZ
11E4 0  11E8          CC      STEP4
11E5 0  801A          CC      JCN+CZ
11E6 0  11C7          CC      STEP      HALF STEP
11E7 0  80CC    ERR4  CC      BBL+/C    IF MOTOR DID NOT STEP FLAG
11E8 0  801A    STEP4 CC      JCN+CZ    ERROR
11E9 0  11E7          CC      ERR4
11EA 0  80C0          CC      BBL+0
                *** TABLE  ********************
11EB                  ORG     /11FC
11FC 0  00C3          CC      /C3
11FD 0  0066          CC      /66       BIT PATTERNS FOR MOTOR STEPS
11FE 0  003C          CC      /3C
11FF 0  0099          CC      /99
                *SUBROUTINE                                          08 JUNE 1973
1200                  ORG     /1200
                ***************************************************************
                * ROM =2 *******************************************************
                ***************************************************************
                *** SUBROUTINES TO PERFORM KYBD FNCTNS ********************
                *SUBROUTINE NUMERICAL KEYS                          08 JUNE 1973
```

```
                         *REGISTERS 7,AX,C USED
                         *ROUTINE MUST BE PROPERLY LOCATED
                         *INITIAL ADDRESS OF FORM X0
1200 0  8000             ZERO  DC     NOP        0
1201 0  8000             ONE   DC     NOP        1
1202 0  8000             TWO   DC     NOP        2
1203 0  8000             THREE DC     NOP        3
1204 0  8000             FOUR  DC     NOP        4
1205 0  8000             FIVE  DC     NOP        5
1206 0  8000             SIX   DC     NOP        6
1207 0  8000             SEVEN DC     NOP        7
1208 0  8000             EIGHT DC     NOP        8
1209 0  802A             NINE  DC     FIM+/A     9  MEMORY LOCATION FOR NEW DIGIT
120A 0  0086                   DC     /86
120B 0  802B                   DC     SRC+/A
120C 0  8047                   DC     LD+7
120D 0  80E0                   DC     WRM        WRITE DIGIT VALUE
120E 0  80EC                   DC     RD0        (8)
120F 0  80F6                   DC     RAR        CHECK TO SEE IF NUMBER ENTERED
1210 0  8012                   DC     JCN+CN     PREVIOUSLY
1211 0  1214                   DC     Z16
1212 0  8050                   DC     JMS
1213 0  125E                   DC     CLDSP
1214 0  802A             Z16   DC     FIM+/A     ADVAN ROUTINE
1215 0  0086                   DC     /86        MOVES DIGITS THROUGH DISPLAY
1216 0  802B             AD1   DC     SRC+/A
1217 0  80E9                   DC     RDM
1218 0  80BC                   DC     XCH+/C
1219 0  80E0                   DC     WRM
121A 0  807B                   DC     ISZ+/B
121B 0  1216                   DC     AD1
121C 0  80F0                   DC     CLB        SET $UNLOCK TO ZERO
121D 0  80E6                   DC     WR2        (8)
121E 0  80C1                   DC     BBL+1
                         *SUBROUTINE                                  08 JUNE 1973
                         *** RETURN FOR ADDITION                ********************
121F 0  80C2             PLS   DC     BBL+2
                         *SUBROUTINE DISPLAY REGISTER                 08 JUNE 1973
                         *REGISTERS 7,AX,CX,EX USED
                         *ROUTINE MUST BE PROPERLY LOCATED
                         *INITIAL ADDRESS MUST BE OF FORM X0
1220 0  8000                   DC     NOP
1221 0  8000             BCNT  DC     NOP        BATCH COUNT
1222 0  8000             BSUM  DC     NOP        BATCH SUM
1223 0  8000             CCUNT DC     NOP        PIECE COUNT
1224 0  8000             DESC  DC     NOP        DESCENDING REGISTER
1225 0  8000             ASC   DC     NOP        ASCENDING REGISTER
1226 0  8050             CNTRL DC     JMS        CONTROL SUM
1227 0  125E             ZZZ   DC     CLDSP      CLEAR DISPLAY
1228 0  802A                   DC     FIM+/A     CLRRR
1229 0  0077                   DC     /77        CLEAR ADD REGISTER
122A 0  8050                   DC     JMS
122B 0  1260                   DC     CLEER
122C 0  80A7                   DC     LD+7
122D 0  8050                   DC     JMS        INITIALIZE REGISTERS
122E 0  106D                   DC     FETCH
122F 0  802D                   DC     SRC+/C     SELECT WORD FOR LDLMP
1230 0  80AE                   DC     LD+/E
1231 0  80E0                   DC     WRM
                         *LOAD UP DISPLAY AREA
1232 0  802C             TRANS DC     FIM+/C     INITIALIZE DISPLAY ADDRESS
1233 0  0087                   DC     /87
1234 0  802B             TRANZ DC     SRC+/A     SELECT RAM MEMORY
1235 0  80E9                   DC     RDM        READ
1236 0  802D                   DC     SRC+/C     DISPLAY
1237 0  80E0                   DC     WRM        WRITE
1238 0  806B                   DC     INC+/B
1239 0  806D                   DC     INC+/D
123A 0  807F                   DC     ISZ+/F
123B 0  1234                   DC     TRANZ
123C 0  80C0                   DC     BBL+0
                         *SUBROUTINE CLEAR                            08 JUNE 1973
                         *REGISTERS AX,EX USED
123D 0  8050             CLEAR DC     JMS
123E 0  125E                   DC     CLDSP
123F 0  80E6                   DC     WR2        (8) SET $UNLOCK TO ZERO
1240 0  80EC                   DC     RD0        (8) CHECK FOR PREVIOUS CLEAR
1241 0  80F5                   DC     RAL        CLEAR IS BIT 8
1242 0  801A                   DC     JCN+CZ
1243 0  1248                   DC     Z23
1244 0  802A             ZZC1  DC     FIM+/A     CLRRR
1245 0  0077                   DC     /77        CLEAR ADD REGISTER
1246 0  8050                   DC     JMS
1247 0  1260                   DC     CLEER
1248 0  802A             Z23   DC     FIM+/A     RECALL CONTENTS OF ADDITION REGISTER
1249 0  0077                   DC     /77
124A 0  802E                   DC     FIM+/E
124B 0  0007                   DC     /07
124C 0  8050                   DC     JMS
124D 0  1232                   DC     TRANS
124E 0  802A                   DC     FIM+/A     CLLMP
124F 0  008B                   DC     /8B        CLEAR LAMP AREA
1250 0  8050                   DC     JMS
1251 0  1260                   DC     CLEER
1252 0  80EC                   DC     RD0        (8) READ BATCH INDICATOR
1253 0  8014                   DC     JCN+AZ
1254 0  1250                   DC     ZZC2
1255 0  802A                   DC     FIM+/A     CLEAR BATCH
1256 0  001A                   DC     /1A
1257 0  8050                   DC     JMS
1258 0  1260                   DC     CLEER
1259 0  802A                   DC     FIM+/A     CLEAR BATCH
125A 0  002A                   DC     /2A
125B 0  8050                   DC     JMS
```

```
125C 0  1260           CC     CLEER
125D 0  80C8     ZZC2  CC     BBL+8
125E 0  802A     CLDSP CC     FIM+/A    CLEAR DISPLAY
125F 0  0087           CC     /87
1260 0  80C0     CLEER CC     LDM+0
1261 0  8028     Y     CC     SRC+/A
1262 0  80E0           CC     WRM
1263 0  8078           CC     ISZ+/8
1264 0  1261           CC     Y
1265 0  80C0           CC     BBL+0
                 *SUBROUTINE $UNLOCK                                08 JUNE 1973
                 *REGISTERS AX USED
1266 0  802A     UNLCK CC     FIM+/A    $UNLOCK
1267 0  0080           CC     /80
1268 0  802B           CC     SRC+/A
1269 0  80EC           CC     RDO       (B) CHECK TO SEE IF NUMBER ENTERED
126A 0  80F1           CC     CLC
126B 0  80F5           CC     RAL
126C 0  80F1           CC     CLC
126D 0  80F5           CC     RAL
126E 0  8014           CC     JCN+AZ    BIT 4
126F 0  1299           CC     ZZB1      IF NOT,EXIT WITH ZERO IN ACCUMULATOR
1270 0  80DF           CC     LDM+/F    OTHERWISE, SET $UNLOCK
1271 0  80E6           CC     WR2       (B) EXIT WITH 1 IN ACCUMULATOR
1272 0  80C1           CC     BBL+1
                 *SUBROUTINE NOT YET IMPLEMENTED                    08 JUNE 1973
1273 0  8040     TT2   CC     JUN
1274 0  154F           CC     S2
1275 0  8000     KEY1  CC     NOP
1276 0  8000     TT1   CC     NOP
1277 0  8040           CC     JUN
1278 0  158D           CC     S1
1279 0  8040     KEY3  CC     JUN
127A 0  1100           CC     ENBLE
127B 0  8000     TT4   CC     NOP
127C 0  8040           CC     JUN
127D 0  1512           CC     S3
                 *SUBROUTINE ADDITION AND RECALL                    08 JUNE 1973
                 *REGISTERS AX,CX USED
127E 0  802A     PLUS  CC     FIM+/A    DISPLAY ADDRESS
127F 0  0087           CC     /87
1280 0  802C           CC     FIM+/C    ADD REGISTER ADDRESS
1281 0  0077           CC     /77
1282 0  802B           CC     SRC+/A
1283 0  80F1           CC     CLC
1284 0  80EC           CC     RDO       (B) LOOK AT STATUS CHARACTER
1285 0  80F6           CC     RAR
1286 0  801A           CC     JCN+CZ    GO TO RECALL IF BIT 1 IS 0
1287 0  1299           CC     ZZB1
1288 0  80F1           CC     CLC
1289 0  802B     Z200  CC     SRC+/A    ADD DISPLAY AND REGISTER
128A 0  80E9           CC     RDM       AND WRITE BACK IN BOTH
128B 0  802D           CC     SRC+/C
128C 0  80EB           CC     ADM
128D 0  80FB           CC     DAA
128E 0  80E0           CC     WRM
128F 0  802B           CC     SRC+/A
1290 0  80E0           CC     WRM
1291 0  806B           CC     INC+/B
1292 0  807D           CC     ISZ+/D
1293 0  1289           CC     Z200
1294 0  801A           CC     JCN+CZ    CHECK FOR OVERFLOW
1295 0  121F           CC     PLS       OVERFLOW EXIT WITH 2
1296 0  80DE           CC     LDM+/E
1297 0  8050           CC     JMS
1298 0  1133           CC     ERROR
1299 0  80C0     ZZB1  CC     BBL+0
                 *SUBROUTINE UPDATE METER REGISTERS                 08 JUNE 1973
                 *REGISTERS 8X,F USED
129A 0  80D5     POST  CC     LDM+5     UPDTR  ASCENDING
129B 0  8050           CC     JMS
129C 0  108D           CC     FETCH
129D 0  8050           CC     JMS
129E 0  1129           CC     ADDC
129F 0  80D2           CC     LDM+2     BATCH SUM
12A0 0  8050           CC     JMS
12A1 0  108D           CC     FETCH
12A2 0  8050           CC     JMS
12A3 0  1129           CC     ADDC
12A4 0  80D3           CC     LDM+3     PIECE COUNTER
12A5 0  8050           CC     JMS
12A6 0  108D           CC     FETCH
12A7 0  80FA           CC     STC
12A8 0  8050           CC     JMS
12A9 0  112E           CC     ADDX
12AA 0  80D1           CC     LDM+1     BATCH COUNTER
12AB 0  8050           CC     JMS
12AC 0  108D           CC     FETCH
12AD 0  80FA           CC     STC
12AE 0  8050           CC     JMS
12AF 0  112E           CC     ADDX
12B0 0  80D4           CC     LDM+4     DESCENDING REGISTER
12B1 0  8050           CC     JMS
12B2 0  108D           CC     FETCH
12B3 0  80FA           CC     STC
12B4 0  80F9     RTN00 CC     TCS
12B5 0  8029           CC     SRC+8
12B6 0  80E8           CC     SBM
12B7 0  80F1           CC     CLC
12B8 0  8050           CC     JMS
12B9 0  1122           CC     ADDIX
12BA 0  8079           CC     ISZ+9
12BB 0  12B4           CC     RTN00
12BC 0  80F9     RTN01 CC     TCS
```

```
12BD 0  8050                 DC      JMS
12BE 0  1123                 DC      ADD2
12BF 0  807F                 DC      ISZ+/F
12C0 0  12BC                 DC      RTNO1
12C1 0  8050                 DC      JMS
12C2 0  1100                 DC      ENBLE
12C3 0  80C0                 DC      BBL+0
                     *SUBROUTINE TO HANDLE KYBD INPUTS                08 JUNE 1973
                     *REGISTERS 6X USED
12C4 0  801A         FCTN    DC      JCN+CZ
12C5 0  12C7                 DC      FCTN1
12C6 0  8037                 DC      JIN+6
12C7 0  80C0         FCTN1   DC      BBL+0
                     *SUBROUTINE SET                                  08 JUNE 1973
                     *REGISTERS AX,CX,EX USED
12C8 0  802A         SET     DC      FIM+/A    SET METER
12C9 0  0089         *       DC      /89       INITIAL ADDRESS IN DISPLAY  TO
12CA 0  80DE                 DC      LDM+/E    CHECK FOR SUNLOCK ETC.
12CB 0  80BC                 DC      XCH+/C    INITIALIZE REGISTERS FOR 'CHECK'
12CC 0  8050                 DC      JMS       PUTS CARRY BIT ON IF AMOUNT IS
12CD 0  1138                 DC      CHECK     GREATER THAN OR EQUAL TO $1.00
12CE 0  80F5                 DC      RAL
12CF 0  80BD                 DC      XCH+/D    STORE CARRY $10 - $99
12D0 0  80EC                 DC      RD0       (B) CHECK TO SEE IF NUMBER FROM KYBD
12D1 0  80F1                 DC      CLC       OR FROM PLUS  LOOK AT BITS 1 AND 2
12D2 0  80F5                 DC      RAL
12D3 0  80F1                 DC      CLC
12D4 0  80F5                 DC      RAL
12D5 0  8014                 DC      JCN+AZ
12D6 0  12E2                 DC      ZZE3
12D7 0  80DB                 DC      LDM+/B    INITIALIZE REGISTER
12D8 0  80BC                 DC      XCH+/C
12D9 0  8050                 DC      JMS       TURNS CARRY BIT ON IF MORE THAN
12DA 0  1138                 DC      CHECK     $100.00
12DB 0  80AC                 DC      LD+/D     RECOVER PREVIOUS CARRY
12DC 0  801A                 DC      JCN+CZ    CHECK FOR MORE THAN $100
12DD 0  12EC                 DC      ZZE1
12DE 0  80DE                 DC      LDM+/E    ERROR MESSAGE IF GREATER THAN OR
12DF 0  8050                 DC      JMS       EQUAL TO 100.00
12E0 0  1133                 DC      ERROR
12E1 0  80C0                 DC      BBL+0
12E2 0  8050         ZZE3    DC      JMS       CLEAR DISPLAY
12E3 0  125E                 DC      CLDSP
12E4 0  802A                 DC      FIM+/A    METER SETTING REGISTER ADDRESS
12E5 0  003C                 DC      /3C
12E6 0  802E                 DC      FIM+/E    INITIALIZING COUNTER
12E7 0  000C                 DC      /0C
12E8 0  8050                 DC      JMS       TRANSFER METER SETTING REGISTER TO
12E9 0  1232                 DC      TRANS     DISPLAY
12EA 0  8040                 DC      JUN
12EB 0  12F3                 DC      ZZE5
12EC 0  8014         ZZE1    DC      JCN+AZ    CHECK FOR MORE THAN $10
12ED 0  12F1                 DC      ZZE4
12EE 0  80EE                 DC      RD2       (8) SUNLOCK
12EF 0  8014         *       DC      JCN+AZ
12F0 0  12FA                 DC      ZZE2
12F1 0  8040         ZZE4    DC      JUN
12F2 0  137E                 DC      SETX
12F3 0  8050         ZZE5    DC      JMS
12F4 0  1100                 DC      ENBLE
12F5 0  802A                 DC      FIM+/A    CLEAR ADD REGISTER
12F6 0  0077                 DC      /77
12F7 0  8050                 DC      JMS
12F8 0  1260                 DC      CLEER
12F9 0  80C0                 DC      BBL+0
12FA 0  80D4         ZZE2    DC      LDM+4     SET UP ERROR LIGHT
12FB 0  802A                 DC      FIM+/A    SUNLOCK WARNING LAMP
12FC 0  008C                 DC      /8C
12FD 0  802B                 DC      SRC+/A
12FE 0  80E0                 DC      WRM
12FF 0  80C1                 DC      BBL+1
                     *SUBROUTINE                                      08 JUNE 1973
1300                         ORG     /1300
                     *SUBROUTINE SET TO PROPER BANK                   08 JUNE 1973
                     *REGISTERS 0X,6X,AX,D,EX USED
1300 0  80DF         STPB    DC      LDM+/F    CHECK REGISTER D TO SEE
1301 0  80F1                 DC      CLC       WHICH BANK IS SET
1302 0  809D                 DC      SUB+/D
1303 0  8014                 DC      JCN+AZ
1304 0  131B                 DC      CNTR1
1305 0  80F8                 DC      DAC
1306 0  8014                 DC      JCN+AZ
1307 0  1329                 DC      CNTR2
1308 0  80F8                 DC      DAC
1309 0  8014                 DC      JCN+AZ
130A 0  1339                 DC      CNTR3
130B 0  8050                 DC      JMS       SET TO BANK 4
130C 0  1377                 DC      CLK6      ENERGIZE BOTH SOLENOIDS
130D 0  8050                 DC      JMS
130E 0  1377                 DC      CLK6
130F 0  8050                 DC      JMS       WAIT FOR SOLENOIDS TO
1310 0  134A                 DC      WAIT      RESPOND
1311 0  80EA         *       DC      RDR       ROM3  CHECK FOR CORRECT POSITION
1312 0  80F6                 DC      RAR       OF SOLENOIDS
1313 0  801A                 DC      JCN+CZ
1314 0  1349                 DC      ERR5
1315 0  80F6                 DC      RAR
1316 0  801A                 DC      JCN+CZ
1317 0  1349                 DC      ERR5
1318 0  80D1                 DC      LDM+1     FLAG BANK 4 IN STATUS
1319 0  80E5                 DC      WR1       (3)  CHARACTER
131A 0  80C0                 DC      BBL+0
131B 0  8050         CNTR1   DC      JMS       SET TO BANK 1
131C 0  1374                 DC      CLK4
```

```
131D 0  8050   00888         DC    JMS
131E 0  1374   00889         CC    CLK4
131F 0  8050   00890         CC    JMS      WAIT FOR SOLENOIDS TO
1320 0  134A   00891         CC    WAIT     RESPOND
1321 0  80EA   00892         CC    RDR      ROM3  CHECK FOR CORRECT POSITION
1322 0  80F6   00893         CC    RAR      OF SOLENOIDS
1323 0  8012   00894         CC    JCN+CN
1324 0  1349   00895         CC    ERR5
1325 0  80F6   00896         CC    RAR
1326 0  8012   00897         CC    JCN+CN
1327 0  1349   00898         CC    ERR5
1328 0  80C0   00899         CC    BBL+0
1329 0  8050   00900  CNTR2  CC    JMS      SET TO BANK 2
132A 0  1374   00901         DC    CLK4
132B 0  8050   00902         CC    JMS
132C 0  1377   00903         CC    CLK6
132D 0  8050   00904         CC    JMS      WAIT FOR SOLENOIDS TO
132E 0  134A   00905         CC    WAIT     RESPOND
132F 0  80EA   00906         DC    RDR      ROM3  CHECK FOR CORRECT POSITION
1330 0  80F6   00907         DC    RAR      OF SOLENOIDS
1331 0  801A   00908         CC    JCN+CZ
1332 0  1349   00909         CC    ERR5
1333 0  80F6   00910         CC    RAR
1334 0  8012   00911         CC    JCN+CN
1335 0  1349   00912         CC    ERR5
1336 0  80D1   00913         CC    LDM+1    FLAG BANK 2 IN STATUS
1337 0  80E7   00914         CC    WR3      (3)  CHARACTER
1338 0  80C0   00915         CC    BBL+0
1339 0  8050   00916  CNTR3  DC    JMS      SET TO BANK 3
133A 0  1377   00917         CC    CLK6
133B 0  8050   00918         CC    JMS
133C 0  1374   00919         CC    CLK4
133D 0  8050   00920         CC    JMS      WAIT FOR SOLENOIDS TO
133E 0  134A   00921         CC    WAIT     RESPOND
133F 0  80EA   00922         CC    RDR      ROM3  CHECK FOR CORRECT POSITION
1340 0  80F6   00923         CC    RAR      OF SOLENOIDS
1341 0  8012   00924         CC    JCN+CN
1342 0  1349   00925         CC    ERR5
1343 0  80F6   00926         CC    RAR
1344 0  801A   00927         CC    JCN+CZ
1345 0  1349   00928         CC    ERR5
1346 0  80D1   00929         CC    LDM+1    FLAG BANK 3 IN STATUS
1347 0  80E6   00930         CC    WR2      (3)  CHARACTER
1348 0  80C0   00931         DC    BBL+0
1349 0  80C8   00932  ERR5   CC    BBL+/8   FLAG SOLENOID ERROR
134A 0  80D6   00933  WAIT   CC    LDM+6    50 MSEC WAIT FOR SOLENOIDS
134B 0  8077   00934  WAIT1  CC    ISZ+7    TO RESPOND
134C 0  134B   00935         CC    WAIT1
134D 0  8071   00936         CC    ISZ+1
134E 0  134B   00937         CC    WAIT1
134F 0  80F2   00938         DC    IAC
1350 0  801C   00939         CC    JCN+AN
1351 0  134B   00940         DC    WAIT1
1352 0  80C0   00941         DC    BBL+0
1353 0  80D1   00942  ZEROB  DC    LDM+1    CLOCK ONE TO SECOND OUTPUT
1354 0  8027   00943         CC    SRC+6    OF PHOTOCELL S/R
1355 0  80E1   00944         CC    WMP      RAM2
1356 0  80D0   00945         CC    LDM+0
1357 0  80E1   00946         CC    WMP      RAM2
1358 0  8077   00947  WFPC2  CC    ISZ+7    WAIT FOR PHOTOCELL TO
1359 0  1358   00948         CC    WFPC2    RESPOND
135A 0  8077   00949  WFPC3  CC    ISZ+7
135B 0  135A   00950         CC    WFPC3
135C 0  8021   00951         CC    SRC+0    CHECK FOR BANK 4 FLAG
135D 0  80EC   00952         CC    RD1      (3)
135E 0  8014   00953         CC    JCN+AZ
135F 0  1363   00954         CC    Z1
1360 0  80EA   00955         CC    RDR      ROM3  LOAD BANK 4 PHOTOCELL TO
1361 0  80F6   00956         CC    RAR      CARRY
1362 0  80C0   00957         CC    BBL+0
1363 0  80EE   00958  Z1     CC    RD2      (3)  CHECK FOR BANK 3 FLAG
1364 0  8014   00959         CC    JCN+AZ
1365 0  136A   00960         CC    Z2
1366 0  80EA   00961         CC    RDR      ROM3  LOAD BANK 3 PHOTOCELL TO
1367 0  80F6   00962         CC    RAR      CARRY
1368 0  80F6   00963         CC    RAR
1369 0  80C0   00964         CC    BBL+0
136A 0  80EF   00965  Z2     CC    RD3      (3)
136B 0  8014   00966         CC    JCN+AZ   CHECK FOR BANK 2 FLAG
136C 0  1371   00967         CC    Z3
136D 0  80EA   00968         CC    RDR      ROM3  LOAD BANK 2 PHOTOCELL TO
136E 0  80F5   00969         CC    RAL      CARRY
136F 0  80F5   00970         CC    RAL
1370 0  80C0   00971         CC    BBL+0
1371 0  80EA   00972  Z3     CC    RDR      ROM3  LOAD BANK 1 PHOTOCELL TO
1372 0  80F5   00973         CC    RAL      CARRY
1373 0  80C0   00974         CC    BBL+0
1374 0  80D4   00975  CLK4   CC    LDM+4    CLOCK ZERO TO SOLENOID S/R
1375 0  8040   00976         DC    JUN
1376 0  1378   00977         DC    CLK2
1377 0  80D6   00978  CLK6   DC    LDM+6    CLOCK ONE TO SOLENOID S/R
1378 0  8027   00979  CLK2   DC    SRC+6
1379 0  80E1   00980         DC    WMP      RAM2
137A 0  80D0   00981         DC    LDM+0
137B 0  80E1   00982         DC    WMP      RAM2
137C 0  8021   00983         DC    SRC+0
137D 0  80C0   00984         DC    BBL+0
137E 0  802A   00985  SETX   DC    FIM+/A   DISPLAY ADDRESS
137F 0  0087   00986         DC    /87
1380 0  802E   00987         DC    FIM+/E   METER SETTING AREA
1381 0  003C   00988         DC    /3C
1382 0  8028   00989  SET1   DC    SRC+/A
1383 0  80E9   00990         DC    RDM      READ DISPLAY
1384 0  802F   00991         DC    SRC+/E
```

```
1385 0  80E0          CC    WRM      PUT IN MSA
1386 0  806B          CC    INC+/B   INCREMENT ADDRESSES AND COUNTER
1387 0  807F          CC    ISZ+/F
1388 0  1382          CC    SET1
               *SUBROUTINE MAIN                          08 JUNE 1973
               *REGISTERS 0X,6X,AX,CX,EX USED
1389 0  802E   MAIN   DC    FIM+/E
138A 0  00C0          CC    /C0      SELECT OUTPUT PORT FOR MOTOR
138B 0  8026          CC    FIM+6    SELECT OUTPUT PORT FOR
138C 0  0080          DC    /80      SHIFT REGISTERS
138D 0  8020          CC    FIM+0    SELECT INPUT PORT FOR
138E 0  0030          CC    /30      PHOTOCELLS
138F 0  802A          CC    FIM+/A   SELECT ADDRESS FOR LED
1390 0  003F          CC    /3F      AND NEW NUMBER
1391 0  802C          CC    FIM+/C
1392 0  003C          CC    /3C
1393 0  80BD   MAIN8  CC    XCH+/D
1394 0  80F4          CC    CMA
1395 0  80BD          CC    XCH+/D
1396 0  802D          CC    SRC+/C   COMPARE NEW NUMBER WITH
1397 0  80E9          CC    RDM      OLD
1398 0  802B          CC    SRC+/A
1399 0  80F1          CC    CLC
139A 0  80E8          DC    SBM+
139B 0  801A          CC    JCN+CZ   LOAD NUMBER OF STEPS TO
139C 0  13A5          CC    MAIN3    REGISTER F AND
139D 0  8014          CC    JCN+AZ   FLAG DIRECTION IN
139E 0  13EC          CC    MAIN6    STATUS CHARACTER
139F 0  80F4          CC    CMA
13A0 0  80F2          CC    IAC
13A1 0  80BF          CC    XCH+/F
13A2 0  80D0          CC    LDM+0
13A3 0  8040          CC    JUN
13A4 0  13A7          DC    MAIN4
13A5 0  80BF   MAIN3  CC    XCH+/F
13A6 0  80DF          CC    LDM+/F
13A7 0  802F   MAIN4  CC    SRC+/E
13A8 0  80E4          CC    WR0      (C)
13A9 0  802B          CC    SRC+/A   WRITE NEW NUMBER IN OLD
13AA 0  80E9          CC    RDM      LOCATION
13AB 0  802D          CC    SRC+/C
13AC 0  80E0          CC    WRM
13AD 0  80BD          CC    XCH+/D
13AE 0  80F4          CC    CMA
13AF 0  80BD          CC    XCH+/D
13B0 0  8050          CC    JMS      SET TO PROPER BANK
13B1 0  1300          CC    STP8
13B2 0  80BD          CC    XCH+/D
13B3 0  80F4          CC    CMA
13B4 0  80BD          CC    XCH+/D
13B5 0  8014          CC    JCN+AZ   IF NO ERROR FLAGGED CONT
13B6 0  13BB          CC    MAIN2    WITH PROGRAM
13B7 0  8040   ERR6   CC    JUN      IF ERROR FLAGGED JUMP TO
13B8 0  1133          CC    ERROR    DISPLAY IT
13B9 0  8000          CC    NOP
13BA 0  8000          CC    NOP
13BB 0  8050   MAIN2  CC    JMS      STEP MOTOR TO NEW NUMBER
13BC 0  11C7          CC    STEP
13BD 0  801C          CC    JCN+AN   IF ERROR FLAGGED JUMP TP
13BE 0  13B7          CC    ERR6     DISPLAY IT
13BF 0  802F          CC    SRC+/E   CHECK DIRECTION AND KEEP
13C0 0  80EC          CC    RD0      (C)  TRACK AND CHECK FIRST
13C1 0  8014          CC    JCN+AZ   POSITION PHOTOCELL
13C2 0  13D5          CC    POS56    ACCORDINGLY
13C3 0  80ED          DC    RD1      (C)  ROTATE LEFT THROUGH CARRY
13C4 0  80F1          CC    CLC
13C5 0  801C          CC    JCN+AN
13C6 0  13C8          CC    POS55
13C7 0  80FA          CC    STC
13C8 0  80F5   POS55  CC    RAL
13C9 0  801C          CC    JCN+AN
13CA 0  13DD          CC    POS53
13CB 0  8021   POS51  CC    SRC+0
13CC 0  80EA          CC    RDR      ROM3
13CD 0  80F5          DC    RAL
13CE 0  80F5          CC    RAL
13CF 0  80DE          CC    LDM+/E
13D0 0  801A          CC    JCN+CZ   IF ERROR FLAGGED JUMP TO
13D1 0  13B7          CC    ERR6     DISPLAY IT
13D2 0  80F0          DC    CLB
13D3 0  8040          CC    JUN
13D4 0  13DD          CC    POS53
13D5 0  80ED   POS56  CC    RD1      (C)  READ 5TH PHOTOCELL
13D6 0  80F1          CC    CLC       ROTATE RIGHT THROUGH CARRY
13D7 0  801C          CC    JCN+AN
13D8 0  13DA          CC    POS58
13D9 0  80FA          CC    STC
13DA 0  80F6   POS58  CC    RAR
13DB 0  8014          CC    JCN+AZ
13DC 0  13CB          CC    POS51
13DD 0  802F   POS53  CC    SRC+/E
13DE 0  80E5          CC    WR1      (C)
13DF 0  807F          CC    ISZ+/F   COUNT TO NEW NUMBER
13E0 0  13BB          CC    MAIN2
13E1 0  802D          CC    SRC+/C   IF NEW NUMBER IS ZERO
13E2 0  80E9          CC    RDM      CHECK THAT BANK IS
13E3 0  801C          CC    JCN+AN   AT ZERO
13E4 0  13EC          CC    MAIN6
13E5 0  8050          CC    JMS
13E6 0  1353          DC    ZEROB
13E7 0  80DD          DC    LDM+/D
13E8 0  801A          CC    JCN+CZ   IF ERROR FLAGGED JUMP TO
13E9 0  13B7          CC    ERR6     DISPLAY IT
13EA 0  8050          CC    JMS      CLEAR PHOTOCELL S/R
13EB 0  11B9          DC    CLR
13EC 0  80D0   MAIN6  CC    LDM+0    CLEAR FLAGS FROM STATUS
13ED 0  8021          CC    SRC+0    CHARACTERS
13EE 0  80E5          CC    WR1      (3)
13EF 0  80E6          CC    WR2      (3)
```

```
13F0 0   80E7        DC        WR3          (3)
13F1 0   80E8        DC        XCH+/B
13F2 0   80F8        DC        DAC          DECREMENT MEMORY ADDRESS
13F3 0   806B        DC        XCH+/B
13F4 0   806D        DC        XCH+/D
13F5 0   80F4        DC        CMA
13F6 0   806D        DC        XCH+/D
13F7 0   807D        DC        ISZ+/D       COUNT FOR 4 BANKS
13F8 0   1393        DC        MAIN6
13F9 0   8050        DC        JMS          ALWAYS LEAVE METER AT
13FA 0   1318        DC        CNTR1        BANK1
13FB 0   801C        DC        JCN+AN       IF ERROR FLAGGED, JUMP TO
13FC 0   1367        DC        ERR6         DISPLAY IT
13FD 0   8040        DC        JUN
13FE 0   12F3        DC        ZZE5
                 *SUBROUTINE                                 08 JUNE 1973
13FF                   ORG     /1400
                 *SUBROUTINE ADP                                30 JAN 74
                 *ROUTINE TO ADD POSTAGE TO METER (BOTH DESCENDING REGISTER
                 *AND CONTROL SUM)
1400 0   802C    ADP   DC      FIM+/C
1401 0   00E7          DC      /E7
1402 0   802D          DC      SRC+/C
1403 0   80EC          DC      RD0          (B)  READ STATUS CHARACTER
1404 0   80F6          DC      RAR          CHECK FOR XXX1
1405 0   801A          DC      JCN+CZ
1406 0   143B          DC      ERRR
1407 0   802E          DC      FIM+/E
1408 0   0000          DC      /00
1409 0   806F    RTN1  DC      INC+/F       DETERMINE NUMBER OF CHARACTERS
140A 0   802D          DC      SRC+/C       IN DISPLAY
140B 0   80E9          DC      RDM
140C 0   8014          DC      JCN+AZ
140D 0   1410          DC      END
140E 0   80AF          DC      LD+/F
140F 0   80BE          DC      XCH+/E       AT END, CONTAINS NUMBER OF CHARACTER
1410 0   807D    END   DC      ISZ+/D       IN DISPLAY
1411 0   1409          DC      RTN1
1412 0   80F1          DC      CLC
1413 0   80D6          DC      LDM+6
1414 0   809E          DC      SUB+/E       GO TO ERROR IF TOO MANY
1415 0   801A          DC      JCN+CZ
1416 0   1438          DC      ERRR
1417 0   802A          DC      FIM+/A       DESCENDING REGISTER
1418 0   0000          DC      /00
1419 0   802C          DC      FIM+/C       DISPLAY
141A 0   00B7          DC      /B7
141B 0   802E          DC      FIM+/E
141C 0   00AA          DC      /AA
141D 0   80F1          DC      CLC
141E 0   802D    RTN2  DC      SRC+/C       ADD TO DESCENDING REGISTER
141F 0   80E9          DC      RDM
1420 0   802B          DC      SRC+/A
1421 0   80EB          DC      ADM
1422 0   80FB          DC      DAA
1423 0   80E0          DC      WRM
1424 0   806B          DC      INC+/B
1425 0   806D          DC      INC+/D
1426 0   807E          DC      ISZ+/E
1427 0   141E          DC      RTN2
1428 0   801A          DC      JCN+CZ
1429 0   1441          DC      END1
142A 0   802A          DC      FIM+/A       UNDO ADDITION IF OVERFLOW
142B 0   0000          DC      /00
142C 0   802C          DC      FIM+/C
142D 0   00B7          DC      /B7
142E 0   80FA          DC      STC
142F 0   80F9    RTN3  DC      TCS
1430 0   802D          DC      SRC+/C
1431 0   80E8          DC      SBM
1432 0   80F1          DC      CLC
1433 0   802B          DC      SRC+/A
1434 0   80EB          DC      ADM
1435 0   80FB          DC      DAA
1436 0   80E0          DC      WRM
1437 0   806B          DC      INC+/B
1438 0   806D          DC      INC+/D
1439 0   807F          DC      ISZ+/F
143A 0   142F          DC      RTN3
143B 0   802C    ERRR  DC      FIM+/C       ERROR ROUTINE, LOADS MESSAGE INTO
143C 0   00BF          DC      /BF          DISPLAY
143D 0   802D          DC      SRC+/C
143E 0   80DE          DC      LDM+/E
143F 0   80E0          DC      WRM
1440 0   80C0          DC      BBL+0
1441 0   802A    END1  DC      FIM+/A       ADD CONTENTS OF DISPLAY TO CONTROL
1442 0   00B7          DC      /B7          SUM
1443 0   802C          DC      FIM+/C
1444 0   0020          DC      /20
1445 0   80F1          DC      CLC
1446 0   802B    RTN4  DC      SRC+/A
1447 0   80E9          DC      RDM
1448 0   802D          DC      SRC+/C
1449 0   80EB          DC      ADM
144A 0   80FB          DC      DAA
144B 0   80E0          DC      WRM
144C 0   806D          DC      INC+/D
144D 0   807B          DC      ISZ+/B
144E 0   1446          DC      RTN4
144F 0   80C0          DC      BBL+0
                 *SUBROUTINE COMPARE  METER SETTING VS DESC. REG 08 JUNE 1973
                 *REGISTERS BX,AX,EX USED BY ROUTINE
1450 0   8028    CMPAR DC      FIM+8        METER SETTING REGISTER
1451 0   003C          DC      /3C
1452 0   802A          DC      FIM+/A       INITIAL LOCATION OF DESCENDING REG.
1453 0   0000          DC      /00
1454 0   802E          DC      FIM+/E       COUNTING LOOPS
1455 0   000E          DC      /0E
```

```
1456 0  80FA            DC     STC
                  *
1457 0  80F9      C1    DC     TCS       SUBTRACTION LOOP TO COMPARE MSR WITH
1458 0  8029            DC     SRC+8     DESCENDING REGISTER
1459 0  80E8            DC     SBM
145A 0  80F1            DC     CLC
145B 0  802B            DC     SRC+/A
145C 0  80EB            DC     ADM
145D 0  80FB            DC     DAA
145E 0  806E            DC     INC+/E
145F 0  8079            DC     ISZ+9
1460 0  1457            DC     C1
                  *BASIC SUBTRACTION LOOP
                  *
1461 0  80F9      C2    DC     TCS
1462 0  802B            DC     SRC+/A
1463 0  80EB            DC     ADM
1464 0  80FB            DC     DAA       PROCESS CARRY
1465 0  80E9            DC     RDM
1466 0  8014            DC     JCN+AZ
1467 0  1469            DC     C3
1468 0  806E            DC     INC+/E    CHECK FOR MORE THAN $100
                  *E NOT ZERO, DESC. REG. GREATER THAN OR = $100.00
1469 0  806B      C3    DC     INC+/B
146A 0  807F            DC     ISZ+/F
146B 0  1461            DC     C2
146C 0  80AE            DC     LD+/E
146D 0  8014            DC     JCN+AZ
146E 0  1470            DC     C4
146F 0  80C0            DC     BBL+0     GREATER THAN $100
1470 0  801A      C4    DC     JCN+CZ
1471 0  1473            DC     C5        C5    BBL+3
1472 0  80C2            DC     BBL+2     LESS THAN $100
1473 0  80C3      C5    DC     BBL+3
                  *SUBROUTINE CLOCK PULSE                          08 JUNE 1973
                  *REGISTER AX  SPECIFIES PORT ADDRESS
1474 0  802B      CP    DC     SRC+/A
1475 0  80E1            DC     WMP       RAMO  WRITE SET-UP WORD
1476 0  80D0            DC     LDM+0     CLEAR ACCUMULATOR
1477 0  80E1            DC     WMP       RAMO  END CP
1478 0  80C0            DC     BBL+0
                  *SUBROUTINE CHCK
1479 0  80DA      CHCK  DC     LDM+/A
147A 0  80B0            DC     XCH+0     INITIALIZE LOOP COUNTER
147B 0  8028            DC     FIM+8     DESC ADDRESS
147C 0  0000            DC     /00
147D 0  802C            DC     FIM+/C    ASC ADDRESS
147E 0  0006            DC     /06
147F 0  802E            DC     FIM+/E    CNTRL ADDRESS
1480 0  0020            DC     /20
1481 0  80F1            DC     CLC
1482 0  8029      CHCK1 DC     SRC+B     READ DESCENDING REGISTER
1483 0  80E9            DC     RDM
1484 0  802D            DC     SRC+/C
1485 0  80EB            DC     ADM       ADD ASCENDING REGISTER
1486 0  80FB            DC     DAA
1487 0  80F5            DC     RAL
1488 0  80BB            DC     XCH+/B    STORE CARRY
1489 0  80AB            DC     LD+/B
148A 0  80F6            DC     RAR       RESTORE WORD
148B 0  80FA            DC     STC
148C 0  80F4            DC     CMA
148D 0  802F            DC     SRC+/E
148E 0  80EB            DC     ADM       COMPARE CNTRL
148F 0  801C            DC     JCN+AN
1490 0  14AC            DC     CHCK9     GO TO ERROR MESSAGE
1491 0  80AB            DC     LD+/B
1492 0  80F6            DC     RAR       RESTORE CARRY
1493 0  8069            DC     INC+9
1494 0  806D            DC     INC+/D
1495 0  806F            DC     INC+/F
1496 0  8070            DC     ISZ+0
1497 0  1482            DC     CHCK1
1498 0  80D0      CHCK2 DC     LDM+0     PROPAGATE CARRY THROUGH SUM
1499 0  802D            DC     SRC+/C    ADD CARRY
149A 0  80EB            DC     ADM
149B 0  80FB            DC     DAA
149C 0  80F5            DC     RAL
149D 0  80BB            DC     XCH+/B    STORE CARRY
149E 0  80AB            DC     LD+/B
149F 0  80F6            DC     RAR       RESTORE WORD
14A0 0  80FA            DC     STC
14A1 0  80F4            DC     CMA
14A2 0  802F            DC     SRC+/E
14A3 0  80EB            DC     ADM       COMPARE CNTRL
14A4 0  801C            DC     JCN+AN
14A5 0  14AC            DC     CHCK9     GO TO ERROR MESSAGE
14A6 0  80AB            DC     LD+/B
14A7 0  80F6            DC     RAR       RESTORE CARRY
14A8 0  806F            DC     INC+/F
14A9 0  807D            DC     ISZ+/D
14AA 0  1498            DC     CHCK2
14AB 0  80C0            DC     BBL+0
14AC 0  8028      CHCK9 DC     FIM+8
14AD 0  00BC            DC     /BC
14AE 0  802A            DC     FIM+/A
14AF 0  00EB            DC     /EB
14B0 0  8050            DC     JMS
14B1 0  1260            DC     CLEER
14B2 0  8029            DC     SRC+8
14B3 0  80D8            DC     LDM+8
14B4 0  80E0            DC     WRM
14B5 0  80C0            DC     BBL+0
                        END -
0300 0  1000      START NOP
                        WDISK
0303    0300            END    START
```

| SYMBOL | VALUE | REL | DEFN | REFERENCES |
|---|---|---|---|---|
| ADD | 8080 | 0 | 00003 | 00081,R 00152,R 00171,R |
| ADDD | 1129 | 0 | 00350 | 00753,R C0758,R |
| ADDX | 112E | 0 | 00355 | 00358,R 00764,R 00770,R |
| ADDY | 112A | 0 | 00351 | 00354,R |
| ADD1 | 1120 | 0 | C0341 | 00352,R |
| ADD1X | 1122 | 0 | 00343 | 00780,R |
| ADD2 | 1123 | 0 | 00344 | 00356,R 00785,R |
| ADM | 30E4 | 0 | 00003 | 00207,R 00345,R 00733,R 01154,R 01173,R 01194,R 01216,R 01225,R 01263,R 01272,R 01284,R 01293,R |
| ADP | 1400 | 0 | 01121 | |
| ADL | 1216 | 0 | C0601 | 00606,R |
| AC | 000C | 0 | 00C03 | 00085,R 00109,R 00118,R 00128,R 00153,R 00167,R 00531,R 00939,R 0105C,R 01058,R 01062,R 01076,R 01088,R 01112,R 01273,R 01294,R |
| ASC | 1225 | 0 | 00622 | 00259,R |
| AZ | 0004 | 0 | 00003 | 00053,R 00101,R 00113,R 00375,R 00469,R 00478,R 00490,R 00555,R 00671,R 00700,R 00812,R 00835,R C0838,R 00862,R 00865,R C0868,R 00953,R 00959,R 00966,R 01018,R 01042,R 01054,R 01080,R 01133,R 01228,R 01236,R |
| BBL | 80C0 | 0 | 00003 | 00232,R 00314,R 00326,R 00338,R 00349,R 00359,R 00366,R 00381,R 00407,R 00473,R 00506,R 00523,R 00559,R 00562,R 00609,R 00612,R 00646,R 00681,R 00689,R 00704,R 00746,R 00740,R 00796,R 00824,R 00848,R 00854,R 00885,R 00899,R 00915,R 00931,R 00932,R 00941,R 00957,R 00964,R 00971,R 00974,R 00984,R 01185,R 01200,R 01238,R 01241,R 01242,R 01249,R 01301,R 01311,R |
| BCNT | 1221 | 0 | 00618 | 00274,R |
| BLANK | 117A | 0 | 00444 | 00448,R |
| BSUM | 1222 | 0 | 00619 | 00255,R |
| CHCK | 1479 | 0 | 01251 | 00037,R 00210,R |
| CHCK1 | 1482 | 0 | 01260 | 01281,R |
| CHCK2 | 1498 | 0 | 01282 | 01300,R |
| CHCK3 | 14AC | 0 | 01302 | 01274,R 01295,R |
| CHECK | 1136 | 0 | 00372 | 00804,R 00817,R |
| CIRC | 1071 | 0 | 00134 | 00135,R 00139,R |
| CR1 | 1139 | 0 | 00373 | 00360,R |
| CR2 | 113E | 0 | 00378 | 00376,R |
| CLB | 80F0 | 0 | C0C03 | 00607,R C1071,R |
| CLC | 80F1 | 0 | 00C03 | 00071,R 00079,R 00107,R 00116,R 00126,R 00145,R 00164,R 00169,R 00182,R 00184,R 00206,R 00350,R 00372,R 00696,R 00698,R 00724,R 00729,R 00778,R 00808,R 00810,R 00860,R C1024,R C1057,R 01075,R 01139,R 01150,R 01171,R 01190,R 01214,R 01259,R |
| CLDSP | 125E | 0 | 00682 | 00598,R 00624,R 00650,R 00826,R |
| CLEAR | 1230 | 0 | 00649 | 00293,R |
| CLEER | 1260 | 0 | 00684 | 00022,R C0158,R 00192,R 00628,R C0659,R 00669,R 00676,R 00680,R 00847,R 01307,R |
| CLK2 | 1378 | 0 | 00979 | 00977,R |
| CLK4 | 1374 | 0 | 00975 | 00887,R C0889,R 00901,R 00919,R |
| CLK6 | 1377 | 0 | C0978 | 00871,R C0873,R 00903,R 00917,R |
| CLR | 11B9 | 0 | C0510 | 00443,R C0485,R 01096,R |
| CL1 | 11BC | 0 | 00513 | 00518,R |
| CMA | 80F4 | 0 | 00003 | 00553,R 01009,R 01020,R 01035,R 01040,R 01106,R 01270,R 01291,R |
| CMC | 80F3 | 0 | C0C03 | |
| CMPAR | 1450 | 0 | 01203 | 00202,R 00306,R |
| CN | 0002 | 0 | 00C03 | 00463,R 00486,R 00595,R 00894,R 00897,R 00911,R 00924,R |
| CNTRL | 1226 | 0 | 00623 | 00240,R |
| CNTR1 | 1318 | 0 | C0E85 | 00863,R 01111,R |
| CNTR2 | 1329 | 0 | C0900 | 00866,R |
| CNTR3 | 1339 | 0 | 00916 | 00869,R |
| CCNT3 | 1023 | 0 | 00051 | 00058,R |
| CCNT4 | 1029 | 0 | CCC57 | CC054,R |
| COUNT | 1223 | 0 | 00620 | 00236,R |
| CP | 1474 | 0 | 01245 | 00066,R 00142,R 00335,R |
| CZ | 000A | 0 | 00003 | 00082,R 00090,R 00307,R 00504,R 00557,R 00560,R 00654,R 00727,R 00741,R 0C793,R 00814,R C0878,R C0881,R 00908,R 00927,R C1016,R 01069,R 01093,R 01126,R 01142,R 01161,R 01239,R |
| C1 | 1457 | 0 | 01211 | 01220,R |
| C2 | 1461 | 0 | 01223 | 01234,R |
| C3 | 1469 | 0 | 01232 | 01229,R |
| C4 | 1470 | 0 | 01239 | 01237,R |
| C5 | 1473 | 0 | 01242 | 01240,R |
| DAA | 80FB | 0 | 00003 | 00346,R 00734,R 01155,R 01174,R 01195,R 01217,R 01226,R 01264,R 01265,R |
| DAC | 80F8 | 0 | 00003 | 00864,R 00867,R 01103,R |
| DCL | 80FD | 0 | C0C03 | |
| DESC | 1224 | 0 | 00621 | 00028,R 00278,R |
| DOWN | 115A | 0 | 00410 | 00272,R |
| DWN1 | 1160 | 0 | C0416 | 00426,R C0429,R |
| DWN2 | 116E | 0 | 00430 | 00435,R |
| DWN3 | 10E7 | 0 | 00271 | 00137,R |
| EIGHT | 1208 | 0 | 00587 | 00276,R |
| ENBLE | 1100 | 0 | 00305 | 00713,R 00789,R 00843,R |
| END | 1410 | 0 | 01137 | 01134,R |
| END1 | 1441 | 0 | 01186 | 01162,R |
| ERROR | 1133 | 0 | 00362 | 00472,R C0745,R 00823,R 01045,R |
| ERRR | 1438 | 0 | 01180 | 01127,R 01143,R |
| ERR1 | 1195 | 0 | 00471 | 00481,R 00493,R 00505,R |
| ERR4 | 11E7 | 0 | 00559 | 00561,R |
| ERR5 | 1349 | 0 | 00932 | 00879,R C0862,R 00895,R 00898,R 00909,R 00912,R 00925,R 00928,R |
| ERR6 | 1387 | 0 | 01044 | 01051,R 01070,R 01094,R 01113,R |
| FCTN | 12C4 | 0 | 00793 | 00030,R 00195,R |
| FCTN1 | 12C7 | 0 | 00796 | C0794,R |
| FETCH | 10BC | 0 | 00222 | 00631,R C0751,R 00756,R 00761,R 00767,R 00773,R |
| FIM | 8020 | 0 | 00C03 | 00012,R CC019,R 00027,R C0031,R 0C045,R 00047,R 00049,R 00062,R 00132,R 00146,R 00155,R 00178,R 00189,R 00196,R 00203,R 00230,R 00310,R 00317,R 00327,R 00362,R 00364,R 00356,R 00388,R 00390,R 00410,R 00412,R 00414,R 00438,R 00449,R 00454,R 0051C,R 00526,R 00536,R 00547,R C0588,R 00599,R 00625,R 00636,R 00656,R 00660,R 00662,R 00666,R 00673,R 00677,R 00682,R 00692,R 00719,R 00721,R 00799,R 00827,R 0C829,R 00844,R 00850,R 00985,R C0987,R 00998,R 01000,R 01002,R 01004,R 01006,R 01121,R 01128,R 01144,R 01146,R 01148,R 01163,R 01165,R 01180,R 01186,R 01188,R 01203,R 01205,R 01207,R 01253,R 01255,R 01257,R 01302,R 01304,R |
| FIN | 8030 | 0 | 00003 | 00177,R C0225,R 00227,R 00229,R 00529,R |
| FIVE | 1205 | 0 | C0584 | 00257,R |
| FOUR | 1204 | 0 | 00583 | 00256,R |
| HOME | 1174 | 0 | 00438 | 00024,R |
| HOME1 | 1198 | 0 | 00474 | 00464,R 0047C,R |
| HOME2 | 11AC | 0 | 00494 | 00487,R |
| HOME3 | 11A0 | 0 | 00482 | C0479,R 00491,R |
| HOME4 | 119A | 0 | 00476 | 00499,R |
| IAC | 80F2 | 0 | C0C03 | 00938,R 01021,R |
| INC | 8060 | 0 | 00003 | 00111,R 00226,R 00228,R 00343,R 00348,R 00378,R 00427,R 00446,R 00642,R 00643,R 00738,R 00993,R 01130,R 01157,R 01158,R 01176,R 01177,R 01197,R 01218,R 01230,R 01232,R 01277,R 01278,R 01279,R 01298,R |

| SYMBOL | VALUE | REL | DEFN | REFERENCES |
|---|---|---|---|---|
| INRAM | 1142 | 0 | 00384 | 00018,R |
| ISZ | 8070 | 0 | 00003 | 00057,R 00134,R 00138,R 00143,R 00324,R 00336,R 00353,R 00357,R 00379,R 00403,R 00405,R 00425,R 00428,R 00447,R 00498,R 00517,R 00540,R 00543,R 00545,R 00605,R 00644,R 00667,R 00739,R 00781,R 00786,R 00934,R 00936,R 00947,R 00949,R 00994,R 01084,R 01106,R 01137,R 01159,R 01178,R 01198,R 01219,R 01233,R 01280,R 01299,R |
| JCN | 8010 | 0 | 00003 | 00053,R 00082,R 00085,R 00090,R 00101,R 00109,R 00113,R 00118,R 00128,R 00136,R 00153,R 00167,R 00307,R 00375,R 00463,R 00469,R 00478,R 00486,R 00490,R 00504,R 00531,R 00555,R 00557,R 00560,R 00595,R 00654,R 00671,R 00700,R 00727,R 00741,R 00793,R 00812,R 00819,R 00835,R 00838,R 00862,R 00865,R 00868,R 00878,R 00881,R 00894,R 00897,R 00906,R 00911,R 00924,R 00927,R 00939,R 00953,R 00959,R 00966,R 01016,R 01018,R 01042,R 01050,R 01054,R 01058,R 01062,R 01069,R 01076,R 01080,R 01088,R 01093,R 01112,R 01126,R 01133,R 01142,R 01161,R 01228,R 01236,R 01239,R 01273,R 01294,R |
| JIN | 8031 | 0 | 00003 | 00795,R |
| JMS | 8050 | 0 | 00003 | 00017,R 00021,R 00023,R 00029,R 00036,R 00038,R 00065,R 00141,R 00157,R 00160,R 00191,R 00194,R 00201,R 00209,R 00211,R 00305,R 00322,R 00334,R 00351,R 00355,R 00442,R 00467,R 00471,R 00476,R 00482,R 00484,R 00488,R 00597,R 00623,R 00627,R 00630,R 00649,R 00658,R 00664,R 00668,R 00675,R 00679,R 00744,R 00750,R 00752,R 00755,R 00757,R 00760,R 00763,R 00766,R 00769,R 00772,R 00779,R 00784,R 00788,R 00803,R 00816,R 00822,R 00825,R 00831,R 00842,R 00846,R 00870,R 00872,R 00874,R 00886,R 00888,R 00890,R 00900,R 00902,R 00904,R 00916,R 00918,R 00920,R 01037,R 01048,R 01090,R 01095,R 01110,R 01306,R |
| JUN | 8040 | 0 | 00003 | 00096,R 00123,R 00162,R 00213,R 00271,R 00434,R 00480,R 00492,R 00534,R 00706,R 00710,R 00712,R 00715,R 00833,R 00840,R 00976,R 01024,R 01044,R 01072,R 01114,R |
| KBP | 80FC | 0 | 00003 | 00103,R |
| KEY1 | 1275 | 0 | 00708 | |
| KEY3 | 1279 | 0 | 00712 | 00273,R |
| LD | 80A0 | 0 | 00003 | 00055,R 00072,R 00105,R 00112,R 00120,R 00125,R 00174,R 00533,R 00536,R 00591,R 00629,R 00633,R 00818,R 01135,R 01235,R 01267,R 01275,R 01288,R 01296,R |
| LDLMP | 110A | 0 | 00317 | 00039,R 00212,R |
| LDM | 8000 | 0 | 00003 | 00015,R 00025,R 00034,R 00064,R 00074,R 00080,R 00098,R 00130,R 00140,R 00149,R 00165,R 00170,R 00223,R 00309,R 00332,R 00399,R 00401,R 00421,R 00423,R 00430,R 00432,R 00440,R 00465,R 00474,R 00503,R 00513,R 00515,R 00519,R 00521,R 00684,R 00702,R 00743,R 00749,R 00754,R 00759,R 00765,R 00771,R 00801,R 00814,R 00821,R 00849,R 00859,R 00883,R 00913,R 00929,R 00933,R 00942,R 00945,R 00975,R 00978,R 00981,R 01023,R 01027,R 01064,R 01092,R 01097,R 01140,R 01183,R 01247,R 01251,R 01282,R 01309,R |
| LD1 | 114A | 0 | 00392 | 00404,R 00406,R |
| MAIN | 1389 | 0 | 00998 | |
| MAIN2 | 1388 | 0 | 01048 | 01043,R 01085,R |
| MAIN3 | 13A5 | 0 | 01026 | 01017,R |
| MAIN4 | 13A7 | 0 | 01028 | 01025,R |
| MAIN6 | 13EC | 0 | 01097 | 01019,R 01089,R |
| MAIN8 | 1393 | 0 | 01008 | 01109,R |
| NINE | 1209 | 0 | 00588 | 00277,R |
| NOP | 8000 | 0 | 00003 | 00011,R 00579,R 00580,R 00581,R 00582,R 00583,R 00584,R 00585,R 00586,R 00587,R 00617,R 00618,R 00619,R 00620,R 00621,R 00622,R 00708,R 00709,R 00714,R 01046,R 01047,P |
| ONE | 1201 | 0 | 00580 | 00237,R |
| OUT | 1116 | 0 | 00329 | 00337,R |
| OUTPT | 1114 | 0 | 00327 | 00323,R |
| PLS | 121F | 0 | 00612 | 00742,R |
| PLUS | 127E | 0 | 00719 | 00297,R |
| POST | 129A | 0 | 00749 | 00161,R |
| POS51 | 13C8 | 0 | 01064 | 01081,R |
| POS53 | 13DD | 0 | 01082 | 01063,R 01073,R |
| POS55 | 13C8 | 0 | 01061 | 01059,R |
| POS56 | 13D5 | 0 | 01074 | 01055,R |
| POS58 | 13DA | 0 | 01079 | 01077,R |
| RAL | 80F5 | 0 | 00003 | 00088,R 00089,R 00094,R 00122,R 00333,R 00462,R 00501,R 00502,R 00551,R 00693,R 00697,R 00699,R 00805,R 00809,R 00811,R 00969,R 00970,R 00973,R 01061,R 01066,R 01067,R 01265,R 01286,R |
| RAR | 80F6 | 0 | 00003 | 00075,R 00183,R 00185,R 00330,R 00594,R 00726,R 00877,R 00880,R 00893,R 00896,R 00907,R 00910,R 00923,R 00926,R 00956,R 00962,R 00963,R 01079,R 01125,R 01264,R 01276,R 01289,R 01297,R |
| RDM | 80E9 | 0 | 00003 | 00052,R 00068,R 00181,R 00320,R 00342,R 00374,R 00417,R 00602,R 00639,R 00731,R 00990,R 01012,R 01031,R 01087,R 01132,R 01152,R 01192,R 01227,R 01261,R |
| RDR | 80EA | 0 | 00003 | 00087,R 00100,R 00393,R 00461,R 00500,R 00550,R 00876,R 00892,R 00906,R 00922,R 00955,R 00961,R 00968,R 00972,R 01065,R |
| RD0 | 80EC | 0 | 00003 | 00092,R 00151,R 00530,R 00552,R 00593,R 00652,R 00670,R 00695,R 00725,R 00807,R 01063,R 01124,R |
| RD1 | 80ED | 0 | 00003 | 00952,R 01056,R 01074,R |
| RD2 | 80EE | 0 | 00003 | 00837,R 00958,R |
| RD3 | 80EF | 0 | 00003 | 00965,R |
| RTN | 110C | 0 | 00319 | 00325,R |
| RTN00 | 12B4 | 0 | 00775 | 00782,R |
| RTN01 | 12BC | 0 | 00783 | 00787,R |
| RTN1 | 1409 | 0 | 01130 | 01138,R |
| RTN2 | 141E | 0 | 01151 | 01160,R |
| RTN3 | 142F | 0 | 01168 | 01179,R |
| RTN4 | 1445 | 0 | 01191 | 01199,R |
| SBM | 80E8 | 0 | 00003 | 00777,R 01015,R 01170,R 01212,R |
| SCAN | 101D | 0 | 00045 | 00214,R |
| SET | 12C6 | 0 | 00799 | 00298,R |
| SETX | 137E | 0 | 00985 | 00841,R |
| SET1 | 1382 | 0 | 00989 | 00995,R |
| SEVEN | 1207 | 0 | 00586 | 00275,R |
| SIX | 1206 | 0 | 00585 | 00258,R |
| SRC | 8021 | 0 | 00003 | 00014,R 00033,R 00051,R 00067,R 00069,R 00076,R 00148,R 00180,R 00198,R 00205,R 00312,R 00319,R 00341,R 00344,R 00364,R 00373,R 00392,R 00394,R 00396,R 00398,R 00416,R 00418,R 00420,R 00444,R 00451,R 00456,R 00494,R 00512,R 00528,R 00549,R 00590,R 00601,R 00632,R 00638,R 00640,R 00685,R 00694,R 00723,R 00730,R 00732,R 00736,R 00776,R 00852,R 00943,R 00951,R 00979,R 00983,R 00989,R 00991,R 01011,R 01013,R 01028,R 01030,R 01032,R 01052,R 01064,R 01082,R 01086,R 01098,R 01123,R 01131,R 01151,R 01153,R 01169,R 01172,R 01182,R 01191,R 01193,R 01212,R 01215,R 01224,R 01245,R 01260,R 01262,R 01271,R 01283,R 01292,R 01308,R |
| START | 03C0 | 0 | 01313 | 01315,R |
| STC | 80FA | 0 | 00003 | 00026,R 00093,R 00121,R 00159,R 00193,R 00377,R 00762,R 00768,R 00774,R 01060,R 01078,R 01167,R 01209,R 01269,R 01290,R |
| STEP | 11C7 | 0 | 00526 | 00468,R 00489,R 00558,R 01049,R |
| STEP2 | 11D2 | 0 | 00537 | 00535,R |
| STEP3 | 11D5 | 0 | 00540 | 00541,R 00544,R |
| STEP4 | 11E8 | 0 | 00560 | 00556,R |
| STEP5 | 11D1 | 0 | 00536 | 00532,R |
| STEP6 | 11CA | 0 | 00529 | 00546,R |
| STPB | 1300 | 0 | 00859 | 00477,R 01038,R |
| STRT | 1030 | 0 | 00067 | 00144,R |
| SUB | 8090 | 0 | 00003 | 00073,R 00108,R 00117,R 00127,R 00166,R 00861,R 01141,R |
| S1 | 158D | 0 | 00003 | 00711,R |

```
SYMBOL     VALUE  REL DEFN     REFERENCES

S2         154F   0   00004    00707,R
S3         1512   0   00005    00716,R
TCC        80F7   0   00C03
TCS        80F9   0   00003    00775,R 00783,R 01168,R 01211,R 01223,R
THREE      1203   0   00582    00239,R
TN         0009   0   00003
TRANS      1232   0   C0636    00665,R 00832,R
TRANZ      1234   0   00638    00645,R
TT1        1276   U   00709    00235,R
TT2        1273   0   00706    00254,R
TT4        1276   U   00714    00292,R
TWO        1202   0   00581    00238,R
TZ         0001   0   00003    00136,R
T1         1068   0   00125    00102,R
T2         106D   0   00130    00110,R C0114,R 00119,R
T3         106E   0   00131    00124,R
T4         106F   0   00132    00083,R 00129,R
T5         1088   0   00213    00168,R
UNLCK      1266   0   00692    00294,R
WAIT       134A   0   00933    00875,R 00891,R 00905,R 00921,R
WAIT1      1348   0   00934    00935,R 00937,R 00940,R
WFPC2      1358   0   00947    00948,R
WFPC3      135A   0   00949    00950,R
WMP        80E1   0   00003    00016,R 00070,R 00077,R 00397,R 00400,R 00402,R 00419,R 00422,R 00424,R 00431,R 00433,R
                               00514,R 00516,R 00520,R 00522,R 00537,R 00944,R 00946,R 00980,R 00982,R 01246,R [illegible]
WRM        80E0   U   00003    00035,R 00208,R 00313,R 00347,R 00365,R 00395,R 00445,R 00592,R 00604,R 00634,R [illegible]
                               00686,R 00735,R 00737,R 00853,R 00992,R 01033,R 01156,R 01175,R 01184,R 01196,R [illegible]
WRR        80E2   0   00C03
WR0        80E4   0   C0003    00095,R 00099,R 00188,R 00199,R 00452,R 00457,R 00466,R 00554,R 01024,R
WR1        80E5   0   00C03    00453,R 00458,R 00495,R 00884,R 01083,R 01099,R
WR2        80E6   0   C0C03    00459,R 00496,R 00608,R 00651,R 00703,R 00930,R 01100,R
WR3        80E7   0   00003    00460,R 00497,R 00914,R 01101,R
WW         100E   0   00025
X          104F   0   C010C    00066,R C0097,R
XCH        E080   C   00C03    00056,R 00104,R 00106,R 00115,R 00131,R 00150,R 00173,R 00179,R 00222,R 00224,R 00321,R
                               00329,R 00331,R 00441,R 00475,R 00603,R 00802,R 00806,R 00815,R 01008,R 01010,R 01022,R
                               01026,R 01034,R 01036,R 01039,R 01041,R 01102,R 01104,R 01105,R 01107,R 01136,R 01252,R
                               01266,R 01287,R
X1         104D   0   00098    00091,R
X2         108F   0   00164    00154,R
X3         10AB   0   00196    00163,R
Y          1261   0   00685    00688,R
ZERC       1200   0   00579    00295,R
ZEROB      1353   C   00942    00483,R 01091,R
ZZB1       1299   0   00746    00701,R 00728,R
ZZC1       1244   0   00656
ZZC2       125C   0   00681    00672,R
ZZE1       12EC   0   00835    00820,R
ZZE2       12FA   0   00849    00839,R
ZZE3       12E2   0   00825    00813,R
ZZE4       12F1   0   00840    00836,R
ZZE5       12F3   0   00842    00834,R 01115,R
ZZZ        1227   0   00624
Z1         1363   0   00958    00954,R
Z11        1109   0   00314    00308,R
Z16        1214   0   00599    00596,R
Z2         136A   0   00965    00960,R
Z200       1289   0   00730    00740,R
Z23        1248   0   00660    00655,R
Z3         1371   0   00972    00967,R

  C00 OVERFLOW SECTORS SPECIFIED
  C00 OVERFLOW SECTORS REQUIRED
  207 SYMBOLS DEFINED
   NO ERROR(S) AND   NO WARNING(S)  FLAGGED IN ABOVE ASSEMBLY

// XEQ RUBCU

// XEQ E3E3

// XEQ
```

What is claimed is:

1. A method of funding a postage meter with a variable amount of postage, said postage meter being remote from a data center and having means for conditioning said postage meter to operate in either a first mode wherein the user of the postage meter can select an amount of postage to be printed or a second mode wherein the user can recharge the postage meter with a variable amount of postage and a funding register means which is rechargable with an additional variable amount of postage, the method comprising the steps of:

(a) establishing communication with a data center funding computer;

(b) entering into the data center funding computer data identifying the postage meter to be funded;

(c) entering into the data center funding computer data representing a desired variable amount of postage to be entered into said funding register means of said postage meter;

(d) processing said data representing the desired variable amount of postage to generate a unique combination which varies as a function of the entered postage data; and (e) conditioning the meter for operation in said second mode;

(f) entering the postage data and the unique combination from the data center into the postage meter;

(g) processing the entered combination in said postage meter; and (h) causing said funding register means to be recharged with the desired variable amount of postage.

2. A method for use in conjunction with a data center equipped to process transmissions from remotely located users of postage meters, each of said postage meters having means for preparing the postage meter to accept and process a recharging combination which varies as a function of a variable amount of postage desired to be entered into a funding register means of the postage meter, and means for operating the postage meter in either a first mode wherein the user of the postage meter can select an amount of postage to be printed or a second mode wherein the user can recharge the postage meter with a desired variable amount of postage, said data center being further equipped with a programmed computer and an answer-back unit, said method comprising the steps of:

(a) establishing a communication link between the data center and a user of a postage meter;

(b) receiving from said user of the postage meter, data uniquely identifying the postage meter to be funded and the desired variable amount of postage to be entered into said postage meter;

(c) processing the identification data for authenticity;

(d) processing the desired variable postage amount data to generate a combination for entry into said postage meter;

(e) transmitting to the user of the identified postage meter via the answer-back unit, the generated combination for entry into said postage meter;

(f) entering the desired variable postage amount into said postage meter;

(g) entering the generated combination into the postage meter;

(h) processing the generated combination in said postage meter; and (i) recharging the funding register means with the desired amount of postage.

3. The method of claim 2, further comprising the step of:

(k) updating, in the data center computer, a record of the postage meter of said user.

4. A method of funding a postage meter, said postage meter being remote from a data center, and being operable in either a first mode wherein the user of the postage meter can select an amount of postage to be printed or a second mode wherein the user can recharge the postage meter with a variable amount of postage, said postage meter having a rechargable funding register means, the method comprising the steps of:

(a) conditioning the postage meter to operate in said second mode;

(b) selecting at least two numbers having a psuedo-random relationship to each other;

(c) entering into said postage meter a desired variable amount of postage;

(d) processing the introduced postage amount and one of the selected numbers to form a first combination;

(e) processing the first combination with the other of said two sequential numbers to form a second combination;

(f) entering at least a portion of an externally generated combination into said postage meter for comparison with the internally formed second combination to effect a recharging of said funding register means of said postage meter with the desired variable amount of postage when a predetermined relationship is found between the two combinations; and (g) conditioning the postage meter to operate in said first mode.

5. For use in the control of a computerized postage meter capable of operating in either a first mode wherein the user of the postage meter can select an amount of postage to be printed or a second mode wherein the user can recharge the postage meter with a variable amount of postage, said computerized postage meter having a keyboard for entering information, a funding register means which is rechargeable with an additional desired variable amount of postage in accordance with the processing of the desired postage amount by said postage meter, and means for storing and executing a postage meter program for comparing an externally generated combination with an internally generated combination based upon and varying with said desired variable postage amount and for internally generating numbers having a psuedo-random relationship, the method of remotely funding said postage meter comprising the steps of:

(a) conditioning the postage meter to operate in said second mode;

(b) processing via said postage meter program a desired postage variable amount, and one of two numbers to form a second combination;

(c) comparing at least a portion of said second combination with at least a portion of the externally generated combination;

(d) incrementing said funding register means of said postage meter by the desired variable amount of postage when the comparison indicates a predetermined relationship between the externally generated combination and the internally generated second combination; and (e) conditioning the postage meter to operate in said first mode.

6. The method of remotely funding a postage meter, said postage meter having means for conditioning the postage meter to operate in either a first mode wherein the user of the postage meter can select an amount of postage to be printed or a second mode wherein the user can recharge the postage meter with a variable amount of postage and a funding register means which is rechargeable with an additional amount of postage, the method comprising the steps of:

(a) conditioning the postage meter to operate in said second mode;

(b) selecting and entering a variable amount of postage into the postage meter;

(c) internally generating within the postage meter a unique combination varying in accordance with psuedo-random numbers contained within the postage meter and with the variable postage amount entered into the postage meter;

(d) entering an externally generated combination into the potage meter;

(e) comparing the internally and externally generated combinations;

(f) funding the funding register means of said postage meter with the selected postage amount when the internally generated combination of the postage meter corresponds with the externally generated combination; and (g) conditioning the postage meter to operate in said first mode.

7. A computerized postage meter having an operating mode wherein the user can recharge the postsge meter with a variable amount of postage, said meter comprising means for receiving a postage amount and a combination dependent upon the postage amount, a central processor unit connected to said receiving means for independently deriving said combination from an input of said postage amount, and for comparing the independently derived combination with the received combination, and a funding register means connected to said central processor unit, said funding register means being recharged with said postage amount when said derived combination bears a predetermined relationship to said received combination.

8. An electronic postage meter having:

a funding register capable of being recharged with a variable amount of postage;

means for enabling said meter to receive a first entry representing the desired variable amount of postage and a subsequent second entry representing an externally generated combination;

means responsive to the first entry for generating an internal combination based in part upon the value of the first entry;

means responsive to the second entry for comparing the generated internal combination with the entered external combination, to determine whether a predetermined relationship exists between the two combinations; and means responsive to a finding of the predetermined relationship for recharging said funding register by the amount of the first.

9. A method of funding a postage meter with a variable amount of postage, comprising the steps of:

(a) establishing communications with a funding computer;

(b) entering data into the funding computer identifying the postage meter to be funded;

(c) entering data into the funding computer representing a variable amount of postage;

(d) processing the postage-representing data within the funding computer to generate a postage-dependent data combination; and (e) entering the postage-dependent data combination and data representing the variable amount of postage into the postage meter to be funded.

10. The method of claim 9 including the additional step of processing the postage-representing data and the postage-dependent data combination in said postage meter, to determine whether the entered combination is related to the postage-representing data in a predetermined manner.

11. A method for use at a data center equipped to process transmissions from remotely located users of postage meters, each of said postage meters having means for preparing the postage meter to accept and process a recharging combination, the value of which is dependent on the amount of postage to be funded into the postage meter, said data center being further equipped with a programmed computer and an answer-back unit, said method comprising the steps of:

(a) establishing a communications link between the data center and a user of a postage meter;

(b) receiving from said user communicated data uniquely identifying the postage meter to be funded and data specifying the amount of postage to be entered into said postage meter;

(c) comparing the received meter-identifying data with stored meter-identifying data to verify the authenticity of the received data;

(d) operating on the received postage data to generate a postage-dependent recharging combination; and (e) transmitting to the user of the identified postage meter via the answer-back unit, the generated postage-dependent combination for entry into said postage meter.

12. The method of claim 11 further including the steps of:

(a) entering data specifying the postage amount into said postage meter; and (b) entering the postage-dependent combination provided by the answer-back unit into said postage meter.

13. The method of claim 11 further including the step of updating a user's record stored in the computer by the amount of the received postage data.

14. The method of claim 11 wherein each postage meter is equipped with ascending and descending registers, and wherein the data center requests and receives the numerical values of the contents of the ascending and descending registers in the postage meter identified by the meter-identifying data.

15. A method of funding a postage meter comprising the steps of:

(a) generating at least two numbers having a pseudo-random relationship to each other;

(b) selecting an amount of postage to be added to said postage meter;

(c) operating upon the selected postage amount and one of the generated numbers to form a first combination;

(d) operating upon the first combination and the other of the generated numbers to form a second combination; and (e) entering at least a portion of said second combination into said postage meter preparatory to funding said meter with the selected amount of postage.

16. The method of funding a postage meter as recited in claim 15 wherein the first combination is formed by multiplying said postage amount by one of said generated numbers.

17. The method of funding a postage meter as recited in claim 15 wherein said second combination is formed by adding said first combination and the other of said generated numbers.

18. The method of funding a postage meter as recited in claim 16 wherein said second combination is formed by adding said first combination and the other of said generated numbers.

19. In the control of a computerized postage meter which has a keyboard for entering information and which operates under the control of a stored postage meter program for comparing an externally generated combination with an internally generated combination and for generating two numbers having a psuedo-random relationship to each other, a method of funding the postage meter comprising the steps of:

(a) entering a selected postage funding amount into the postage meter via said keyboard;

(b) operating upon the entered postage funding amount and one of the two generated numbers to form a first combination;

(c) entering at least a portion of an externally generated combination into the postage meter via said keyboard;

(d) operating upon the first combination and the other of said two generated numbers to form a second combination;

(e) comparing at least a portion of said second combination with at least a portion of the externally generated combination entered into the meter; and (f) funding said postage meter with the selected amount of postage when the comparison shows a predetermined relationship between the compared portions of the externally generated combination and the internally generated second combination.

20. The method of claim 19 wherein said first combination is obtained by multiplying said selected postage amount by said one of the generated numbers.

21. The method of claim 19 wherein said second combination is obtained by adding said first combination and said other of the generated numbers.

22. The method of claim 21 wherein said second combination is obtained by adding said first combination and said other of the generated numbers.

23. In the control of a system having a data center containing a computer and at least one remotely located computerized postage meter having a keyboard for entering information, said meter operating under the control of a stored postage meter program for comparing a combination received from the data center with an internally generated combination, the method of funding said postage meter comprising the steps of:

(a) establishing a communications link between the data center computer and a user of the computerized postage meter;

(b) transmitting to the data center via the communications link a selected amount of postage to be added to the postage meter;

(c) generating at least two numbers within the data center computer in accordance with a stored algorithm;

(d) operating upon the selected postage amount and one of the generated numbers to form a first combination;

(e) operating upon the first combination and the other of said generated numbers to form a second combination;

(f) transmitting to the user of the postage meter via the communications link at least a portion of the second combination;

(g) generating at least two numbers within the postage meter using a stored algorithm mathematically equivalent to the stored algorithm used in said data center computer;

entering the selected amount of postage into the postage meter via said keyboard;

(i) operating upon the entered postage amount and one of the numbers generated in accordance with the postage meter program to form a first postage meter combination;

(j) entering into the postage meter via the keyboard at least a portion of the second combination received from the data center;

(k) operating upon the first postage meter combination and the other of said two generated numbers in accordance with the postage meter program to form a second postage meter combination; and (l) comparing at least a portion of the second postage meter combination with at least a portion of the entered second combination.

24. The method of funding a postage meter comprising the steps of:

(a) entering a selected, variable amount of postage into the postage meter;

(b) generating within the postage meter a unique combination having a value which varies as a function of numbers generated within the postage meter and of the entered variable postage amount;

(c) entering an externally generated combination into the postage meter;

(d) comparing the internally and externally generated combinations within the postage meter; and (e) funding the postage meter with the entered variable amount when the comparison indicates the existance of a predetermined relationship between the internally generated combination and the externally generated combination.

25. The method of claim 24 wherein the externally generated combination has a value which varies as a function of numbers generated in a computer at a data center and of the variable amount of postage selected for entry into the postage meter.

26. A computerized postage meter comprising: input means for receiving a postage amount and a combination which varies as a function of the postage amount, at least one funding register, a central processor unit connected to said input means and said funding register for independently deriving a combination as a function of the received postage amount and for comparing the independently derived combination with the received combination, whereby the funding register will be incremented by said postage amount when said derived combination has a predetermined relationship to said received combination.

27. A postage meter comprising:

means for entering a selected, variable amount of postage into the postage meter in preparation for funding the postage meter with said postage amount;

means for internally generating a unique combination which varies as a function of numbers generated within the postage meter and of the selected, variable postage amount entered into the postage meter;

means for entering an externally generated combination into the postage meter;

means for comparing the internally and externally generated combinations; and means for funding the postage meter with the selected, variable postage amount when the comparison indicates the existance of a predetermined relationship between the internally generated combination and the externally generated combination.

28. For funding a postage meter at a first location with a variable amount of postage, said meter having a funding register, a method comprising the steps of transmitting data representing a selected, variable funding amount from said first location to a remote location, generating new coded data at said remote location responsive to receipt of said funding information, the new coded data varying in accordance with a predetermined relationship as a function of said funding data and previously generated coded data, transmitting said new coded data to said first location, entering data representing a selected variable funding amount and the transmitted new coded data into the postage meter, generating new coded data within said postage meter, said new coded data varying in accordance with the predetermined relationship as a function of entered funding data and previously generated coded data stored therein, determining whether the generated and the transmitted new coded data correspond and incrementing said funding register by the value of the funding data when a predetermined correspondence is found.

29. For use with a data center containing a programmed computer and a remotely located computerized postage meter having means for conditioning the postage meter to operate in either a first mode wherein the user of the postage meter can select an amount of postage to be printed or a second mode wherein the user can recharge the postage meter with a desired variable amount of postage, a funding register means which is rechargable with an additional desired variable amount of postage, a keyboard for entering information and a stored postage meter program for comparing a combination received from said data center with an internally generated combination, a method of funding said postage meter comprising the steps of:

(a) selecting an amount of postage to be added to said postage meter;
(b) establishing communications between the data center and a user of the computerized postage merer;
(c) communicating to the data center the selected amount of postage to be added to the postage meter;
(d) generating at the data center at least two numbers having a psuedo-random relationship to each other;
(e) processing the selected postage amount and one of the generated numbers at the data center to form a first combination;
(f) processing the first combination and the other of said generated numbers at the data center to form a second combination;
(g) communicating to the user of the postage meter at least a portion of the second combination;
(h) entering the selected amount of postage into the postage meter via said keyboard;
(i) generating at the postage meter at least two numbers having a psuedo-random relationship to each other;
(j) processing the selected postage amount and one of said generated numbers to form a first postage meter combination;
(k) processing the first postage meter combination and the other of said two generated numbers contained in said postage meter under the control of said postage meter program to form a second postage meter combination;
(l) entering at least a portion of the second combination received from the data center into the postage meter via the keyboard;
(m) comparing at least a portion of the second postage meter combination with at least a portion of the second combination received from the data center; and
(n) entering the selected amount of postage into said funding register means of said postage meter when the compared portions of the externally generated combination and the second postage meter combination have a predetermined relationship.

30. An electronic postage meter having an operating mode wherein the user may recharge the postage meter with a desired variable amount of postage, said postage meter comprising:

(a) a rechargeable funding register;
(b) means for receiving data representing a desired variable selected amount of postage;
(c) means connected to the postage-receiving means for generating an internal combination based upon the desired variable amount of postage entered into said postage meter;
(d) means for receiving an externally generated combination;
(e) means connected to said combination-receiving means for comparing the internally and externally generated combinations; and
(f) means responsive to said comparing means for recharging the funding register with the desired variable amount of postage when the internally generated combination has a predetermined relationship to the entered, externally generated combination. wardly directed force on the caps K as they pass through the prepressing, the heating, and the cooling zones of the heat sealing assembly 202. The downwardly directed force is resisted by captivator blocks 196 which slide along the underlying plates 200. In other words, the force applied to the caps K is not transmitted through the entire length of the container D as is the case with the machine A.

Thus, the relatively tall containers D, which are relatively weak from the standpoint of column strength, are sealed with the modified heat sealing machine B.

This invention is intended to cover all changes and modifications of the example of the invention herein chosen for purposes of the disclosure which do not constitute departures from the spirit and scope of the invention.

* * * * *